United States Patent [19]
Ohtake

[11] Patent Number: 5,946,145
[45] Date of Patent: Aug. 31, 1999

[54] VARIABLE FOCAL LENGTH OPTICAL SYSTEM

[75] Inventor: Motoyuki Ohtake, Kawasaki, Japan

[73] Assignee: Nikon Corporation, Tokyo, Japan

[21] Appl. No.: 08/916,239

[22] Filed: Aug. 22, 1997

[30] Foreign Application Priority Data

Aug. 22, 1996 [JP] Japan ..................................... 8-239791
Sep. 13, 1996 [JP] Japan ..................................... 8-265527

[51] Int. Cl.⁶ ....................................................... G02B 9/12
[52] U.S. Cl. .......................... 359/791; 359/779; 359/763; 359/784; 359/813
[58] Field of Search .................................... 359/791, 779, 359/773, 774, 769, 813, 763, 784

[56] References Cited

U.S. PATENT DOCUMENTS

| | | | |
|---|---|---|---|
| 5,069,536 | 12/1991 | Ogata ........................................ | 359/791 |
| 5,144,488 | 9/1992 | Endo et al. .............................. | 359/773 |
| 5,247,393 | 9/1993 | Sugawara ................................. | 359/774 |
| 5,272,566 | 12/1993 | Aoki ......................................... | 359/773 |
| 5,402,268 | 3/1995 | Tatsuno .................................... | 359/779 |
| 5,801,886 | 9/1998 | Lee .......................................... | 359/791 |

*Primary Examiner*—Loha Ben
*Attorney, Agent, or Firm*—Chapman and Cutler

[57] ABSTRACT

A compact variable focal length optical system is suitable for high zoom ratio. At least a first lens group having a positive refractive power, a second lens group, and a third lens group having a negative refractive power are provided. At least the first lens group is moved toward an object side of the system to satisfy a particular conditional equation so that a distance between the first and second lens groups is increased and a distance between the second and third lens groups is changed. In certain constructions, a first lens group having a positive refractive power, a second lens group having a negative refractive power positioned adjacent to and on an object side of the first lens group, and a third lens group positioned adjacent to and on an image side of the first lens group are provided. The first lens group includes at least two sub-lens groups. One of the sub-lens groups is moved in a direction almost orthogonal to the optical axis so as to shift an image in a direction almost orthogonal to the optical axis.

19 Claims, 53 Drawing Sheets

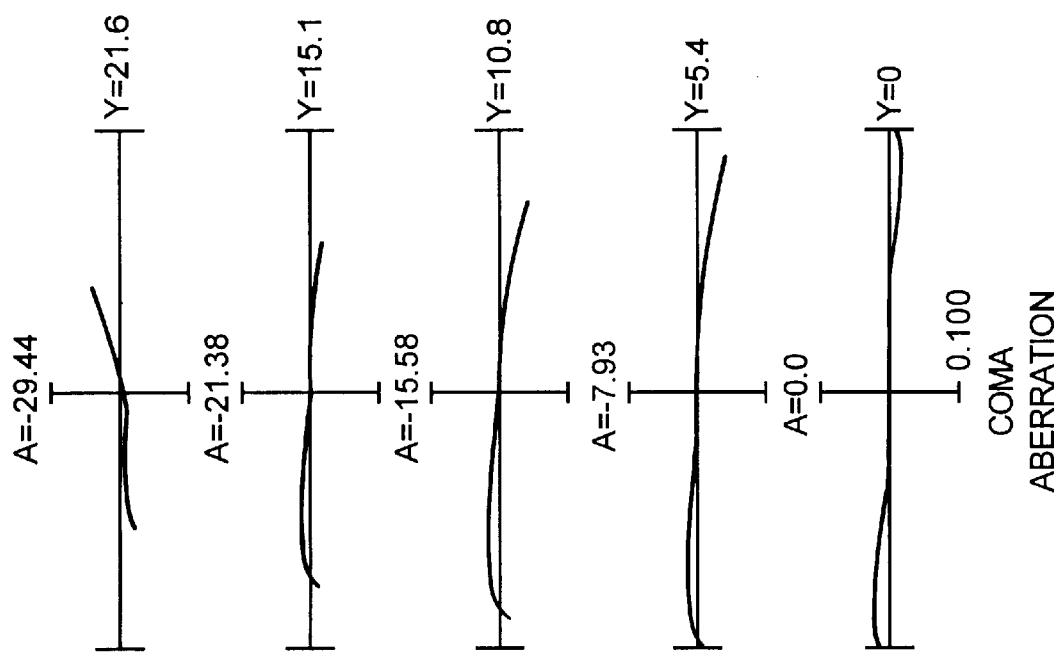
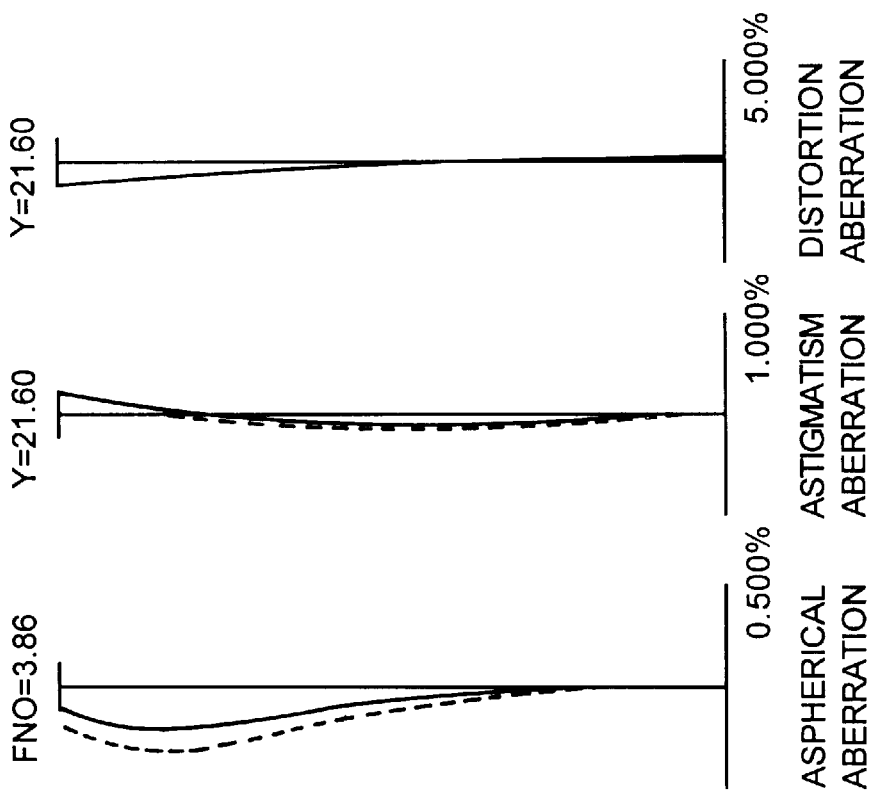

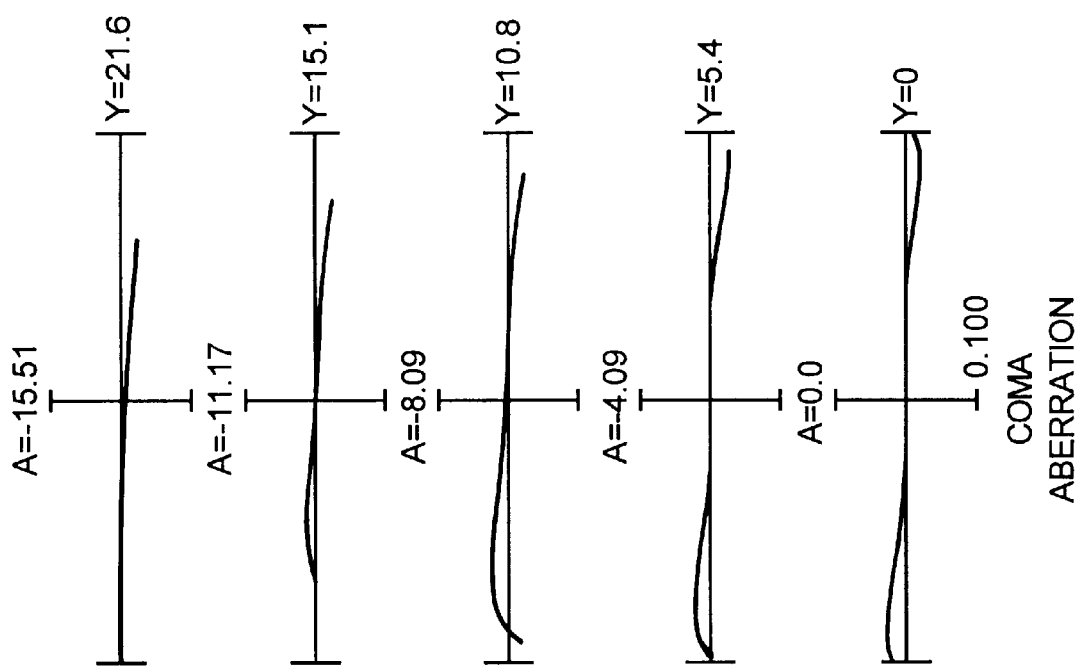
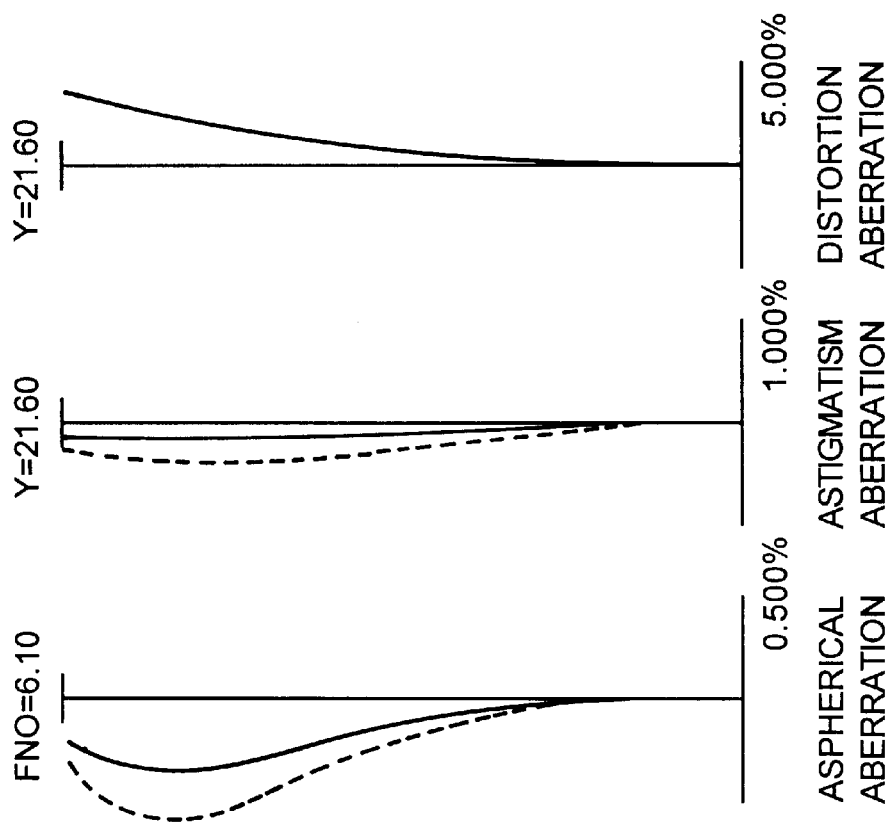

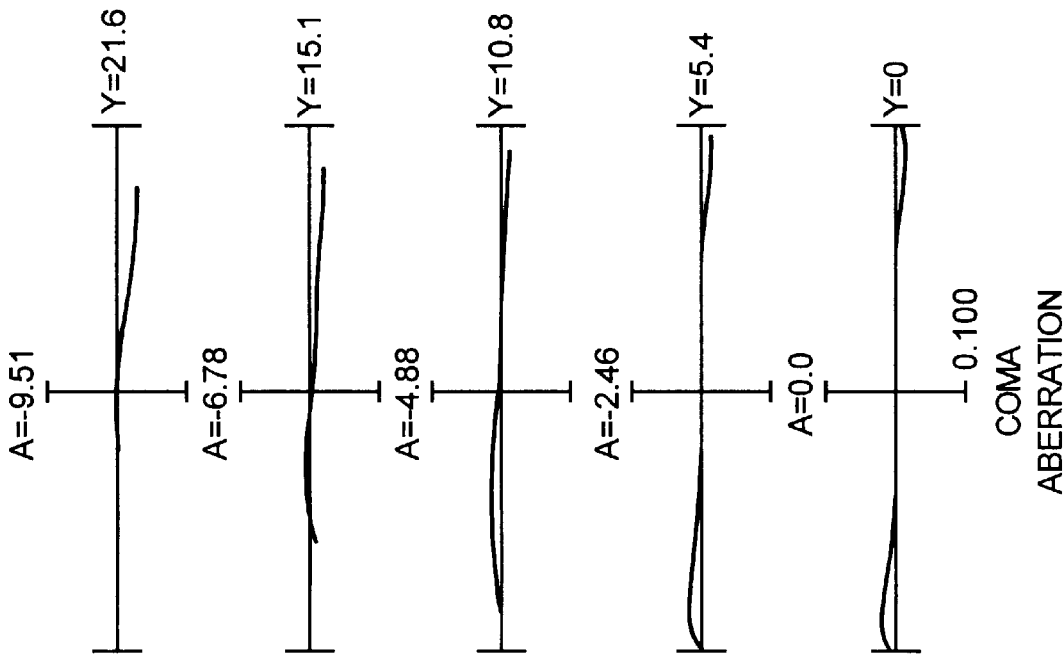
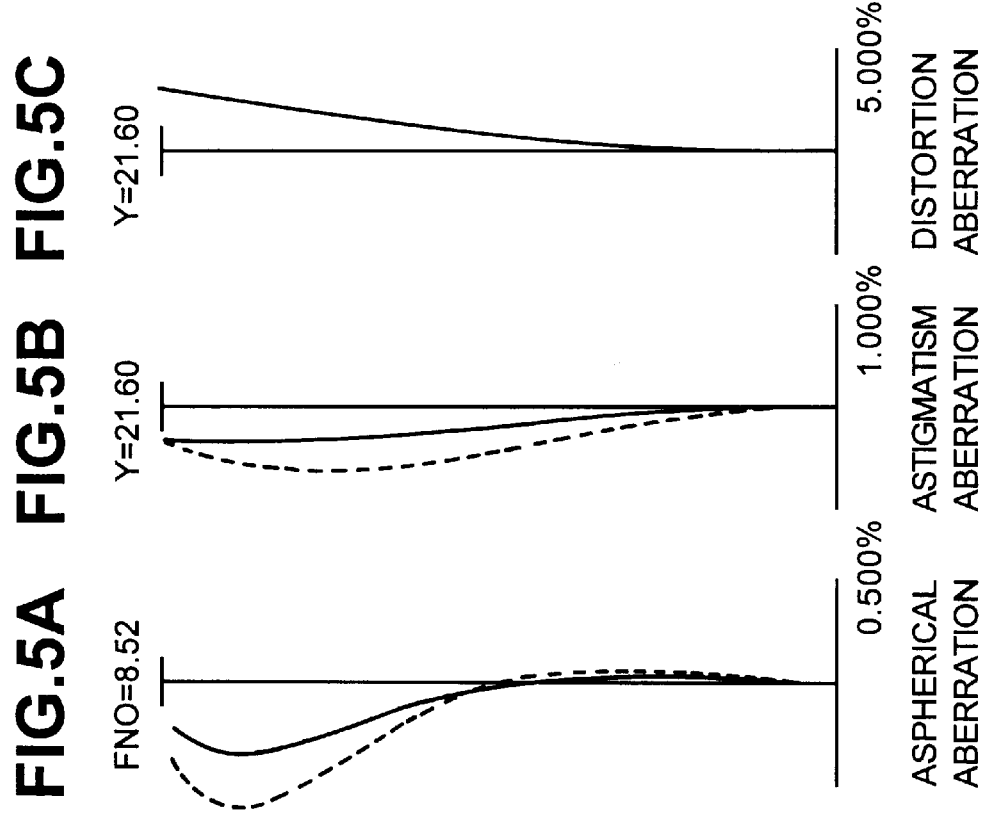

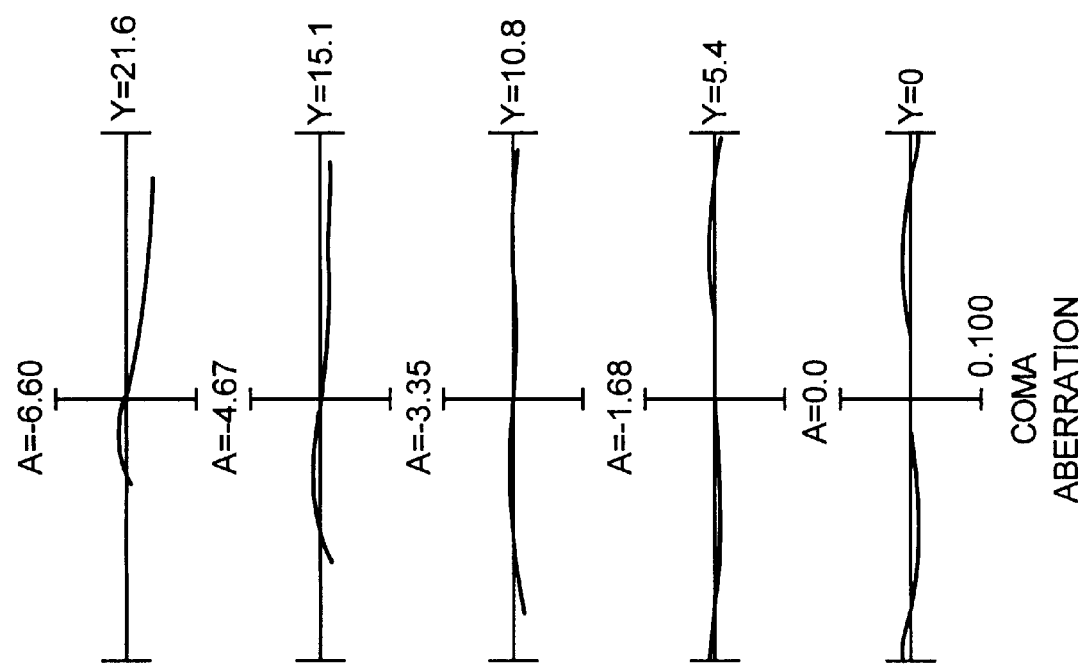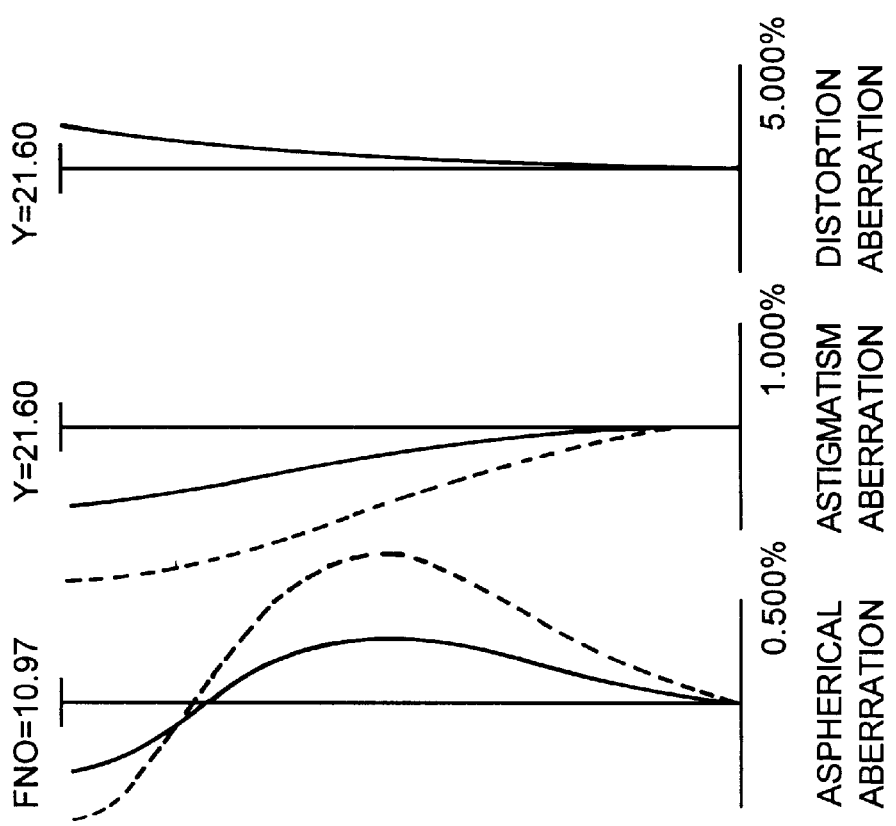

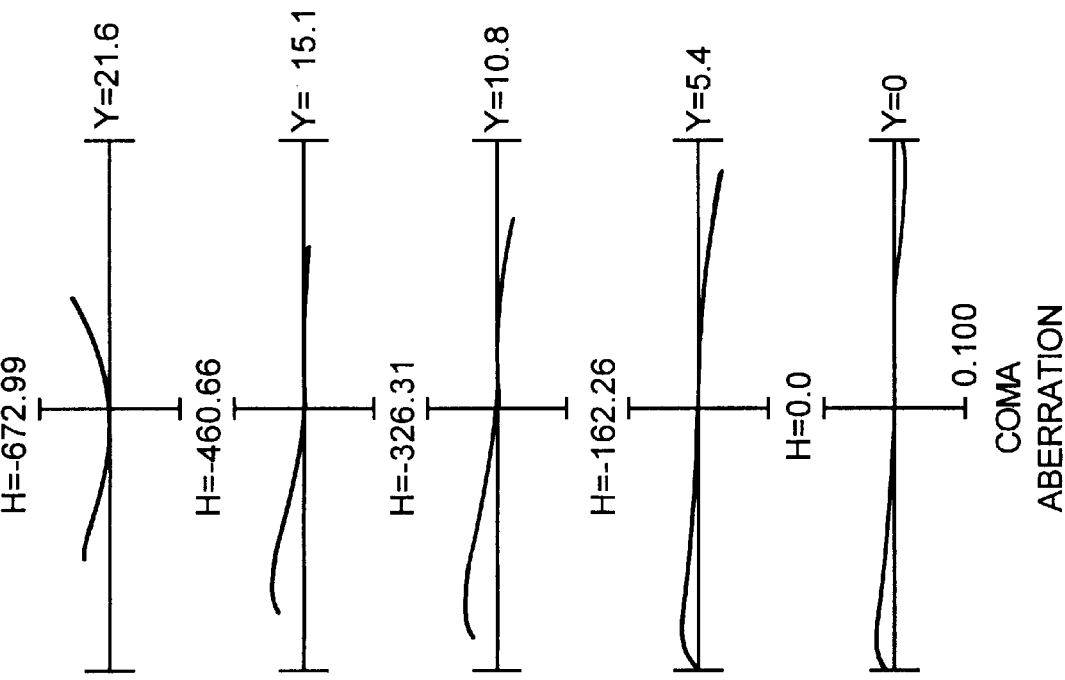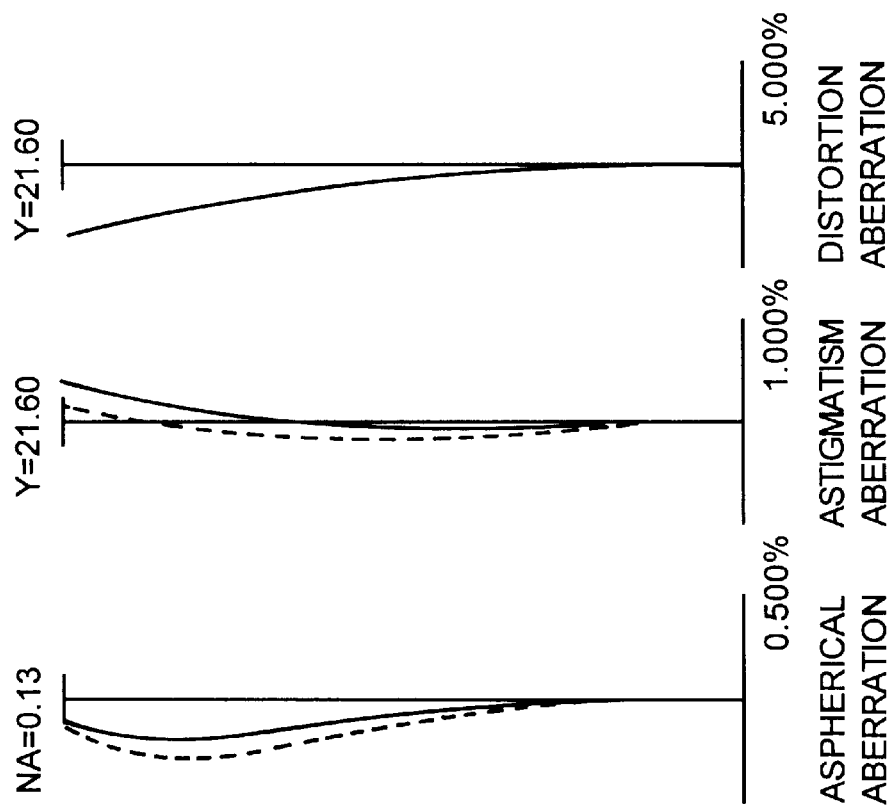

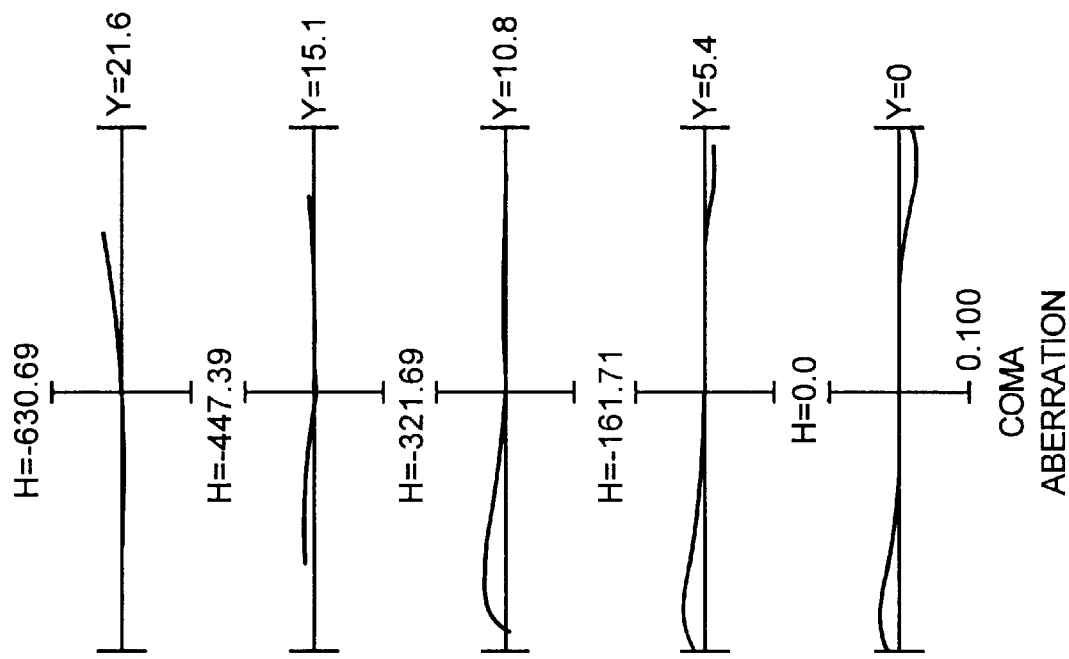
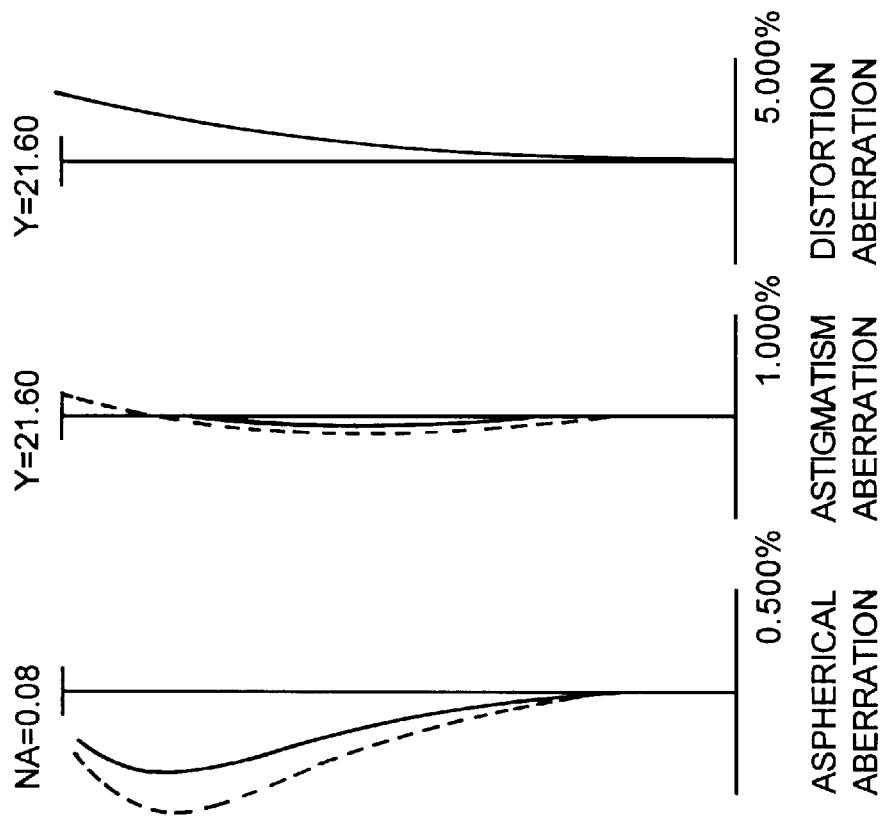

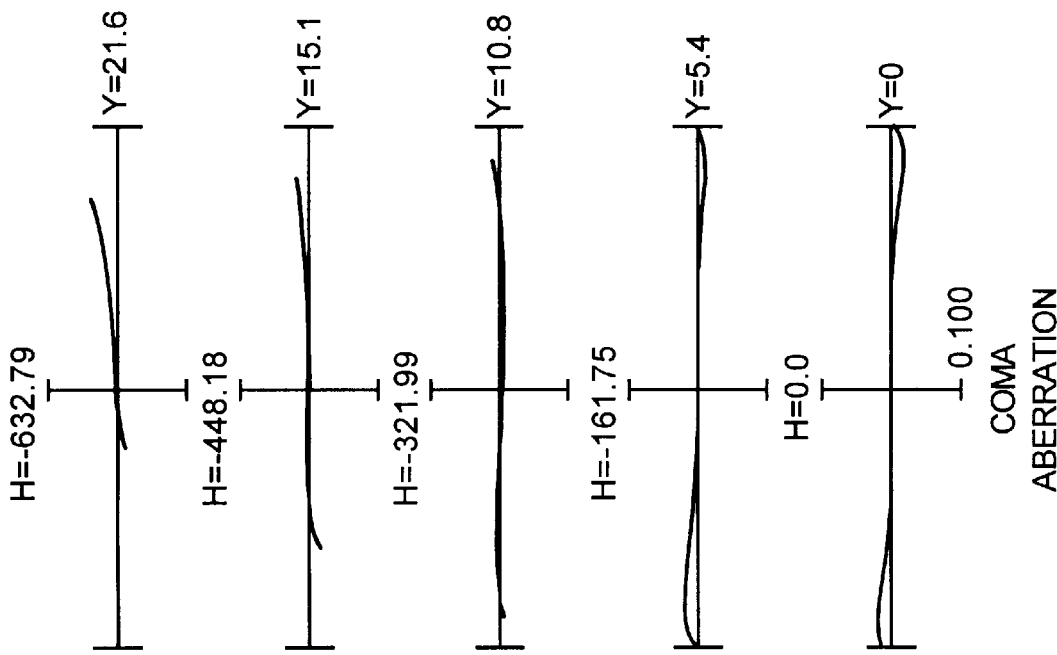
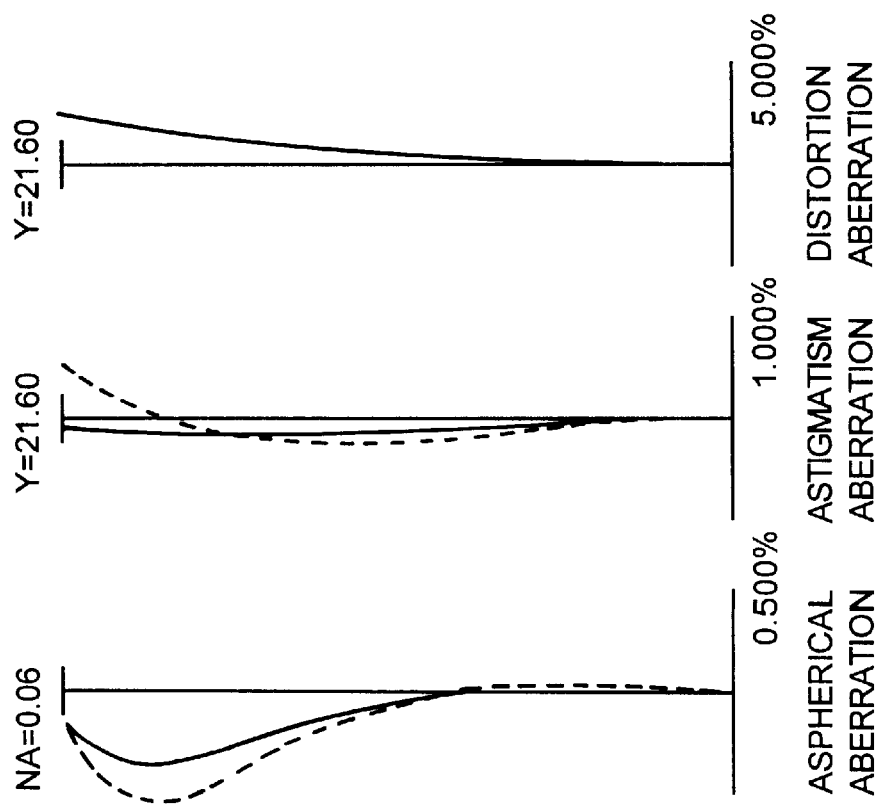
FIG.9A FIG.9B FIG.9C FIG.9D

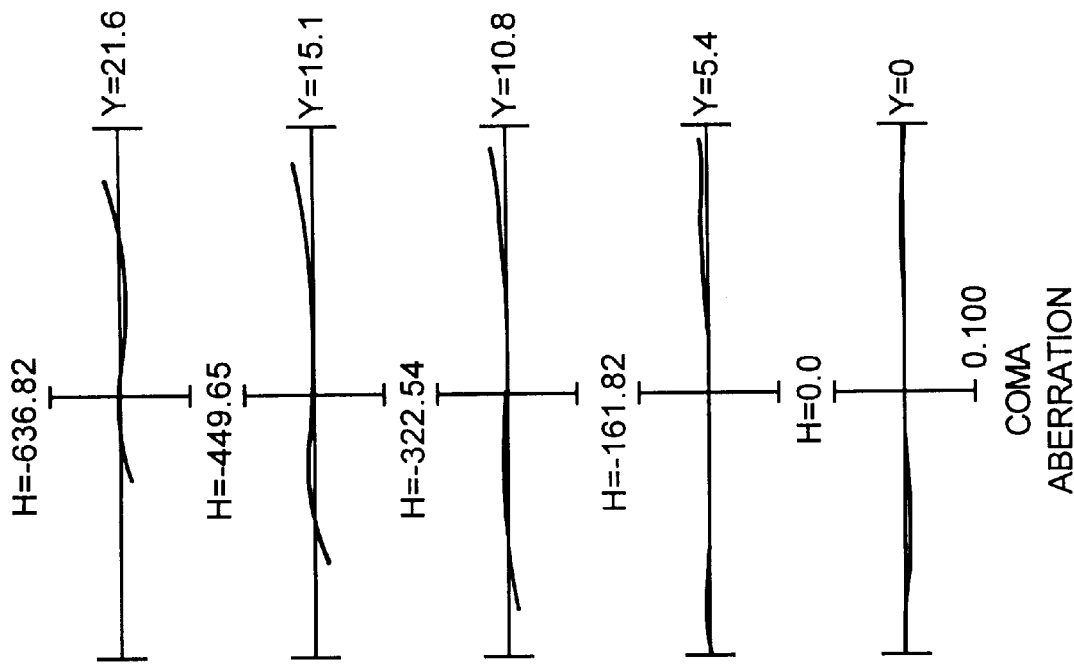
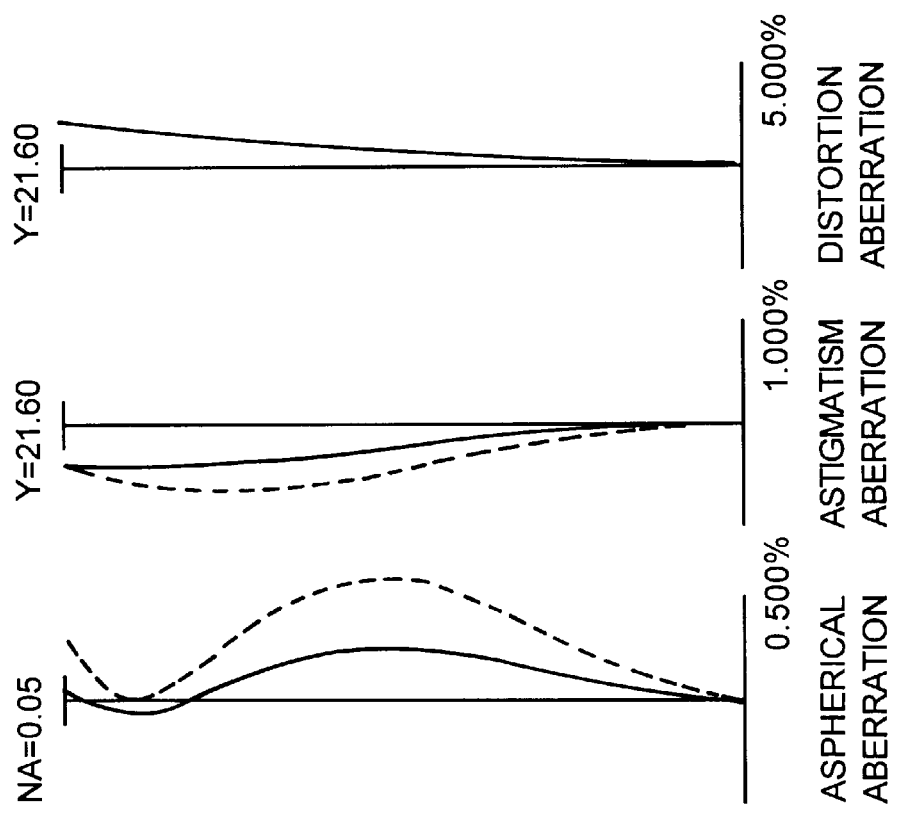

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

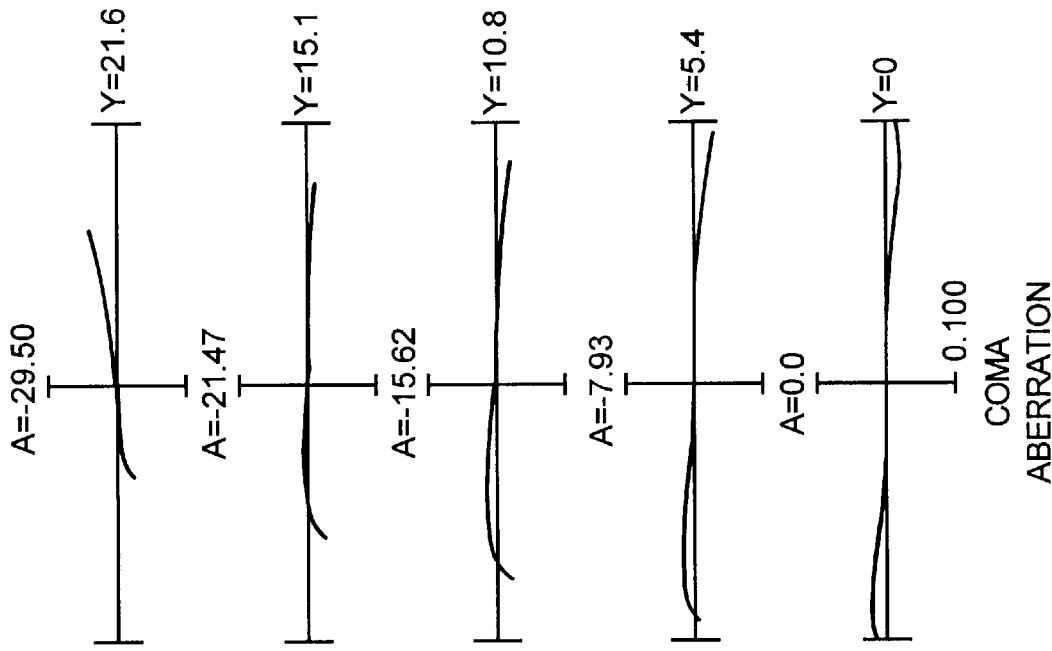
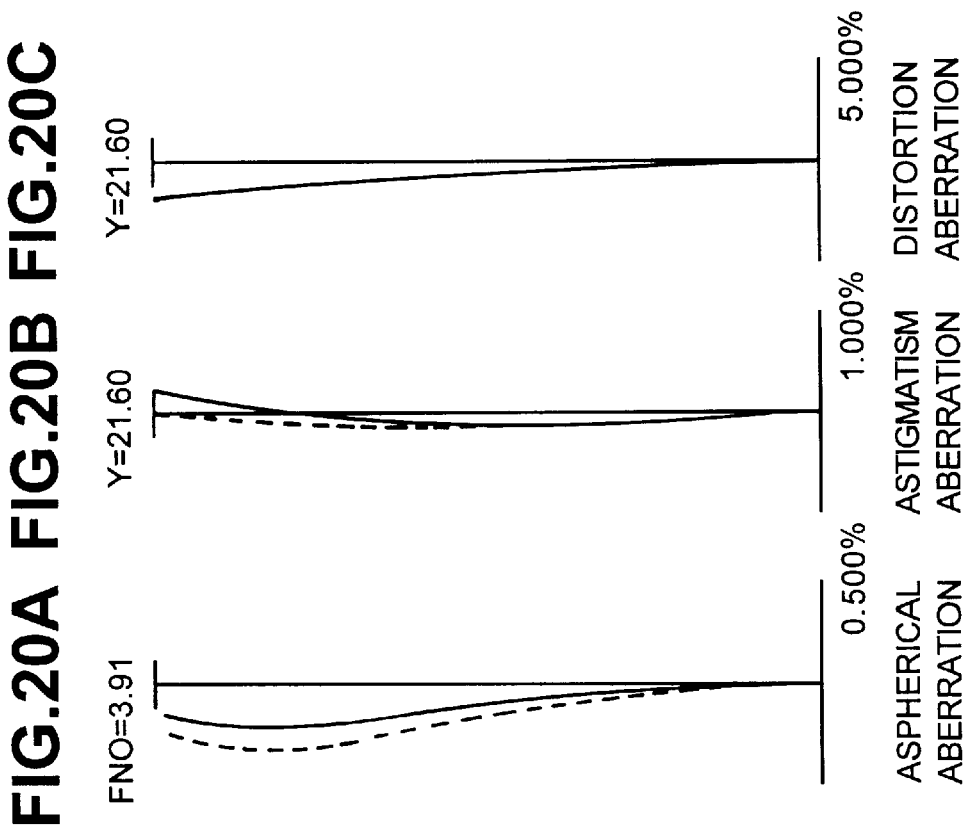

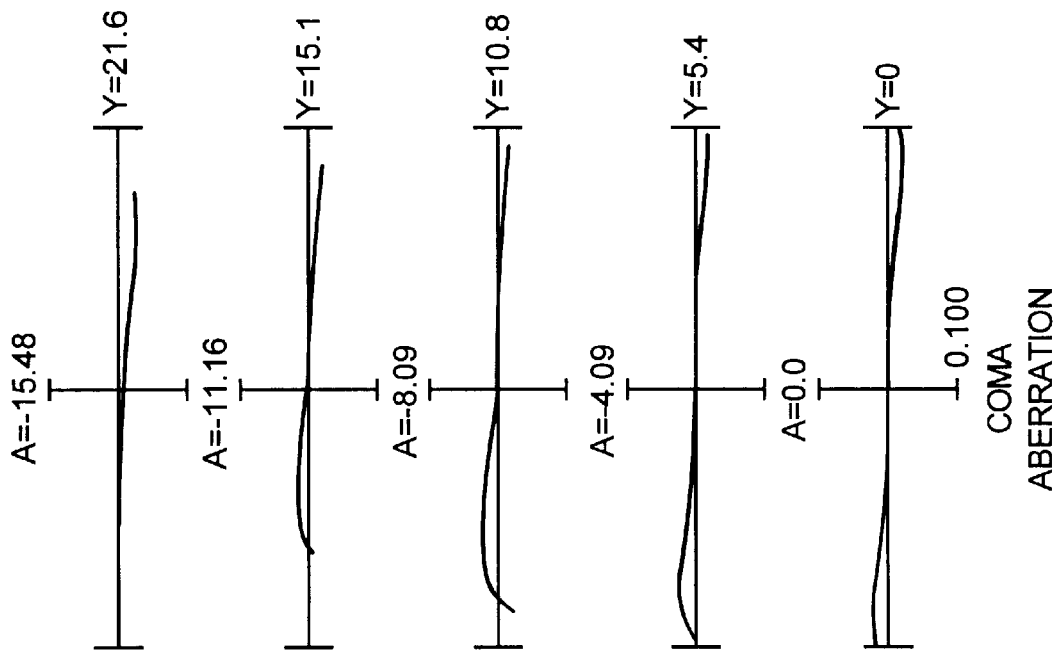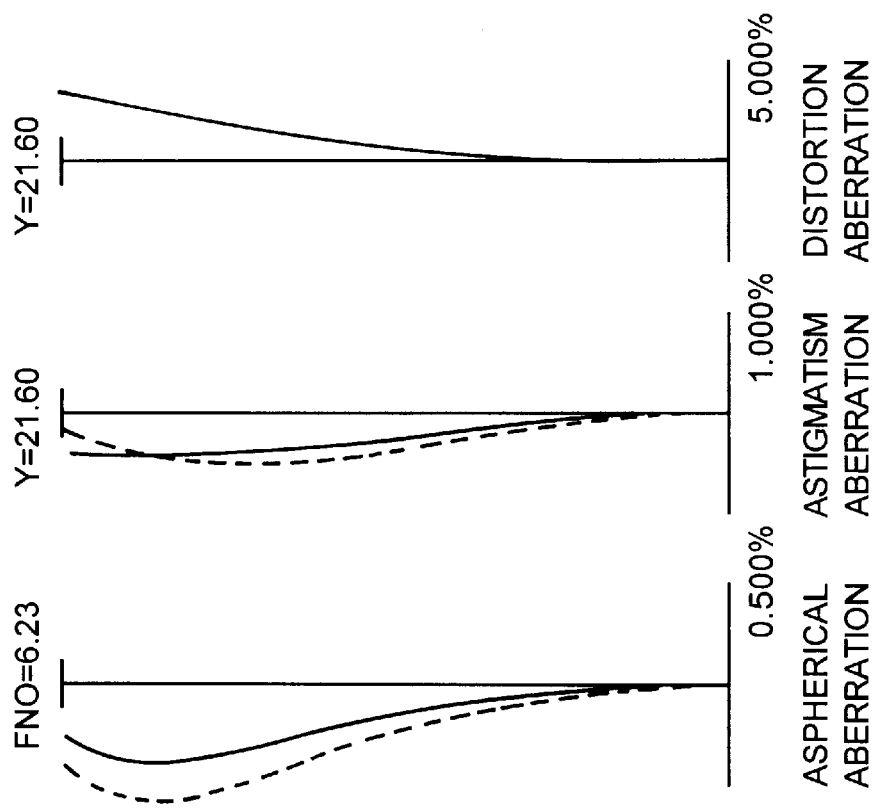

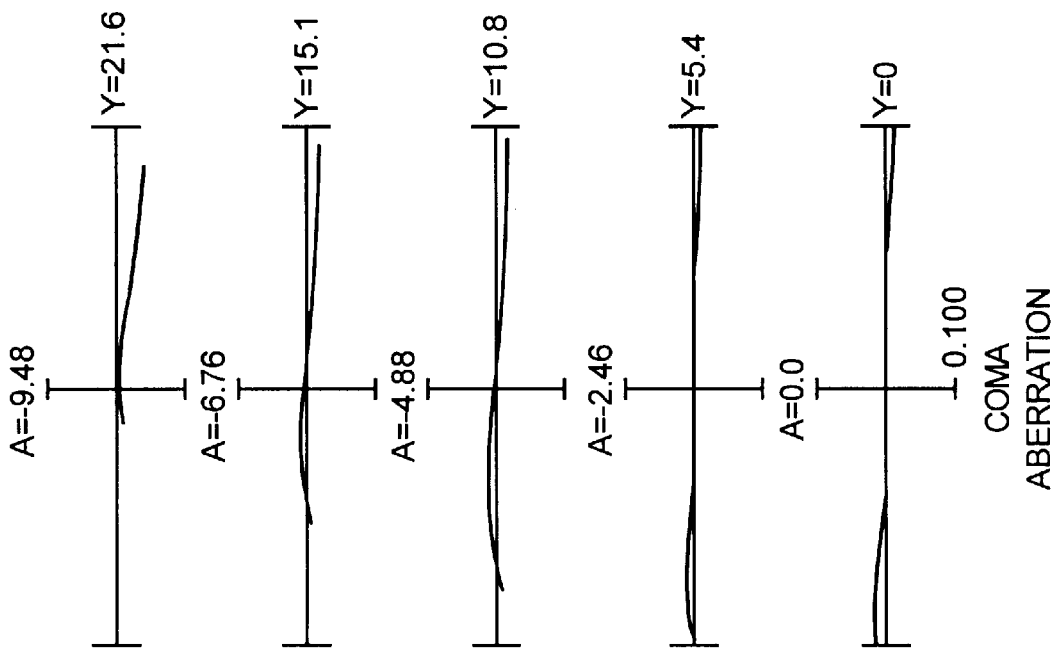
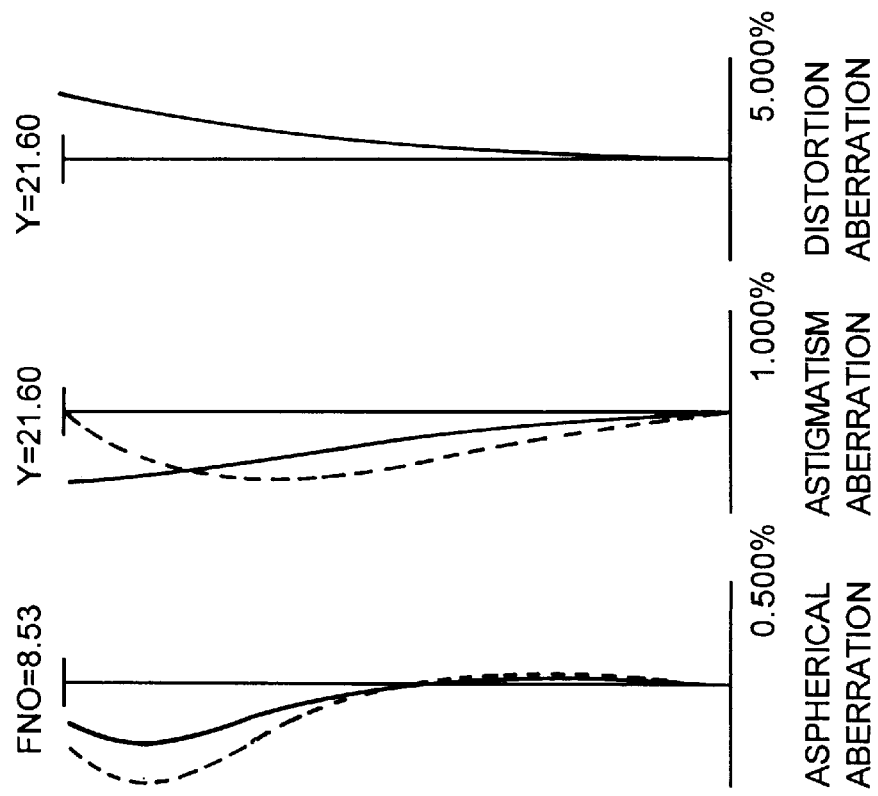

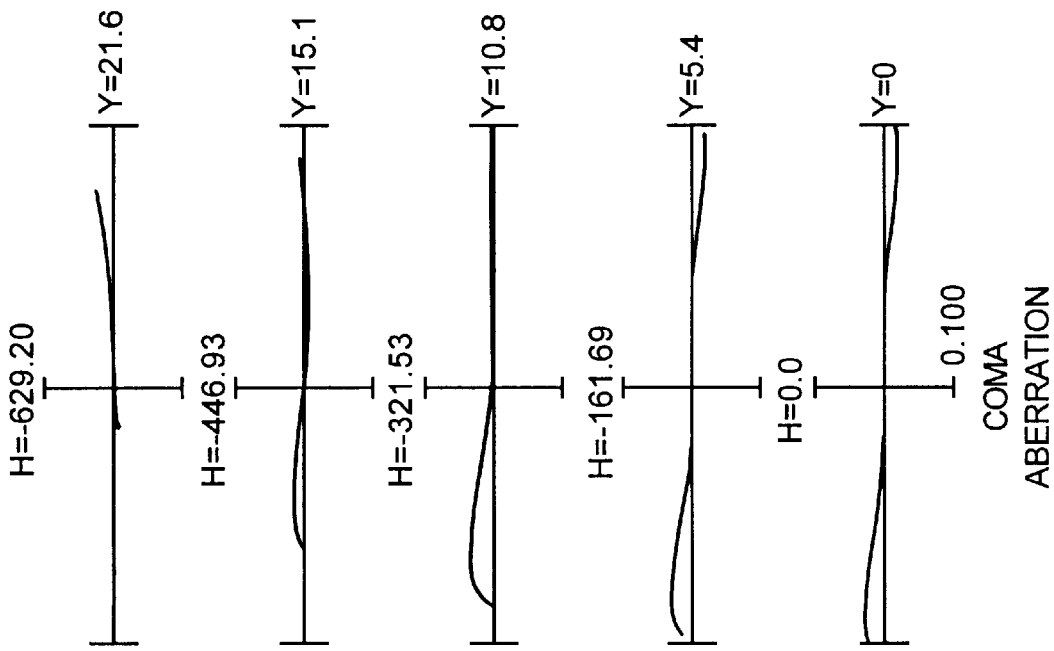
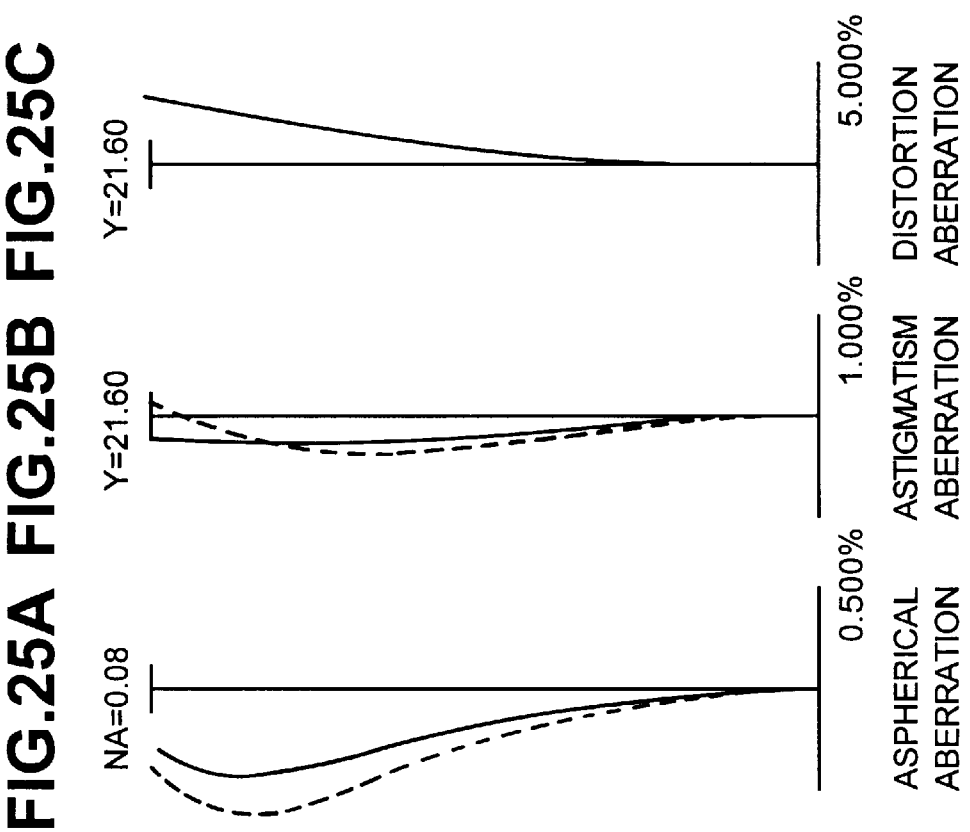

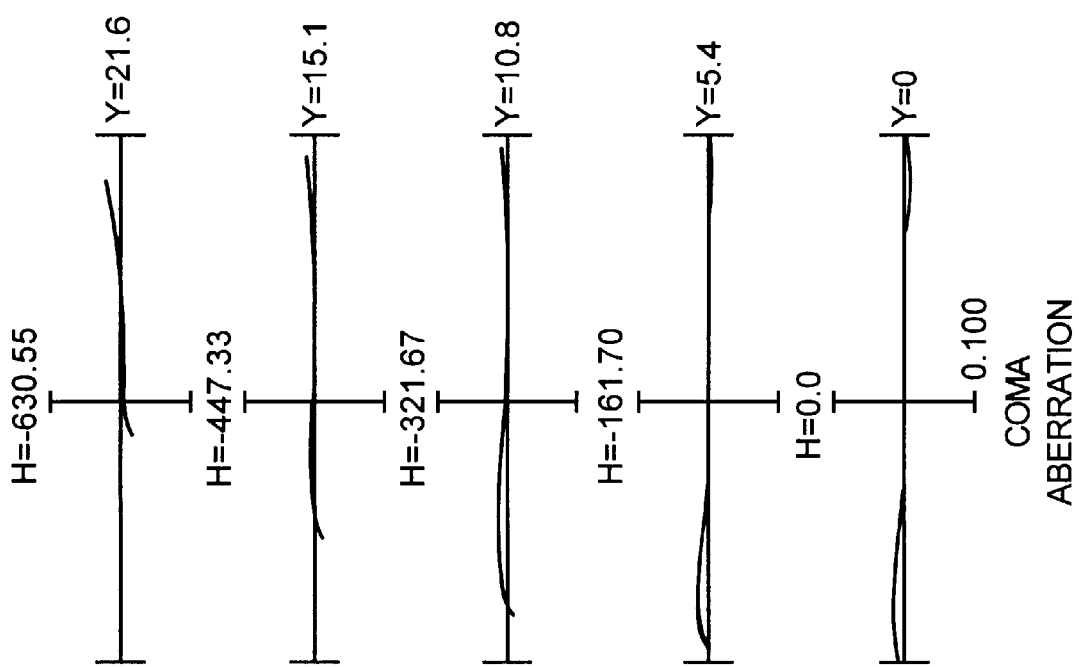
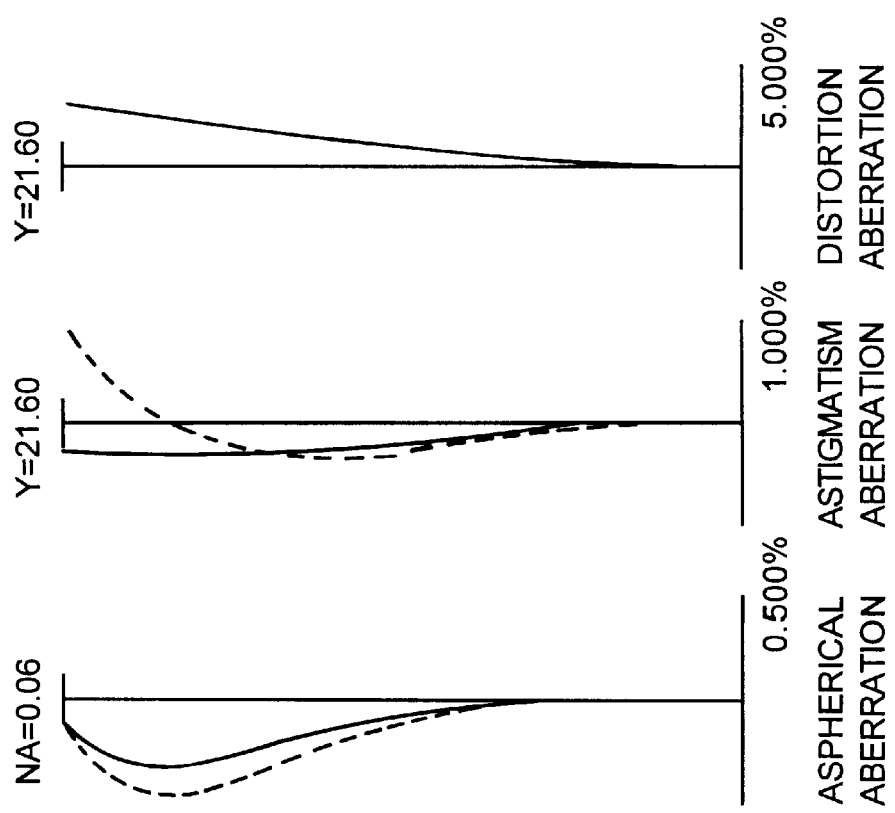

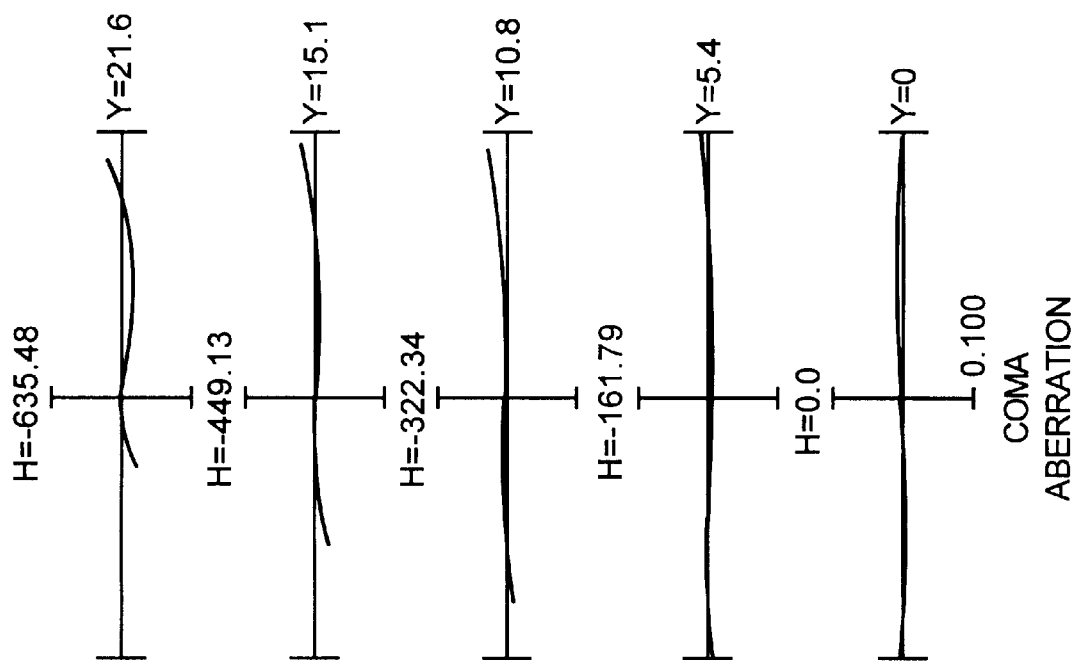
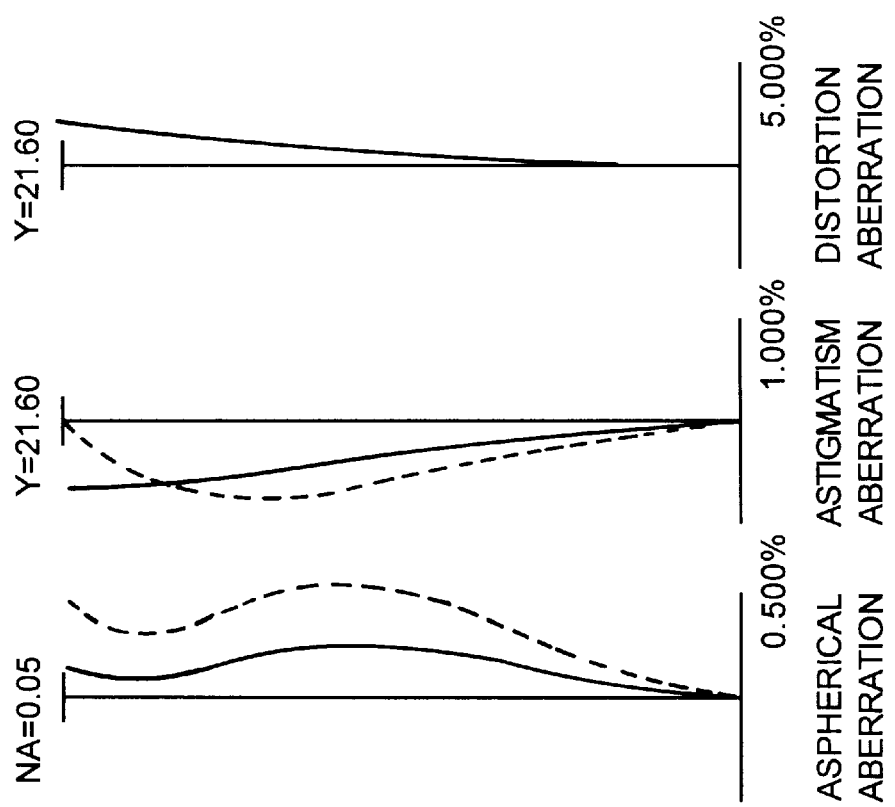

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

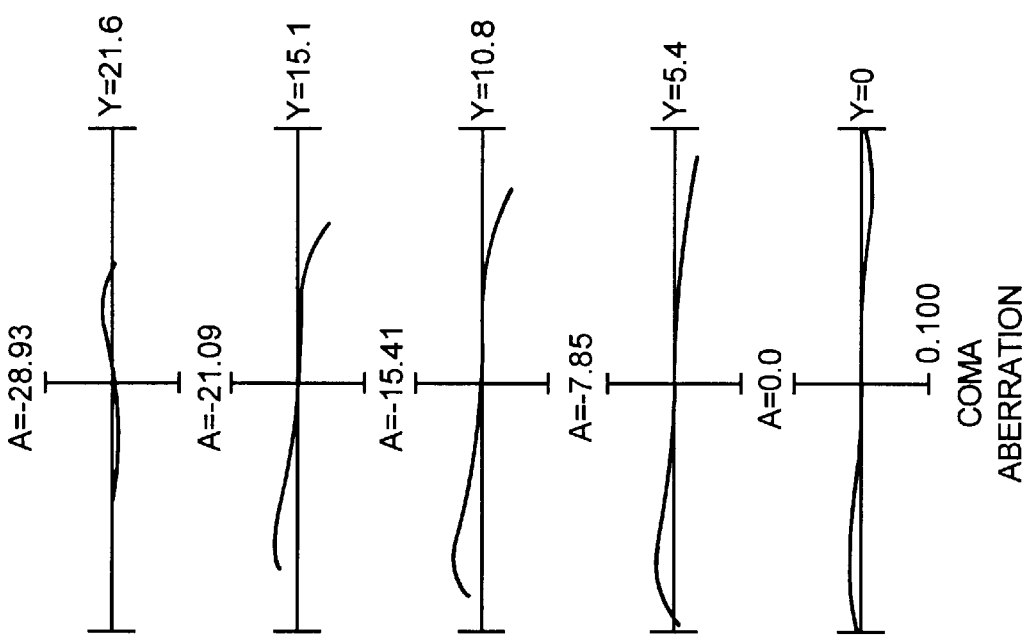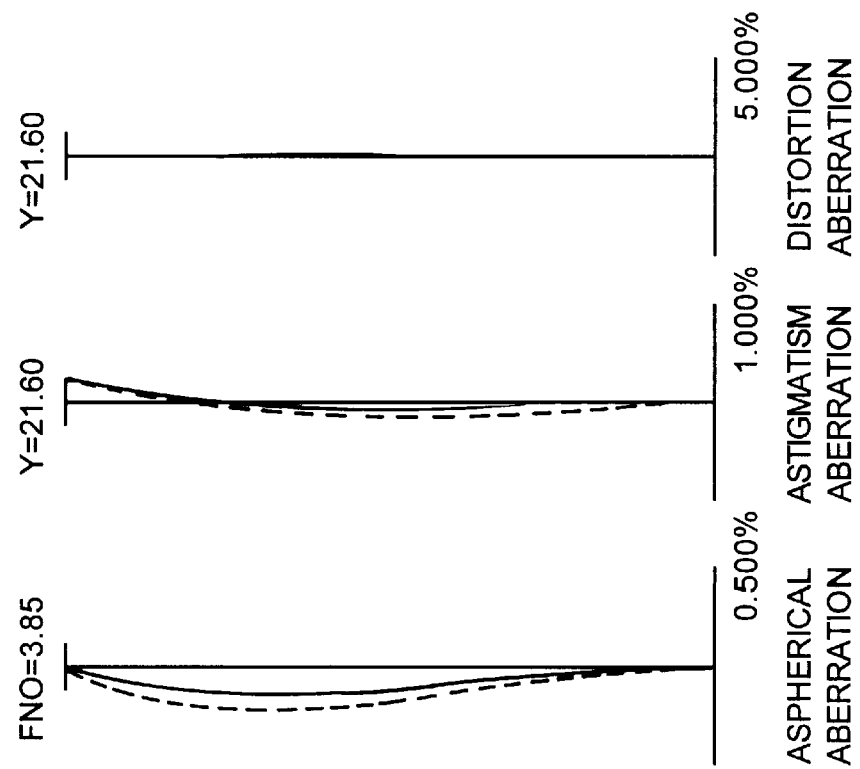

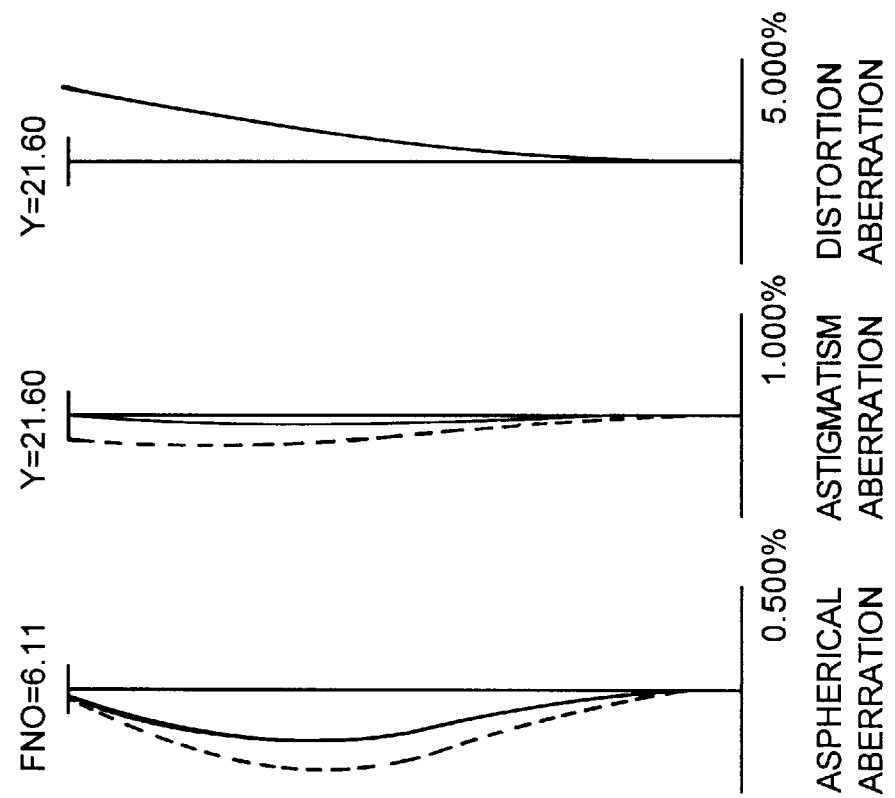
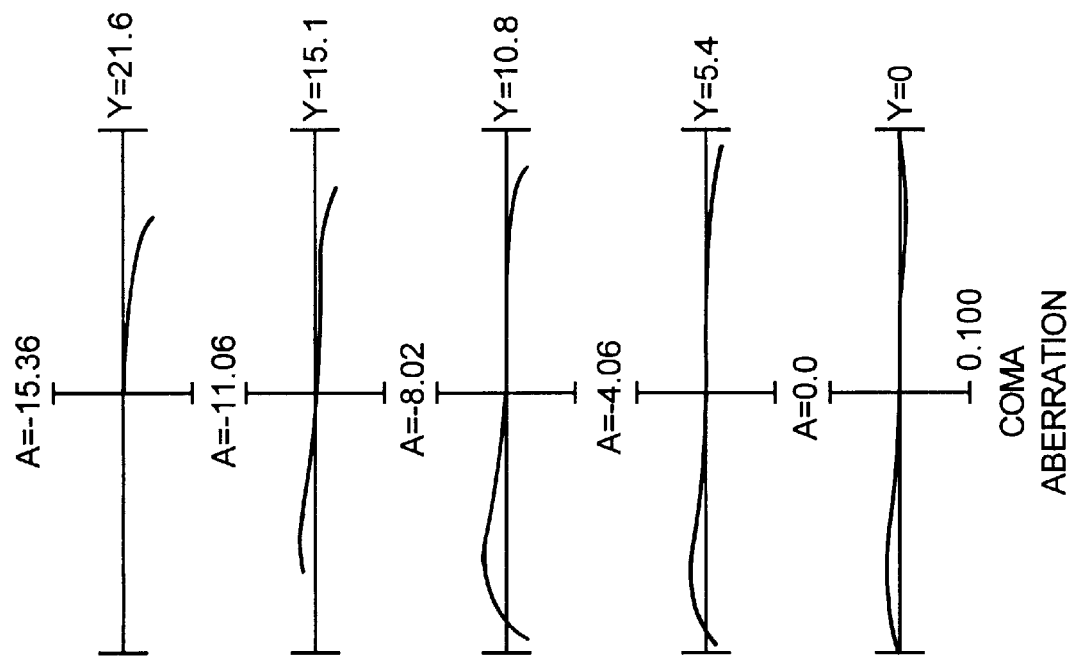

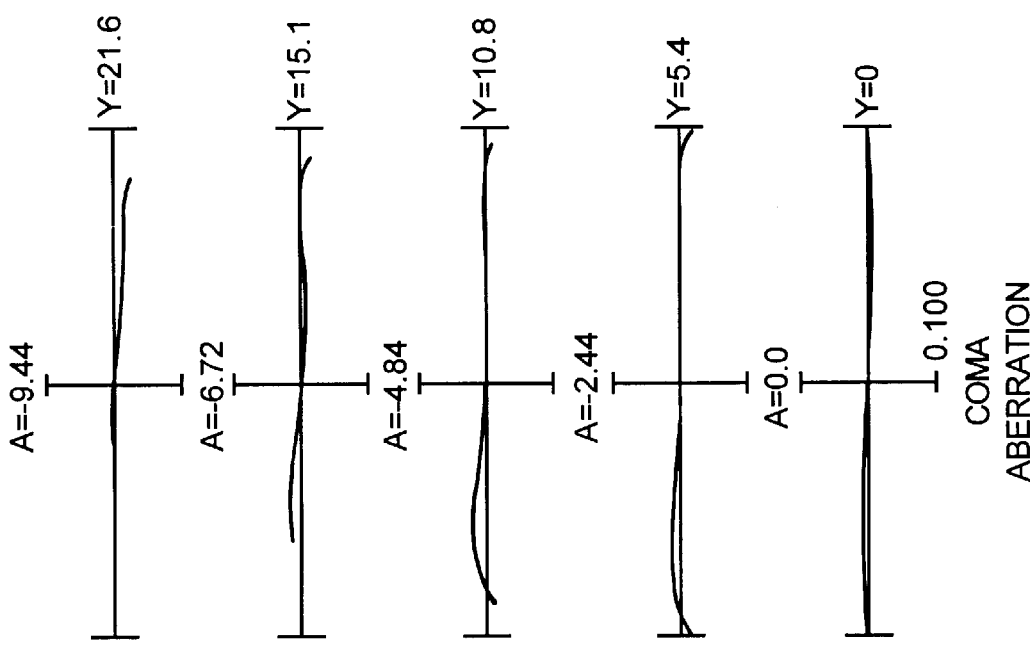
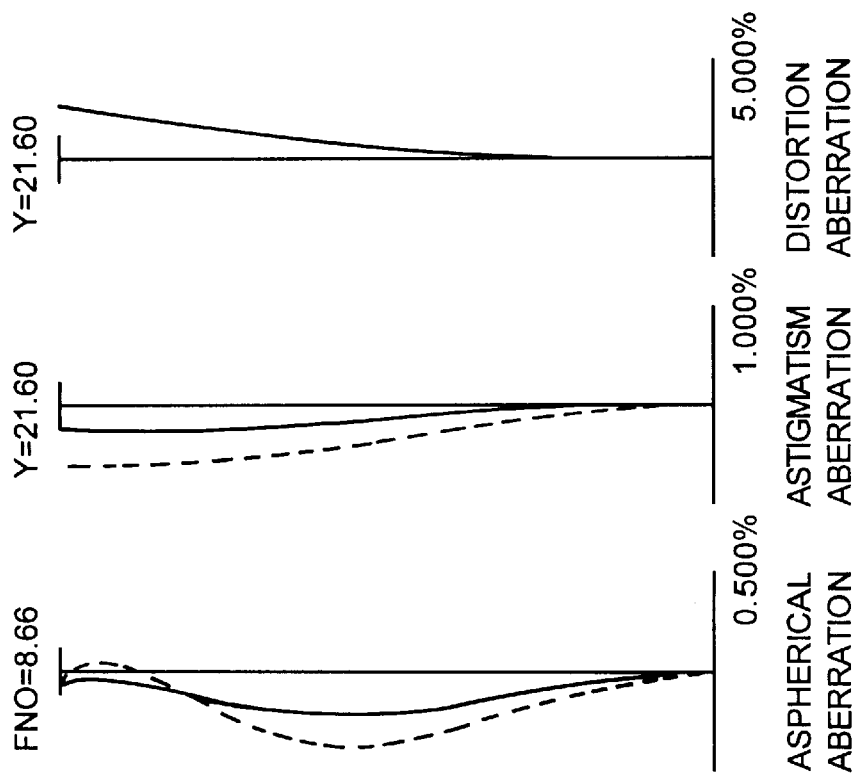

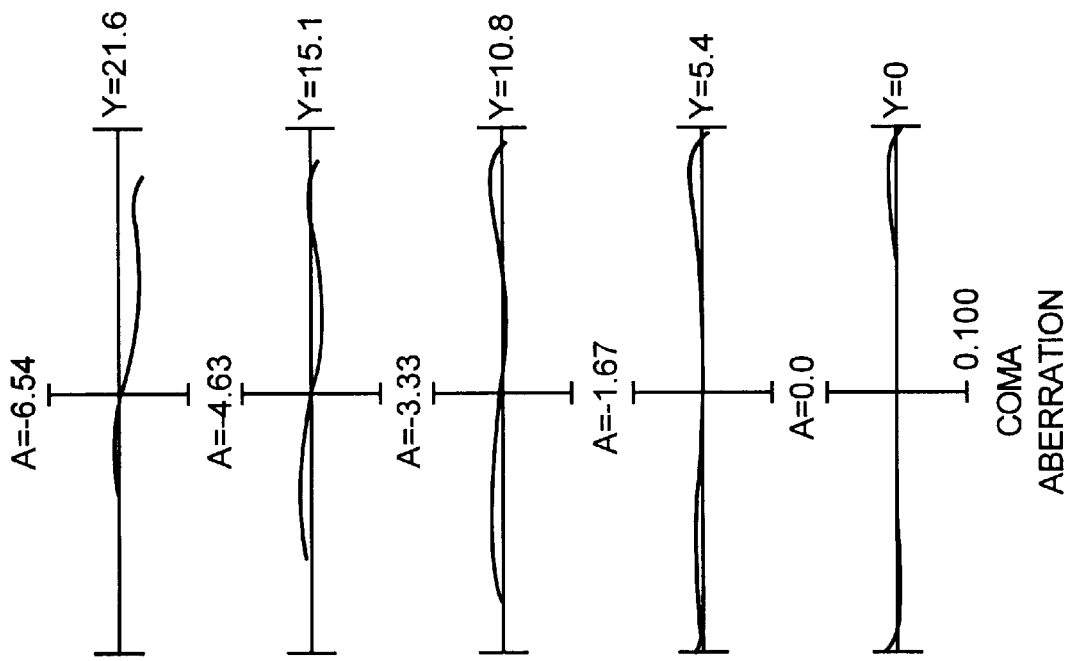
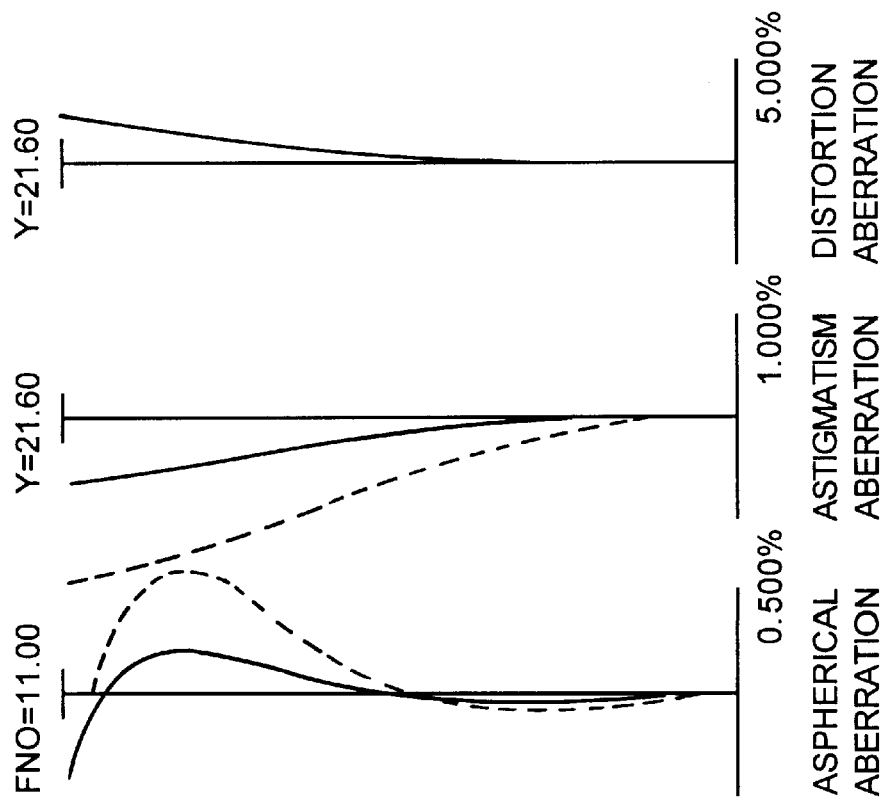

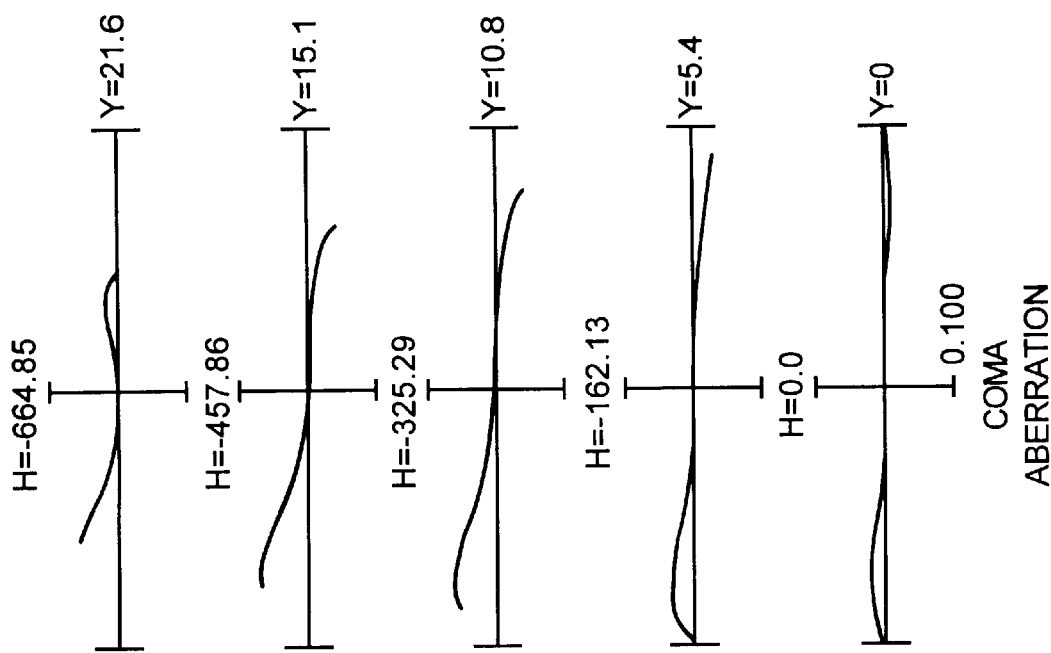
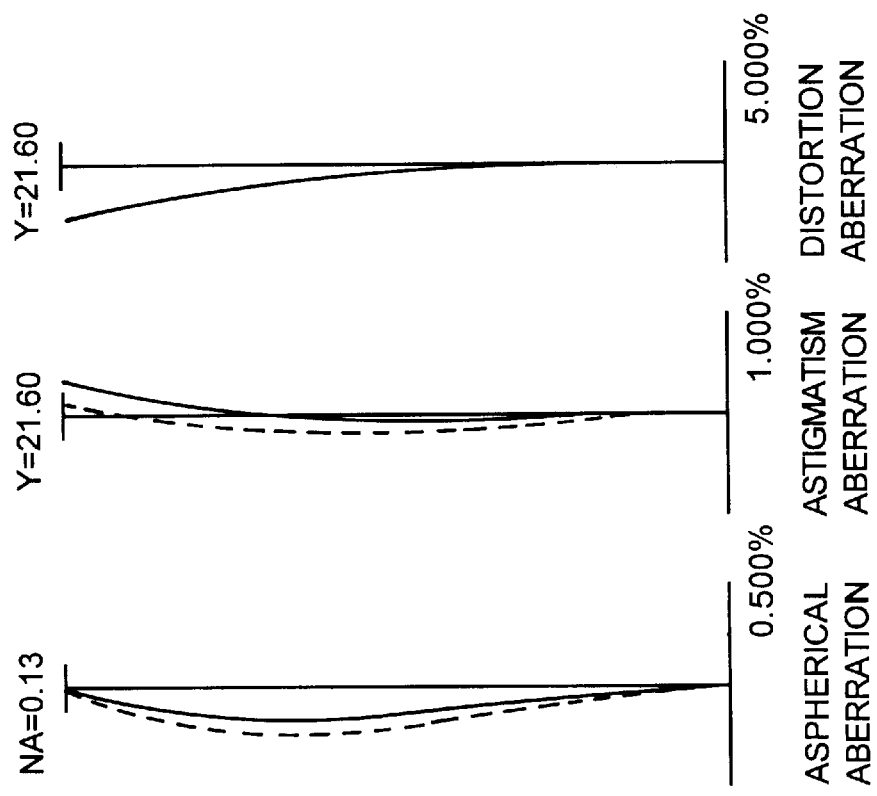

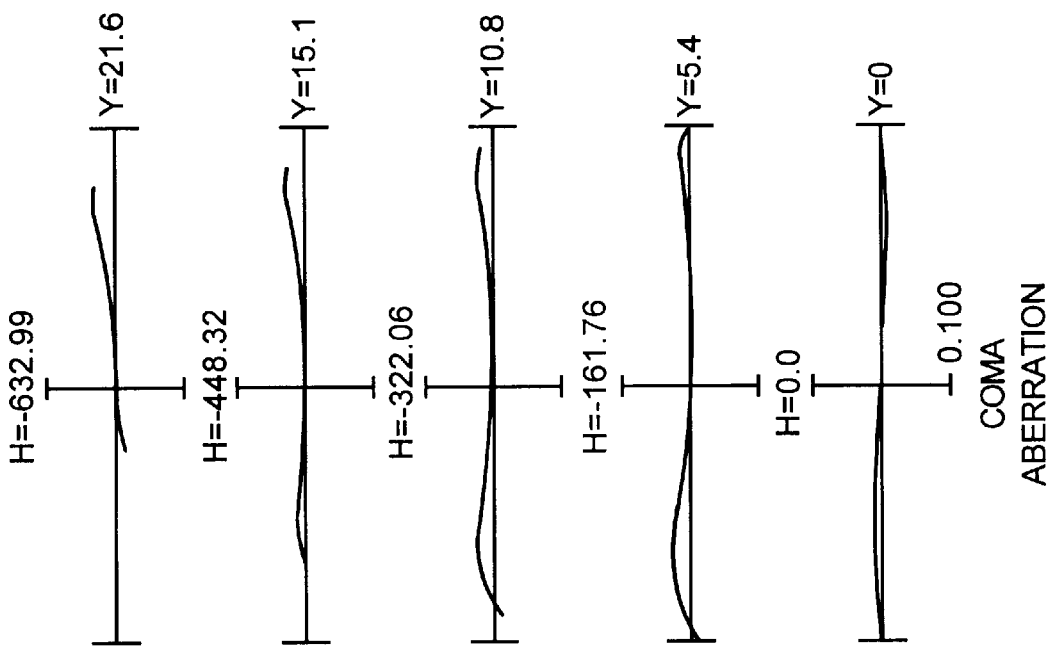
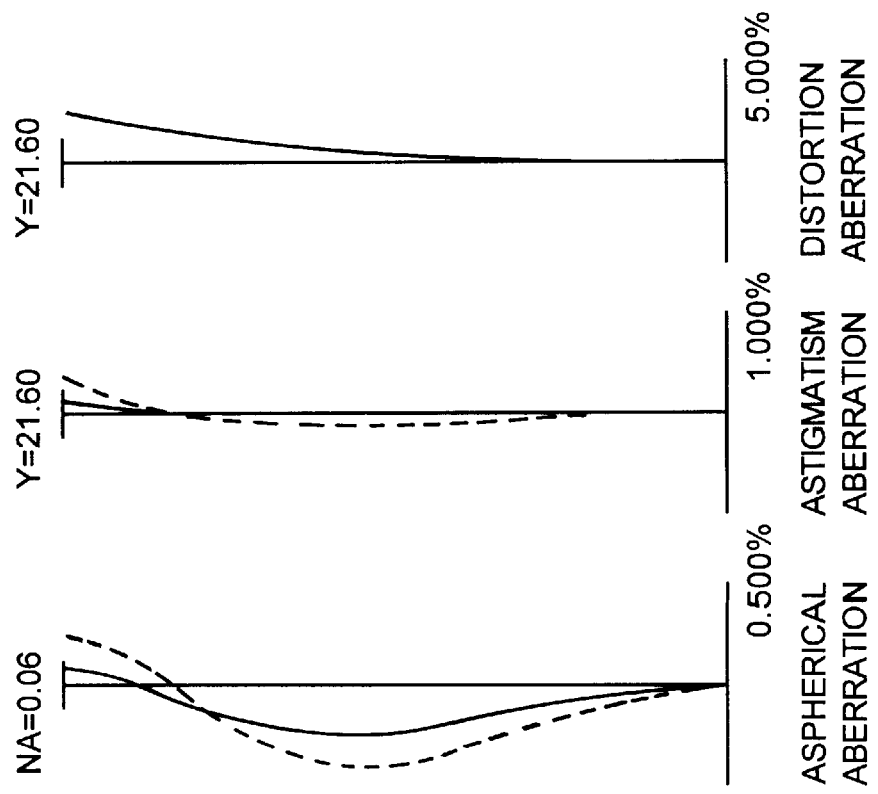

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

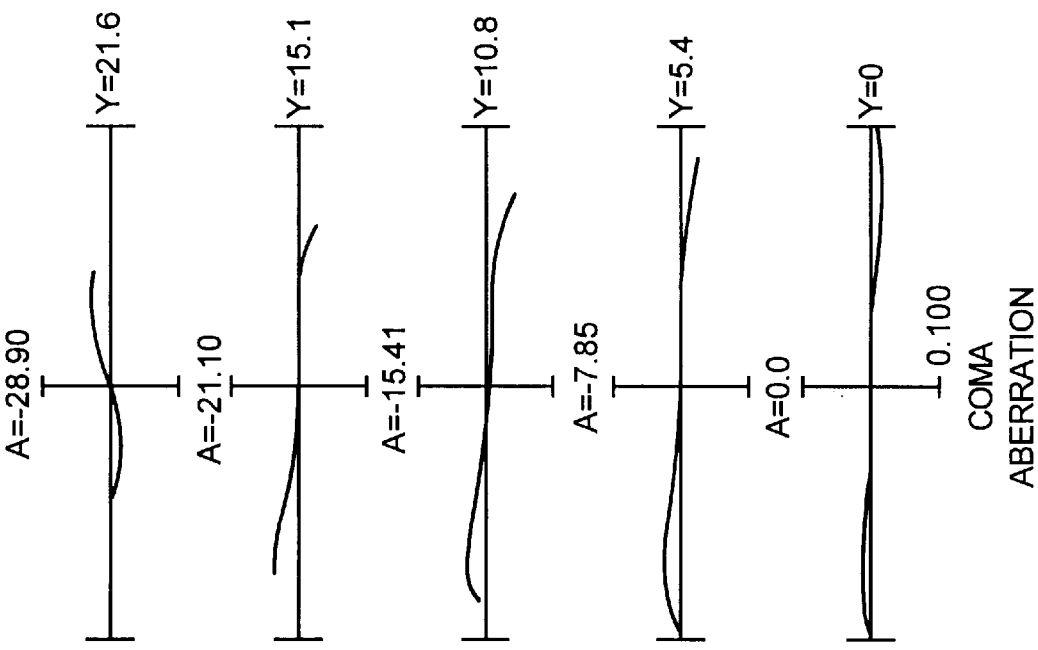
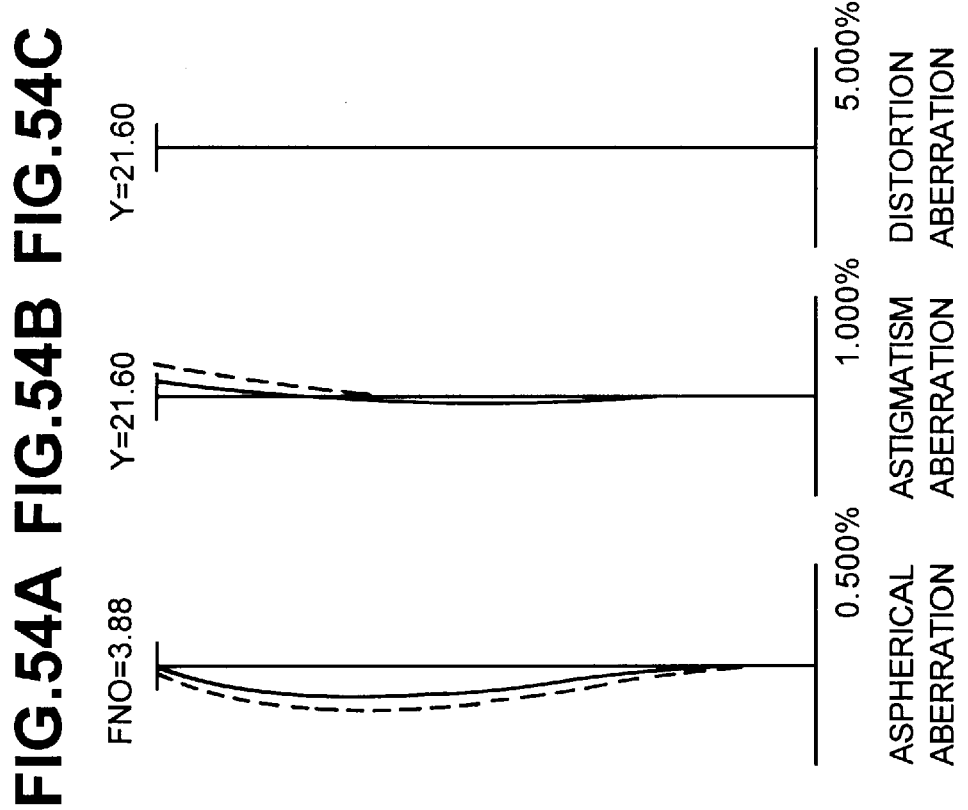

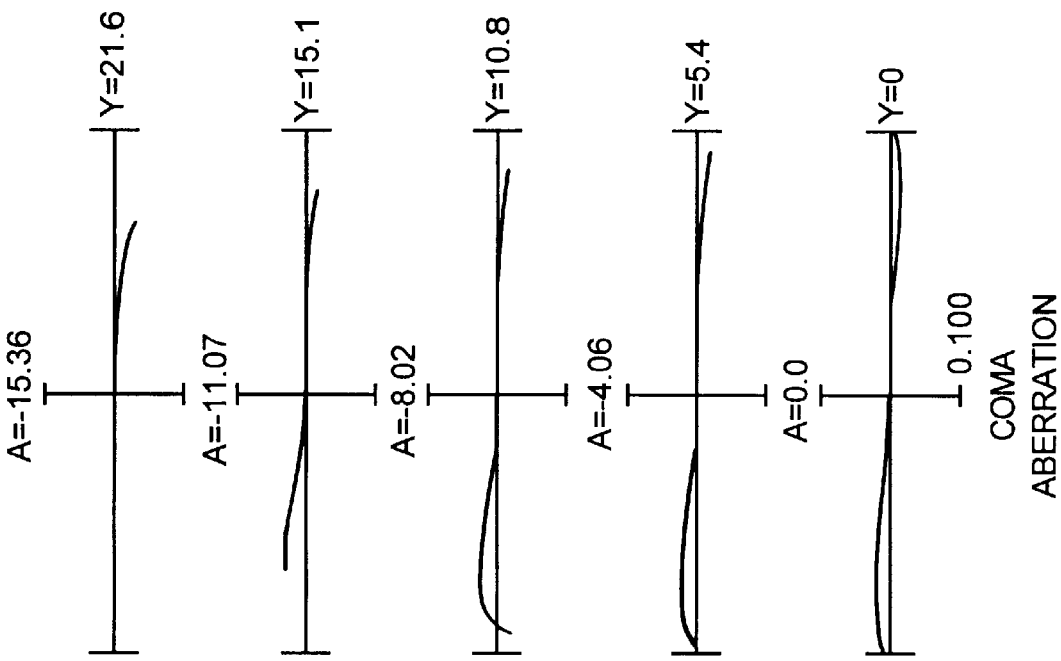
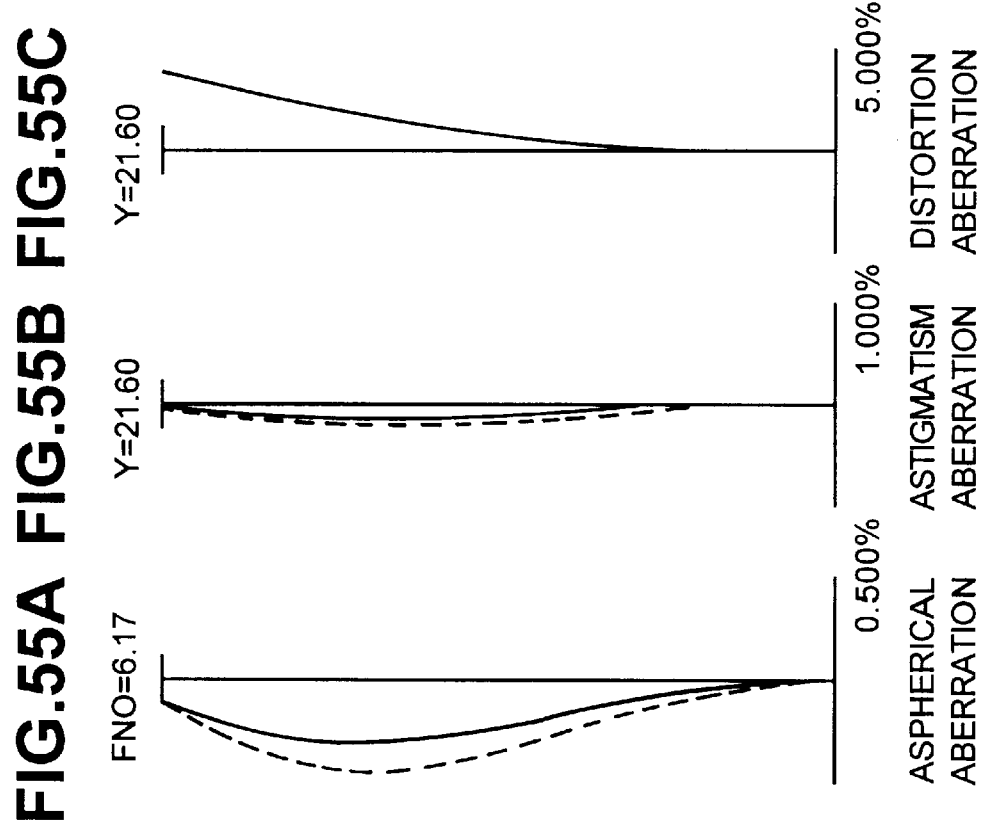

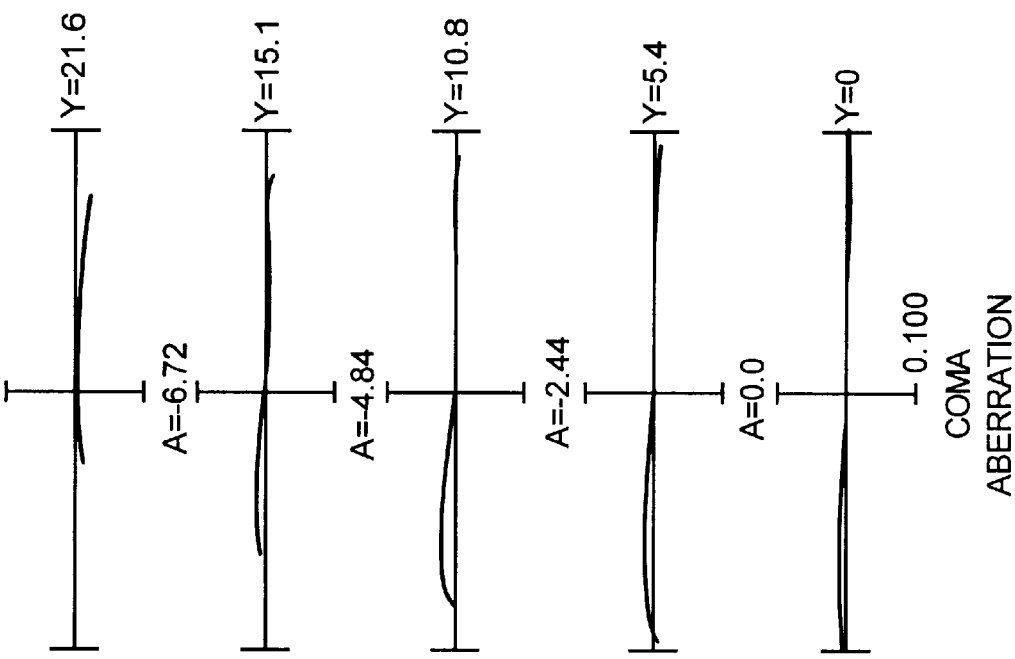
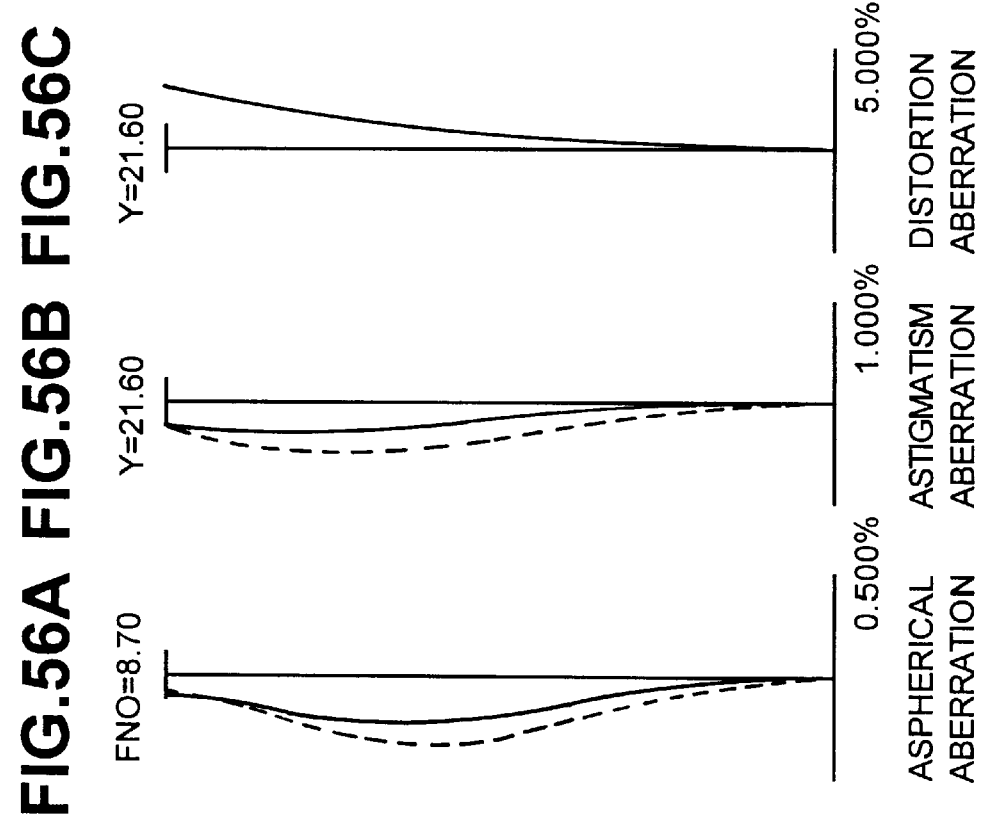

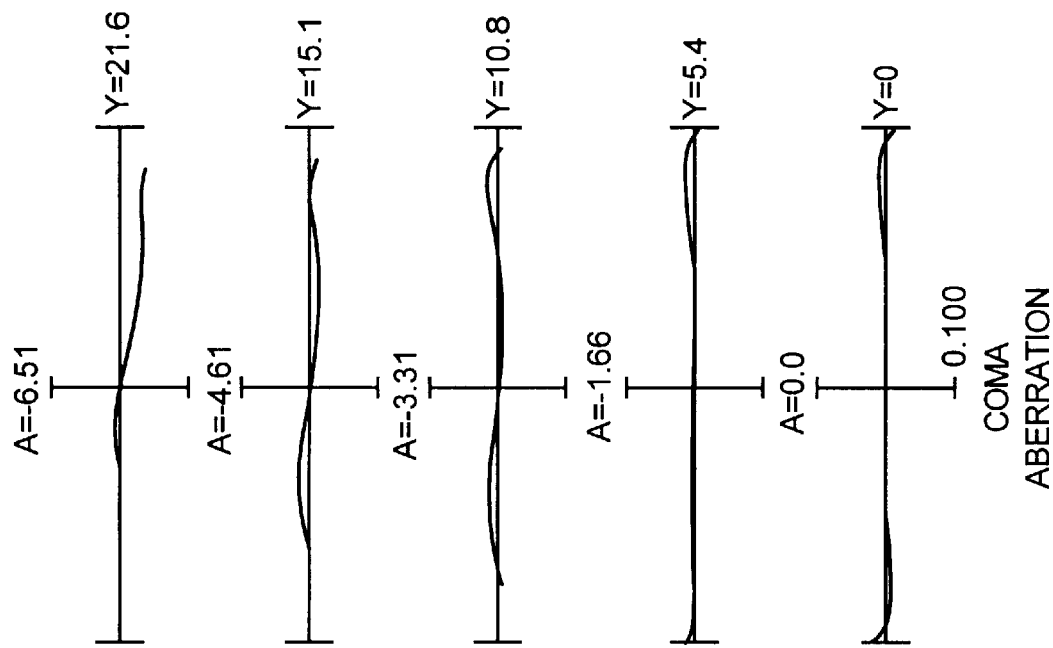
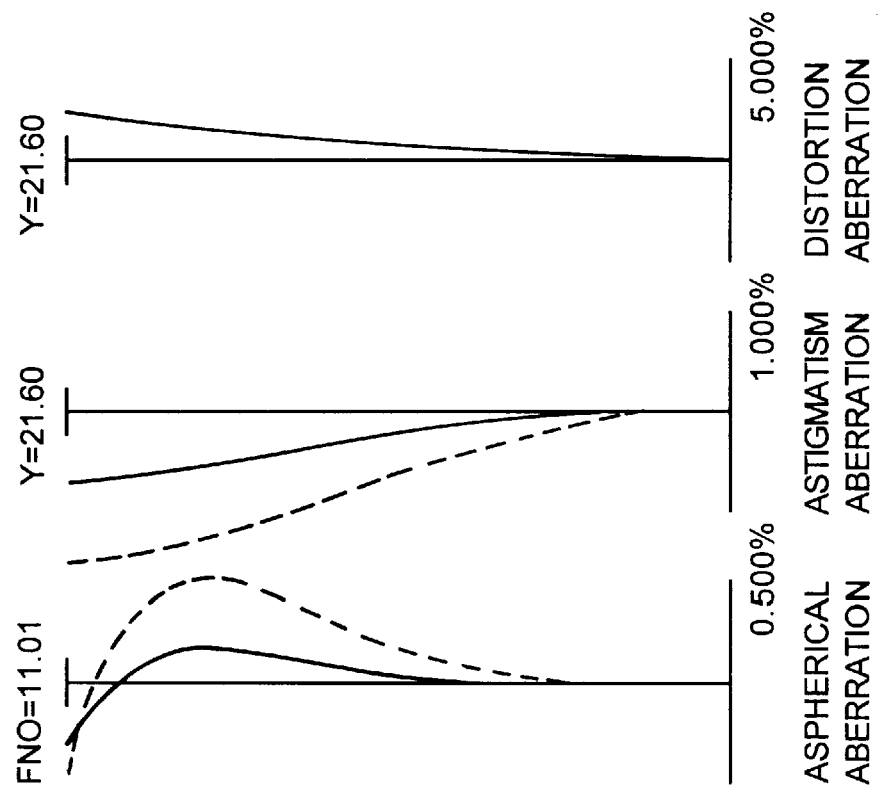

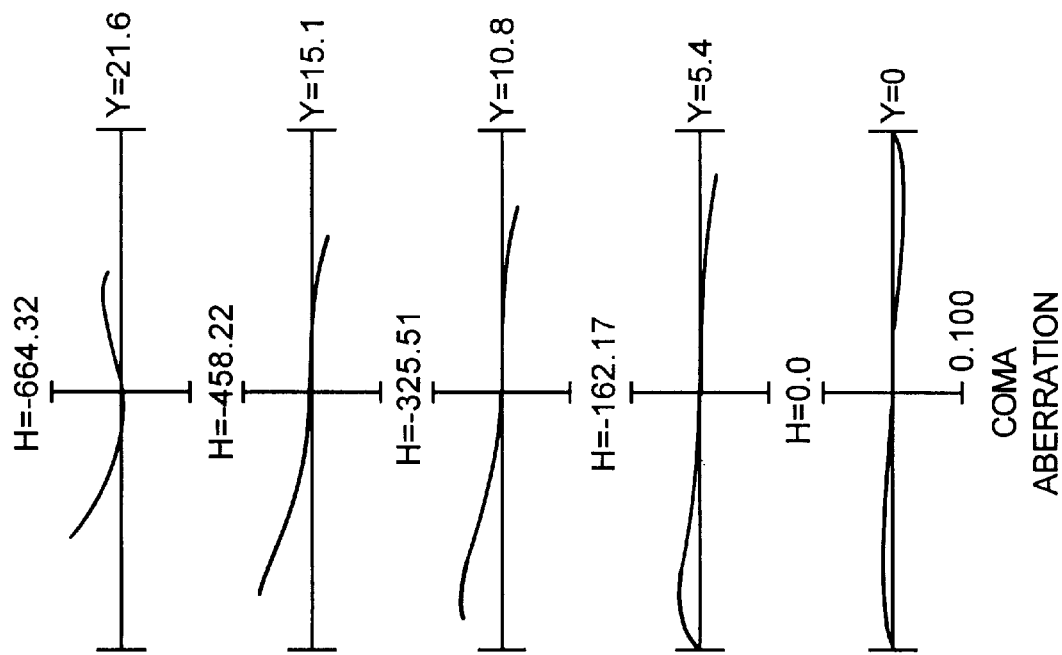
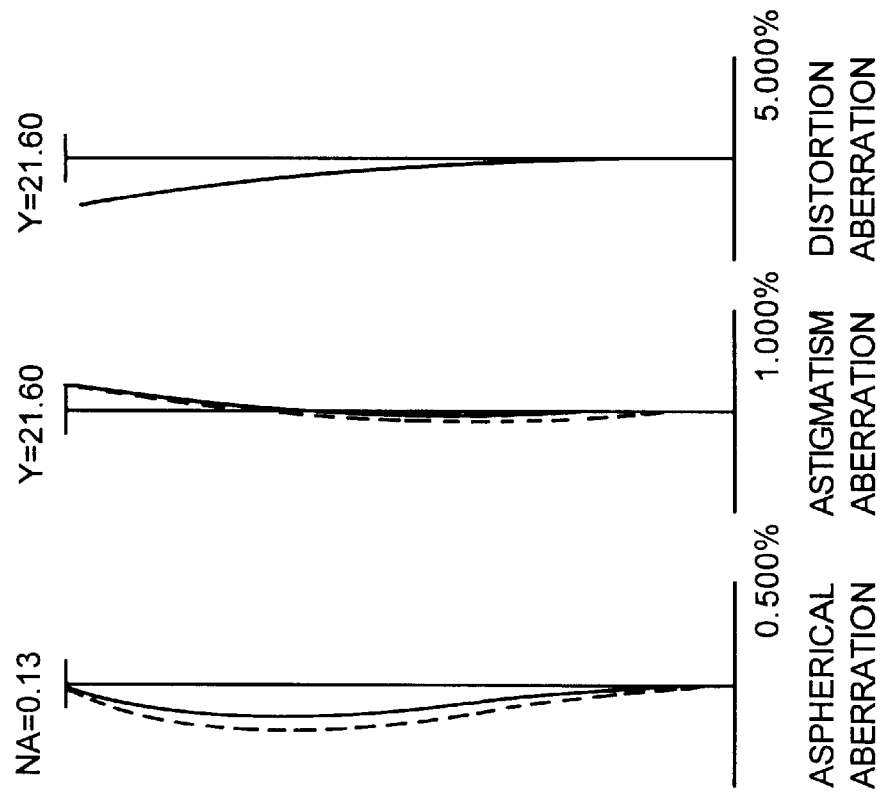

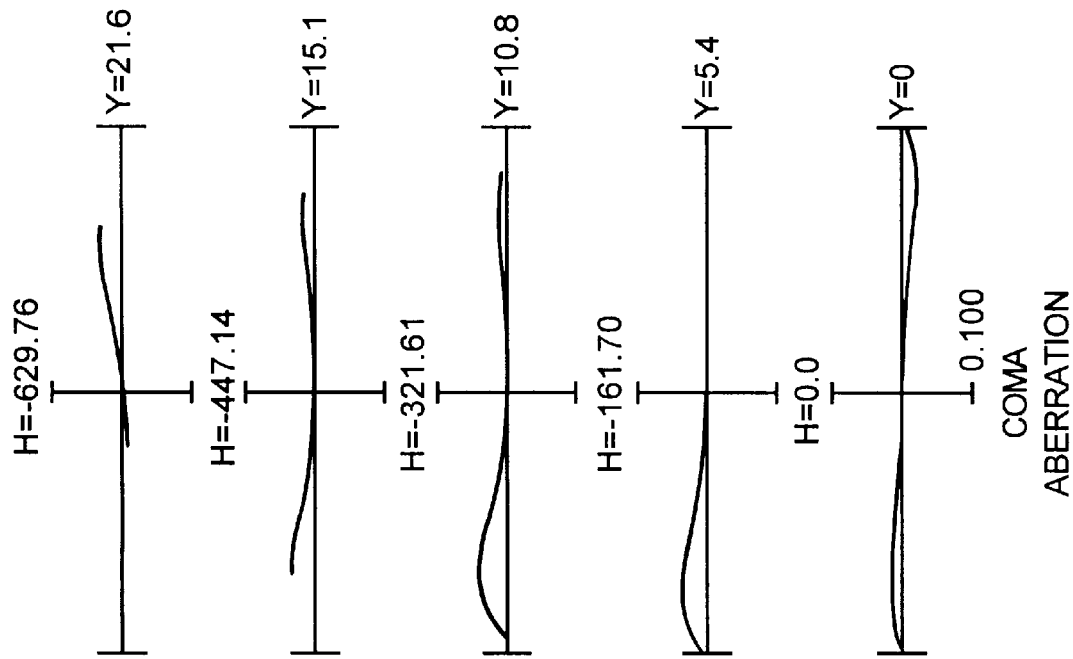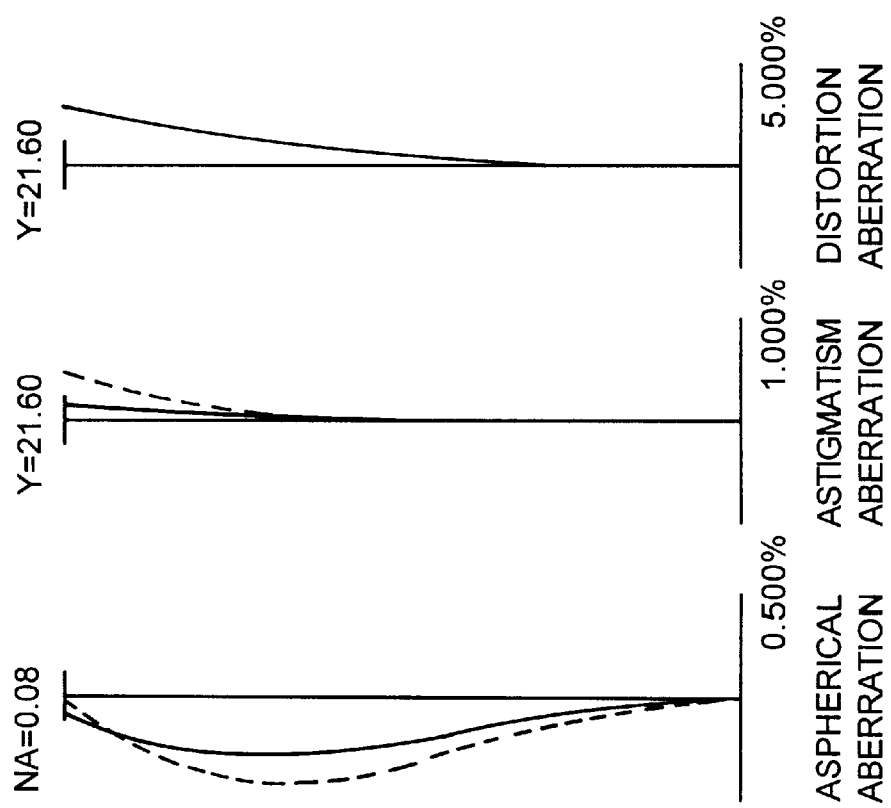

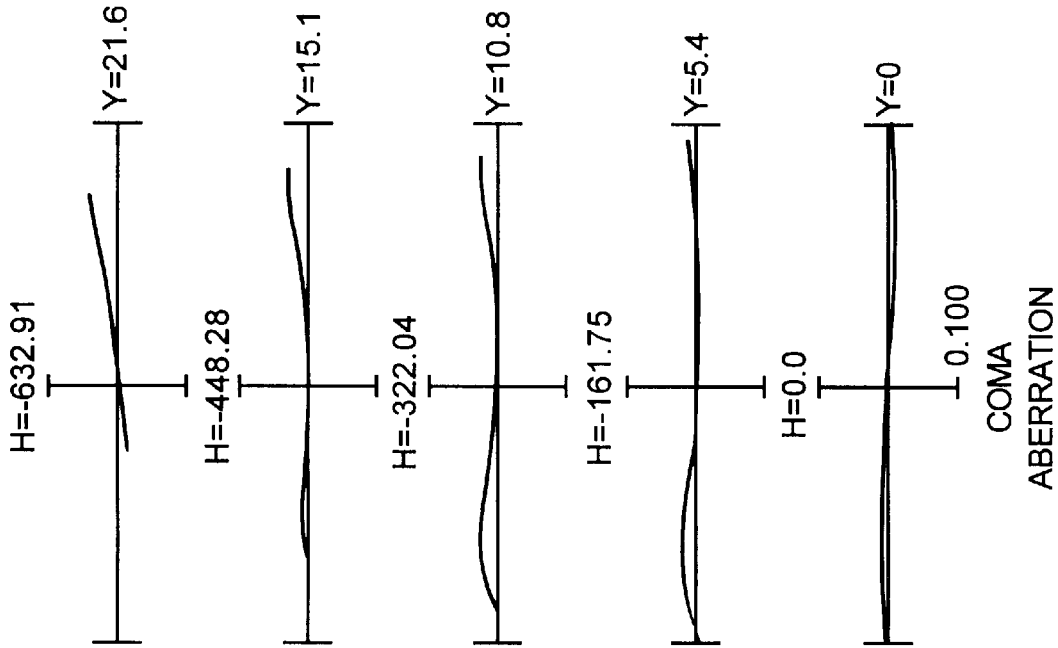
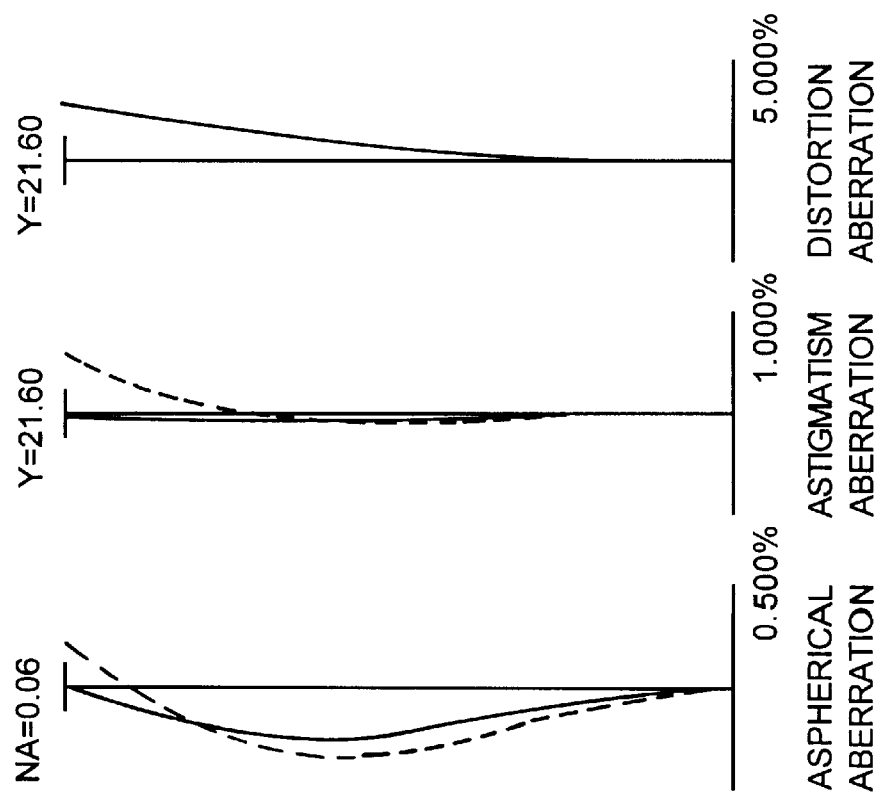

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

COMA ABERRATION WHEN
IMAGE IS SHIFTED

VARIABLE FOCAL LENGTH OPTICAL SYSTEM

BACKGROUND OF THE INVENTION

1. Field of the Invention

The present invention relates to a compact variable focal length optical system which is suitable for a high zoom ratio.

The invention also relates to a variable focal length optical system which is capable of shifting images. Such images are shifted by moving a sub-lens group in a direction almost orthogonal to the optical axis.

2. Description of Related Art

Zoom lenses are becoming popular in phototaking optical systems for still cameras, video cameras, etc. A major trend is moving toward cameras which have lenses providing a zoom ratio of over 3 times. These lenses are referred to as zoom lenses with high zoom ratios.

Such a camera normally uses a 35-mm zoom lens with which a field angle having a focal length of about 50 mm is included in its focal length range. A so-called multiple group zoom lens which is constructed by three or more movable lens groups for zooming is used for high zoom ratio zoom lenses.

Also, integrated cameras, in which a phototaking optical system and a camera main body are integrally constructed, should be portable, small in size and light in weight. For this reason, various proposals have been made for zoom lenses to contribute to small size and light weight. In such zoom lenses, a long focal length accompanies a zoom ratio increase.

If the shutter speed is slow, moreover, then a blurred image is produced during exposure due to vibrations of the camera caused by hand-held vibrations, etc. Poor photography results.

In general, it is known that an image is shifted when a lens group forming a part of the lens groups constituting a lens system (hereinafter denoted to as "a shift lens group") is moved in a direction approximately orthogonal to the optical axis. An optical system with which an excellent imaging performance can be obtained, even when a shift lens group is shifted, is referred to as an optical system which is capable of shifting images.

A so-called vibration reduction optical system, which is constructed with an optical system capable of shifting images, a vibration sensor for sensing vibrations of the optical system and outputting data on the vibrations, and a driving system for moving a shift lens group, has been used in order to solve the problems of poor photographing due to the hand-held vibrations mentioned above. The vibration reduction optical system shifts an image by moving a shift lens group through a driving system so that vibrations of the optical system caused by hand-held vibrations and so on are sensed by a vibration sensor and deviations of an image point, caused by the vibration of the optical system, are canceled. Thus, in the vibration reduction optical system, deviations of an image point caused by the vibration of the optical system, that is, a blurred image, can be corrected with a forcefully produced image shift.

In conventional high zoom ratio zoom lenses, however, if the focal length becomes long in the maximum telephoto state for high zoom ratio, the entire length of the lens system increases and the diameter of a stop increases. This results in a large-size lens system and a large-size camera with lost portability.

Moreover, because it is difficult to hold compact and light cameras without vibrations, it is easy to cause vibrations when pressing a release button; consequently, blurred images are produced in many cases. In particular, in photographic lenses having a long focal length provided for increasing a variable magnification ratio, even a small vibration of a lens system easily generates a largely blurred image, resulting in poor photographing.

In this situation, it is possible, by installing a vibration reduction optical system in a camera, to correct deviations of an image point due to vibrations of a camera caused by hand-held vibrations. However, vibration reduction optical systems have excessive restrictions because of aberration corrections. This requires a long overall lens system and a large aperture stop diameter, making the entire lens system large. Consequently, the portability of a camera body is further reduced.

SUMMARY OF THE INVENTION

The present invention has been devised taking into account of the above problems. A primary objective is to provide a variable focal length optical system which is compact and suitable for high zoom ratio.

Another objective is to provide a compact variable focal length optical system capable of shifting images which is suitable for high focal length zoom ratio.

The present invention provides a variable focal length optical system having an object side and including, in sequence from the object side, first, second and third lens groups. The first lens group has a positive refractive power and the third lens group has a negative refractive power.

When positions of the lens groups are changed from a maximum wide-angle state to a maximum telephoto state at least the first lens group is moved toward the object side so as to increase a distance between the first and second lens groups and to change a distance between the second and third lens groups. When f2 is a focal length of the second lens group and f3 is a focal length of the third lens group, the following conditional equation is satisfied:

$$-0.2 < f3/f2 < 0.2.$$

According to a preferable form of the present invention, when f1 is a focal length of the first lens group, fw is a focal length of the total optical system in the maximum wide-angle state, and ft is a focal length of the total optical system in the maximum telephoto state, the following conditional equation is satisfied:

$$0.8 < f1/(fw \times ft)^{1/2} < 1.5.$$

It is preferable for the present invention to include a fourth lens group, having a positive refractive power, positioned on the image side of the third lens group. A distance between the third and fourth lens groups is decreased when the positions of the lens groups are changed from the maximum wide-angle state to the maximum telephoto state.

Further, it is preferable for the present invention to include a fifth lens group having a negative refractive power, positioned on the image side of the fourth lens group. When the positions of the lens groups are changed from the maximum wide-angle state to the maximum telephoto state, at least the fifth lens group is moved toward the object side so as to decrease a distance between the fourth and fifth lens groups. When fw is a focal length of the total optical system in the maximum wide-angle state, ft is a focal length of the total optical system in the maximum telephoto state, Bfw is a back focal distance in the maximum wide-angle state, and Bft is a back focal distance in the maximum telephoto state, the following conditional equation is satisfied:

$$0.3 < (Bft \times Bfw)/(ft-fw) < 0.6.$$

The present invention further provides a variable focal length optical system capable of shifting images having object and image sides. A first lens group has a positive refractive power; a second lens group has a negative refractive power and is positioned adjacent to the lens group on the object side, and a third lens group is positioned adjacent to the lens group on the image side.

A distance between the first and second lens groups is decreased and a distance between the second and third lens groups is changed when changing positions of the lens groups from a maximum wide-angle state to a maximum telephoto state. The first lens group has at least two sub-lens groups. One of the two sub-lens groups is moved in a direction approximately orthogonal to the optical axis to shift an image along a direction almost orthogonal to the optical axis. When fs is a focal length of the first lens group and fh is a focal length of the sub-lens group, the condition is satisfied:

$$0.3 < fs/fh < 0.6.$$

According to another preferable form of the present invention, an aperture stop is provided within or adjacent to the first lens group.

The third lens group has a negative refractive power and is moved toward the object side when changing the positions of the lens groups from the maximum wide-angle state to the maximum telephoto state.

When $\beta 5w$ is a lateral magnification of the third lens group in the maximum wide-angle state, $\beta 5t$ is a lateral magnification of the third lens group in the maximum telephoto state, fw is focal length of the total optical system in the maximum wide-angle state, and ft is a focal length, of the total optical system in the maximum telephoto state, the following condition is satisfied:

$$0.4 < (\beta 5t/\beta 5w)/(ft/fw) < 0.7.$$

According to another aspect of the present invention, a variable focal length optical system capable of shifting images, having an object side, comprises, in sequence from the object side, first through fifth lens groups.

The first lens group has a positive refractive power, the second lens group has either a positive or a negative refractive power, the third lens group has a negative refractive power, the fourth lens group has a positive refractive power, and the fifth lens group has a negative refractive power.

At least the first and fifth lens groups are moved toward the object side when changing positions of the lens groups from a maximum wide-angle state to a maximum telephoto state so that a distance between the first and second lens groups is increased, a distance between the second and third lens groups is increased, a distance between the third and fourth lens groups is decreased, and a distance between the fourth and fifth lens groups is decreased.

A lens group including a part of the fourth lens group is moved in a direction almost orthogonal to the optical axis to shift an image along a direction almost orthogonal to the optical axis.

When $\beta 5w$ is a lateral magnification of the fifth lens group in the maximum wide-angle state, $\beta 5t$ is a lateral magnification of the fifth lens group in the maximum telephoto state, fw is a focal length of the total optical system in the maximum wide-angle state, and ft is a focal length of the total optical system in the maximum telephoto state, the following condition is satisfied:

$$0.4 < (\beta 5t/\beta 5w)/(ft/fw) < 0.7.$$

BRIEF DESCRIPTION OF THE DRAWINGS

FIGS. 3A–3D show diagrams of various aberrations in the maximum wide-angle state upon focusing on an object at infinity position in the first embodiment.

FIGS. 4A–4D show diagrams of various aberrations in the first middle focal length state upon focusing on an object at infinity position in the first embodiment.

FIGS. 5A–5D show diagrams of various aberrations in the second middle focal length state upon focusing on an object at infinity position in the first embodiment.

FIGS. 6A–6D show diagrams of various aberrations in the maximum telephoto state upon focusing on an object at infinity position in the first embodiment.

FIGS. 7A–7D show diagrams of various aberrations in the maximum wide-angle state with a photographic magnification of −1/30 in the first embodiment.

FIGS. 8A–8D show diagrams of various aberrations in the maximum first middle focal length state with a photographic magnification of −1/30 in the first embodiment.

FIGS. 9A–9D show diagrams of various aberrations in the second middle focal length state with a photographic magnification of −1/30 in the first embodiment.

FIGS. 10A–10D show diagrams of various aberrations in the maximum telephoto state with a photographic magnification of −1/30 in the first embodiment.

FIGS. 20A–20D show diagrams of various aberrations in the maximum wide-angle state upon focusing on an object at infinity position in the second embodiment.

FIGS. 21A–21D shows diagrams of various aberrations in the first middle focal length state upon focusing on an object at infinity position in the second embodiment.

FIGS. 22A–22D show diagrams of various aberrations in the second middle focal length state upon focusing on an object at infinity position in the second embodiment.

FIGS. 25A–25D show diagrams of various aberrations in the maximum first middle focal length state with a photographic magnification of −1/30 in the second embodiment.

FIGS. 26A–26D show diagrams of various aberrations in the second middle focal length state with a photographic magnification of −1/30 in the second embodiment.

FIGS. 27A–27D show diagrams of various aberrations in the maximum telephoto state with a photographic magnification of −1/30 in the second embodiment.

FIGS. 37A–37D show diagrams of various aberrations in the maximum wide-angle state upon focusing on an object at infinity position in the third embodiment.

FIGS. 38A–38D show diagrams of various aberrations in the first middle focal length state upon focusing on an object at infinity position in the third embodiment.

FIGS. 39A–39D show diagrams of various aberrations in the second middle focal length state upon focusing on an object at infinity position in the third embodiment.

FIGS. 40A–40D show diagrams of various aberrations in the maximum telephoto state upon focusing on an object at infinity position in the third embodiment.

FIGS. 41A–41D show diagrams of various aberrations in the maximum wide-angle state with a photographic magnification of −1/30 in the third embodiment.

FIGS. 43A–43D show diagrams of various aberrations in the second middle focal length state with a photographic magnification of −1/30 in the third embodiment.

FIGS. 54A–54D show diagrams of various aberrations in the maximum wide-angle state upon focusing on an object at infinity position in the fourth embodiment.

FIGS. 55A–55D show diagrams of various aberrations in the first middle focal length state upon focusing on an object at infinity position in the fourth embodiment.

FIGS. 56A–56D show diagrams of various aberrations in the second middle focal length state upon focusing on an object at infinity position in the fourth embodiment.

FIGS. 57A–57D show diagrams of various aberrations in the maximum telephoto state upon focusing on an object at infinity position in the fourth embodiment.

FIGS. 58A–58D show diagrams of various aberrations in the maximum wide-angle state with a photographic magnification of $-\frac{1}{30}$ in the fourth embodiment.

FIGS. 59A–59D show diagrams of various aberrations in the maximum first middle focal length state with a photographic magnification of $-\frac{1}{30}$ in the fourth embodiment.

FIGS. 60A–60D show diagrams of various aberrations in the second middle focal length state with a photographic magnification of $-\frac{1}{30}$ in the fourth embodiment.

DESCRIPTION OF THE PREFERRED EMBODIMENTS

Figure 1:
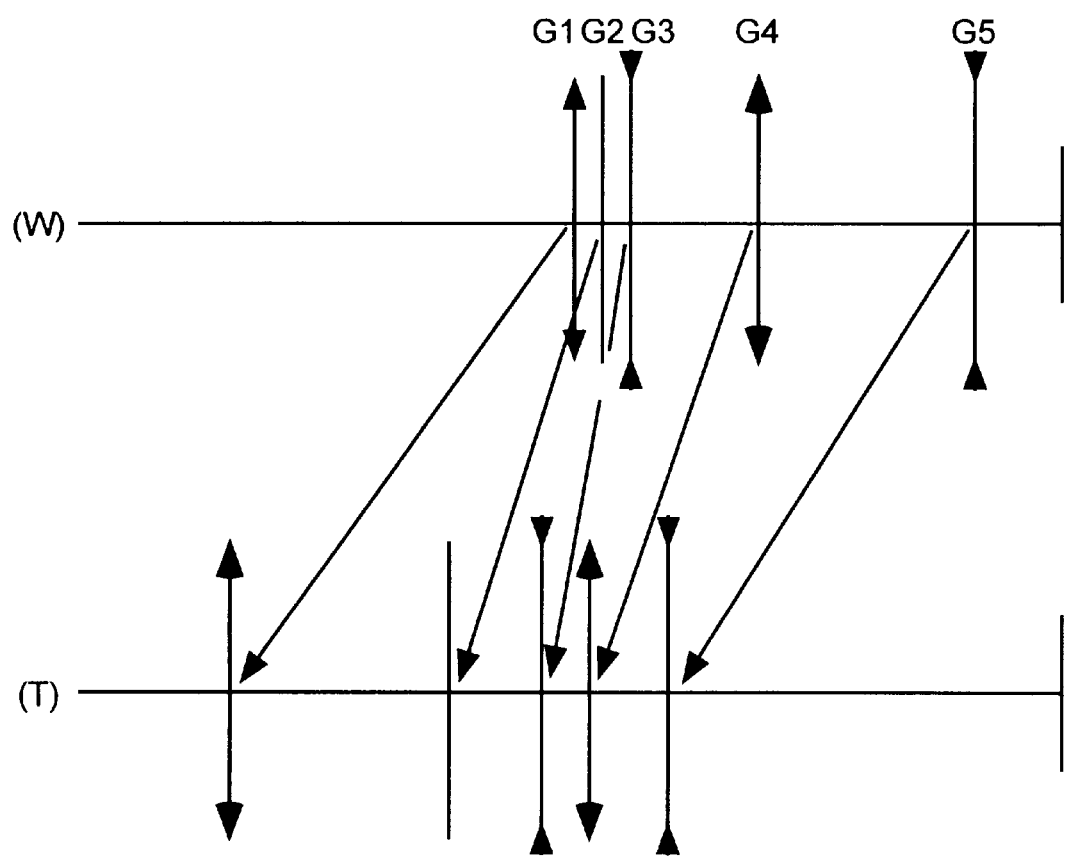
FIG. 1 is a diagram showing the refractive power distribution of the variable focal length optical system of each embodiment of the present invention and a shifting condition of each lens group during variable focal length from the maximum wide-angle state (W) to the maximum telephoto state (T).

First, a general theory will be described as it relates to a variable focal length optical system suitable for integrated-style cameras, such as lens-shutter style cameras, in which phototaking optical systems are installed inside camera main bodies.

A variable focal length optical system used for such an integrated lens-camera is not limited in a back focus. Therefore, the system employs a refractive power arrangement which provides a telephoto-type refractive power suitable for a small size. In such an arrangement, a negative lens group is positioned closest to an image in the optical system.

An aperture stop is located on the object side of the negative lens group. When changing the positions of the lens groups from the maximum wide-angle state (the state of the shortest focal length) to the maximum telephoto state (the state of the longest focal length), a distance between the aperture stop and the negative lens group is shortened and the negative lens group is moved toward the object side. Moving the negative lens group toward the object side from the maximum wide angle state to the maximum telephoto state makes it possible to use the negative lens group for change in a focal length (for increasing a lateral magnification of the negative lens group in the maximum telephoto state greater than the maximum wide-angle state). Thus, by shortening the distance between the aperture stop and the negative lens group and moving the negative lens group toward the object side, deviations in aberrations not on the axis caused when changing the positions of the lens groups can be corrected in an excellent way. At the same time, a high zoom ratio to a certain degree can be obtained.

If the back focal distance is too short at the wide-angle end position, however, a shadow of dust on the imagewise surface is recorded on the film. Therefore, it is preferable to set a proper value for the back focal distance in the maximum wide-angle end position so that a lateral magnification of the negative lens group is made almost constant in the maximum wide-angle state.

Further, the positive lens group is located closest to the object side in a variable focal length optical system. The positive lens group is moved toward the side in the maximum wide-angle state to minimize lens diameters of the positive lens group. On the other hand, at the telephoto end, a distance between the positive lens group and a lens group positioned on the image side of the positive lens group is increased to strongly converge light rays at the positive lens group, thus shortening the entire length of the lens system to a certain degree.

Compact multiple group zoom lenses which are suitable for high zoom ratio are known as, for example, (1) a positive-positive-negative three group zoom lens, (2) a positive-negative-positive-negative four group zoom lens, (3) a positive-negative-positive positive-negative five group zoom lens, and (4) a positive-negative-negative-positive-negative five group zoom lens.

In any multi-group type zoom lens, as described above, a positive lens group is positioned closest to the object side and a negative lens group is positioned closest to the image side in the optical system. In addition, arranged between the positive and negative lens groups is a positive lens group (for zoom lenses of type (1)) or multiple lens groups having a positive synthetic refractive power overall (for zoom lenses of types (2) through (4)).

When the lens groups are shifted along the optical axis by a small amount, however, the position of an image plane is moved in relation to the square of the lateral magnification. For this reason, if the zoom ratio for zoom lenses of type (1) exceeds three, then a lateral magnification of the negative lens group becomes extremely large in the maximum telephoto state, making it difficult to ensure a predetermined optical performance.

Also, with zoom lenses of types (2) through (4), a synthetic focal length of the lens groups positioned between the positive and negative lens groups is increased positively in the maximum telephoto state as compared to the maximum wide-angle state. The synthetic principal point is also shifted toward the object side. The lateral magnification of the negative lens group, therefore, does not increase very much.

Based on the above study, the present invention provides a typical lens layout of a five-lens-group type. Such a layout consists of, sequentially from the object side, a first lens group G1 having a positive refractive power, a second lens group G2 having a weak refractive power, a third lens group G3 having a negative refractive power, a fourth lens group G4 having a positive refractive power, and a fifth lens group G5 having a negative refractive power. When the positions of the lens groups are changed from the maximum wide-angle state to the maximum telephoto state, at least the first and fifth lens groups G1 and G5 are shifted toward the object side so that a distance between the first and second lens groups G1 and G2 is increased, a distance between the second and third lens groups G2 and G3 is increased, a distance between the third and fourth lens groups G3 and G4 is decreased, and a distance between the fourth and fifth lens groups G4 and G5 is decreased. With this configuration, a compact variable focal length optical system having a zoom ratio of over 3.5 can be achieved.

In the present invention, each lens group specifically functions so as to satisfy the following conditions 1 through 4, aiming for high performance and high zoom ratio:

(1) The lateral magnification of the fifth lens group G5 is set to a proper value in the maximum telephoto state;

(2) The position of a principal point of the first lens group G1 and that of the second lens group G2 are set properly;

(3) An aperture stop is positioned near the fourth lens group; and (4) The aberration correction performance of the second lens group G2 and that of the third lens group G3 is clarified.

In the same manner as conventional multiple group zoom lenses, the present invention employs a typical lens layout in which a fifth lens group G5 having a negative refractive power is positioned closest to the image side. Also, when the positions of the lens groups are changed from the maximum wide-angle state to the maximum telephoto state, the fifth lens group G5 is moved toward the object side.

If the lateral magnification of the fifth lens group G5 becomes too large in the maximum telephoto state, the change in lateral magnification of the fifth lens group G5 becomes large from the maximum wide-angle state to the maximum telephoto state. This causes poor prevention of deviations in aberrations not on the axis caused due to the change in positions of the lens groups, making it impossible to obtain a predetermined optical performance.

On the other hand, if the lateral magnification of the fifth lens group G5 is too small in the maximum telephoto state, it enlarges deviations in various aberrations generated in the lens group which is positioned on the object side of the fifth lens group G5, thus making it impossible to obtain a predetermined optical performance. In either case, using aspherical surfaces and increasing the number of lenses may ensure a predetermined optical performance. This does not, however, allow a lens system to be low in cost and light in weight. For this reason, it is desirable to set a proper value for a lateral magnification of the fifth lens group G5 in the maximum telephoto state. Thus, condition (1) is satisfied.

Because the back focal length is short in the maximum wide-angle state, a positive distortion aberration is greatly generated at the fifth lens group G5. In the present invention, the synthetic focal length of the first through third lens groups G1 through G3 is set to a negative value in the maximum wide-angle state so that the refractive power arrangement of the total optical system becomes close to being symmetric so as to correct positive distortion aberrations excellently.

In the present invention, in particular, by constructing the second lens group G2 with a negative sub-group and a positive sub-group positioned behind the negative group on the image side, the principal point of the second lens group G2 (the principal point when light rays enter from the object side) can be positioned closer to the object side than the first lens group G1 to effectively generate negative distortion aberrations.

In the maximum telephoto state, the entire length of the lens system can be shortened by locating the principal point of the first lens group G1 (the principal point when light rays enter from the object side) in the first lens group G1 or behind the first lens group G1 closer to the object side. For this reason, it is desirable to position the positive lens of the first lens group G1 closest to the object side.

Note that if the principal point of the first lens group G1 is very far away from the first lens group G1 toward the object side, light rays not on the axis passing through the first lens group G1 in the maximum telephoto state are located away from the optical axis, thus enlarging the lens diameters. On the other hand, if the principal point of the first lens group G1 is positioned behind the first lens group G1 on the image side, then it is clear that the entire length of the lens system would be increased.

Condition (2) is critical for the reason set forth above.

As noted previously, with the basic lens layout of the present invention, the first through third lens groups G1 through G3 create a negative synthetic refractive power, the fourth lens group G4 has a positive refractive power, and the fifth lens group G5 has a negative refractive power. On the whole, a negative-positive-negative symmetric arrangement of refractive power is obtained. Thus, the fourth lens group G4 has an extremely strong positive refractive power; therefore, it is preferable to make the fourth lens group G4 in a shape facilitating enlargement of the lens diameters. By arranging an aperture stop to satisfy condition (3), light rays not on the axis passing through the fourth lens group G4 are not displaced from the optical axis; thus, the fourth lens group G4 can be constructed with fewer lenses.

With the arrangement of an aperture stop which satisfies the condition (3), light rays not on the axis pass through the periphery of the second lens group G2 while they pass through the vicinity of the optical axis of the third lens group G3. For this reason, by correcting axial aberrations at the third lens group G3 and correcting aberrations generated away from the axis at the second lens group G2, the second and third lens groups G2 and G3, can be constructed with fewer lenses. This results in light weight and small lens diameters due to thin lenses. For these reasons, condition (4) is important.

In the present invention, therefore, it is preferable to position an aperture stop within or adjacent to the fourth lens group G4.

Each of the conditional equations of the present invention is described hereafter.

In the present invention, the following conditional equation (1) is satisfied:

$$-0.2 < f3/f2 < 0.2 \quad (1)$$

where f2 is a focal length of the second lens group G2 and f3 is a focal length of the third lens group G3.

The conditional equation (1) defines an appropriate range of the ratio between the focal lengths of the second and third lens groups G2 and G3.

If conditions are such that the upper value of the conditional equation (1) is exceeded, then the diverging power of the second lens group G2 becomes strong, increasing the entire length of the lens system in the maximum telephoto state.

On the other hand, if conditions are such that the lower value of the conditional equation (1) is not met, then the converging power of the second lens group G2 becomes strong, making it impossible to obtain a sufficient back focal distance in the maximum wide-angle state.

A variable magnification optical system disclosed in JP Laid Open H7-92390 has a strong diverging power of the second lens group G2. This makes it difficult to shorten the entire length of the lens system when increasing the focal length of the total optical system in the maximum telephoto state so as to increase a zoom ratio; thus, this optical system could not be made acceptably compact.

In the present invention, to shorten the entire length of the lens system at the telephoto end position, it is preferable to satisfy the following conditional equation (2):

$$0.8 < f1/(fw \cdot ft)^{1/2} < 1.5 \quad (2)$$

where f1 is a focal length of the first lens group G1, fw is a focal length of the total optical system in the maximum wide-angle state, and ft is a focal length of the total optical system in the maximum telephoto state.

The conditional equation (2) defines an appropriate range of a focal length of the first lens group G1.

If conditions are such that the upper value of the conditional equation (2) is exceeded, then the converging power of the first lens group G1 becomes weak, making it difficult to shorten the entire length of the lens system in the maximum telephoto state. This is not preferable.

On the other hand, if conditions are such that the lower value of the conditional equation (2) is not met, then the converging power of the first lens group G1 is increased. Consequently, light rays not on the axis passing through the first lens group G1 become displaced from the optical axis in the maximum telephoto state, making it difficult to minimize the lens diameters. This is not preferable.

In the present invention, by reducing the increase in the lateral magnification of the fifth lens group G5 in the maximum telephoto state caused by high zoom ratio, poor performance, which is normally caused by errors in controlling the fifth lens group G5, can be prevented. Therefore, it is preferable to satisfy the following conditional equation (3) to prevent poor performance due to errors in high zoom ratio and in control:

$$0.3 < (Bft - Bfw)/(ft - fw) < 0.6 \quad (3)$$

where Bfw is a back focal distance in the maximum wide-angle state, and Bft is a back focal distance in the maximum telephoto state.

The conditional equation (3) is used for preventing changes in the lateral magnification of the fifth lens group G5 in the maximum telephoto state with respect to that in the maximum wide-angle state in order to reduce the increase in the lateral magnification of the fifth lens group G5 in the maximum telephoto state. The fifth lens group G5 is positioned closest to the image side in the optical system. The first through fourth lens groups G1 through G4 create a positive synthetic refractive power. The fifth lens group G5 has a negative refractive power. Therefore, a long back focal distance indicates that a lateral magnification of the fifth lens group G5 is positively large. Thus, the conditional equation (3) which defines the amount of changes in the back focal distance also defines changes in the lateral magnification of the fifth lens group G5 which occur when the positions of the lens groups are changed.

In order to obtain both high zoom ratio and high performance, it is critical to prevent changes in lateral magnification of each of the lens groups caused by the changes in the positions of the lens groups. If conditions result in a value below the lower value of the conditional equation (3), then changes in lateral magnification between the second and third lens groups G2 and G3 become large when the positions of the lens groups are changed. This makes it difficult to obtain a high performance with fewer lenses.

On the other hand, if conditions result in a value exceeding the upper value of the conditional equation (3), then the lateral magnification of the fifth lens group G5 becomes too positively large in the maximum telephoto state making it impossible to prevent optical performance which is normally caused due to control errors.

In the present invention, in order to excellently correct positive distortion aberrations generated in the maximum wide-angle state and to obtain high performance, it is preferable for the second lens group G2 to include a bi-concave lens and a positive lens positioned therebehind on the image side and to satisfy the following conditional equation (4):

$$-2 < r21/fw < -0.5 \quad (4)$$

where r21 is the radius of curvature of the most-image-side lens surface in the second lens group G2.

Since the refractive power arrangement of the total optical system becomes close to being symmetric in the maximum wide-angle state it is possible to correct the positive distortion aberrations excellently. At this time, the light rays converged by the first lens group G1 are diverged to generate negative distortion aberrations. It is desirable, therefore, to set an appropriate value for the radius of curvature of the most-object-side lens surface in the second lens group G2.

If the upper value of the conditional equation (4) is exceeded, then the radius of curvature of the most-object-side lens surface in the second lens group G2 becomes small. This makes it impossible to adequately correct for positive spherical aberrations generated at the second lens group G2 and, therefore, axial aberrations caused when the positions of the lens groups are changed cannot be prevented.

Also, if conditions are such that a value is below the lower value of the conditional equation (4), then it is difficult to properly correct for the positive distortion aberrations while shortening the entire length of the lens system in the maximum telephoto state.

In the present invention, it is possible to focus on a close-distance object by shifting at least one lens group of the second through fifth lens groups G2 through G5, along the optical axis. Specifically, it is preferable to use the third lens group G3 as a focusing lens group (a lens group which moves during focusing). At this time, it is desirable for the lateral magnification of the third lens group G3 to satisfy the following conditional equation (5):

$$0.2 < (\beta 3t/\beta 3tw)/(ft/fw) < 0.7 \quad (5)$$

where β3w is a lateral magnification of the third lens group G3 in the maximum wide-angle state and β3t is a lateral magnification of the third lens group G3 in the maximum telephoto state.

The conditional equation (5) defines changes in the lateral magnification of the third lens group G3 which are caused when the position of the lens group is changed.

In general, a depth of focus is smaller in the maximum telephoto state than in the maximum wide-angle state. For this reason, positions of lenses in the focusing group need to be controlled with higher precision in the maximum telephoto state than in the maximum wide-angle state.

In the present invention, the movement of the focusing group required for focusing a given nearby object from an afocal state is larger at the telephoto end position than at the wide-angle end position. Thus, the positions of the lens groups on the optical axis at the telephoto end position are controlled with a properly high precision with respect to that at the wide-angle end position.

The amount of focusing movement (the amount which the focusing group moves during focusing), as disclosed in JP Laid Open H7-92390, can be kept small when setting an appropriate value of the lateral magnification of the focusing group. In the present invention, it is desirable to set the lateral magnification of the third lens group G3, which is a focusing group, close to zero. The lateral magnification of the third lens group G3, however, is largely non-zero at the telephoto end position as compared to that at the wide-angle end position.

If conditions are such that the upper value of the conditional equation (5) is exceeded, then the amount of focusing movement becomes large in the maximum telephoto state, requiring a complicated driving mechanism for driving the focusing group.

On the other hand, if conditions are such that the lower value of the conditional equation (5) is not met, then the control precision of the positions of the lens groups, which is required to obtain a predetermined optical performance, becomes high in the maximum telephoto state. Consequently, the focusing point of the optical system deviates largely with respect to the small amount of displacement of the focusing group in the maximum telephoto state. This is not preferable.

There is another advantage in the present invention. In order to prevent photographic failures due to image blur caused by hand-held vibrations, which normally happens with highly variable magnification zoom lenses, a vibration sensor for sensing vibrations of the optical system and a driving means may be installed together in the lens system. An entire lens group, or a part of one of the lens groups, included in an optical system is used as a shift lens and decentralizeed to shift the image so as to compensate for a blurred image (deviation of the image point) caused by vibrations of the optical system sensed by the vibration sensor. As a result, a variable focal length optical system of the present invention can be used as a vibration reduction optical system.

In particular, in the present invention, the fourth lens group G4 consists of two sub-groups. One of these sub-groups is shifted in a direction almost orthogonal to the optical axis. With this, deviations in various aberrations generated when an image is shifted can be corrected in an excellent manner.

Normally, a shift lens group (a lens group shifted in a direction almost orthogonal to the optical axis) is required to maintain an aberration-corrected state so that an excellent image can be obtained even when the image is shifted. Specifically, requirements are that (1) spherical aberrations and a sine condition are excellently corrected, and that (2) an appropriate Petzval sum is provided.

The requirement (1) is a condition for preventing eccentric coma aberrations which are generated at the center of a screen when an image is shifted by moving the shift lens group. Also, the requirement (2) is a condition for preventing the curvature of the imaging plane which is generated at the periphery of the screen when an image is shifted by moving the shift lens group.

When one entire lens group in a zoom lens is a shift lens group, the aberration-corrected state required for zooming (change in a focal length of the zoom lens) does not always coincide with the aberration-corrected state required for preventing a poor performance when an image is shifted. Particularly, it is difficult to correct greater vibrations while maintaining high optical performance. In the present invention, however, it is possible to correct greater vibrations while maintaining high optical performance by forming one lens group of three sub-groups and using the middle sub-group as a shift lens group. In the present invention, it is preferable to satisfy the following conditional equation (6) to obtain an excellent imaging performance when an image is shifted:

$$Db/fw<0.2 \qquad (6)$$

where Db is an axial distance between the aperture stop and the lens surface of the shift lens group closest to the aperture stop.

If conditions are such that the upper value of the conditional equation (6) is exceeded, then the difference in heights between axial light rays and off-axis light rays (both of which are passing through the shift lens group conditions) is increased. Consequently, deviations in various aberrations generated when an image is shifted by the shift lens group cannot be prevented unless diameters of lenses in the shift lens group are enlarged.

Note that deviations in various aberrations generated when an image is shifted can be prevented by constructing the shift lens group with more lenses. In this case, however, the optical system becomes larger and a driving mechanism for driving the shift lens group becomes complicated. This situation, therefore is not preferable.

It is desirable for the axial distance between the shift lens group and the aperture stop to be short at an arbitrary position of the lens groups between the maximum wide-angle state to the maximum telephoto state. In the present invention, since the aperture stop is located in the vicinity of the fourth lens group, the entire fourth lens group or a part of the fourth lens group G4 is shifted in a direction almost orthogonal to the optical axis to prevent variations of the optical performance. Such variations are caused when an image is shifted.

As described above, the present invention can provide a so-called vibration reduction optical system in which the entire lens group or a part of an appropriate lens group consisting of the optical system is shifted in a direction almost orthogonal to the optical axis to correct deviations of an image point caused by hand-held vibrations. In such a manner, the present invention can be used in an optical system in which an image can be shifted as well to achieve a sufficiently high optical performance.

In each of the embodiments, a part of the fourth lens group G4 is the shift lens group. However, the shift lens group is not limited to the fourth lens group G4. An entire lens group or a part of another lens group can be the shift lens group.

Also, the variable focal length optical system of the present invention is not limited in application to zoom lenses. The system can be applied in variable focal zoom lenses having a focal length which is not successive.

A description will also be made of the amount of shifting of an image caused when a shift lens group, made of a part of the lens groups in an optical system, is moved in a direction orthogonal to the optical axis.

When βa is a lateral magnification of the shift lens group and βb is a lateral magnification of the lens groups positioned behind the shift lens group on the image side, a shifting amount of an image, δ with respect to an amount of movement of the shift lens group, Δ, can be expressed by the following equation (a):

$$\delta = (1-\beta a)\beta b \cdot \Delta = K \cdot \Delta \qquad (a)$$

where k is a coefficient of vibration (K=(1−βa) Bb).

When the coefficient of vibration K is small, the amount of movement of the shift lens group necessary to shift an image by a predetermined amount becomes large. This results in a complex driving mechanism for the shift lens groups. On the other hand, when the coefficient of vibration K is large, even a small deviation in the amount of movement of the shift lens group due to errors in control deviates the shifting amount of an image to a great extent, losing the contrast to high frequency in air.

For these reasons, it is desirable to set a proper value for the coefficient of vibration K.

Next, a function of correcting aberrations, required in the shift lens group, will be described.

Normally, a shift lens group is required to maintain an aberration-corrected state so as to obtain excellent imaging performance even when an image is shifted. Specifically, the requirements are that (1) spherical aberration's and a sine condition are well corrected and (2) an appropriate Petzval sum is provided.

Requirement (1) is a condition for preventing eccentric coma aberrations which are normally generated at the center of a screen when an image is shifted by moving the shift lens group. Requirement (2) is a condition for preventing the curvature of an imaging plane which is normally generated at the periphery of the screen when an image is shifted by moving the shift lens group.

When an entire lens group of a plurality of lens groups in a zoom lens is a shift lens group, the aberration-corrected state required during the change of the positions of the lens groups, i.e., during zooming, does not always coincide with the aberration-corrected state required for preventing poor performance when an image is shifted. Therefore, it is difficult to obtain both a high zoom ratio and a compensation of greater vibrations of the optical system at the same time.

It is possible in the present invention to obtain a high zoom ratio while compensating greater vibrations by constructing one lens group with a plurality of sub-lens groups and using one of the sub-lens as a shift lens group.

If a shift lens group is located away from an aperture stop, then light rays not on the axis passing through the shift lens group move away from the optical axis. As a result, eccentric coma aberrations are easily produced at the periphery of the screen. Particularly, when light rays not on the axis incident on the shift lens group create large angles with the optical axis, eccentric coma aberrations are easily produced at the periphery of the screen.

For these reasons, it is desirable to set a proper value for the positional relationship between a shift lens group and an aperture stop.

A variable magnification optical system of the present invention is constructed to satisfy conditions (5) through (7) so as to prevent poor performance which is normally caused when an image is shifted, as well as to maintain a predetermined zoom ratio:

(5) lens group including the shift lens group has a positive refractive power, and a negative lens group is positioned there adjacent on the object side;

(6) an aperture stop is arranged between the shift lens group and the negative lens group; and (7) a proper value is given to the deviation of the coefficient of vibration K, caused when the positions of the lens groups are changed from the wide-angle end to the telephoto end.

In order to correct eccentric coma aberrations generated at the periphery of the screen when an image is shifted, it is desirable to set a proper value for the angle between a light ray not on the axis incident on the shift lens group and the optical axis. In the present invention, a negative lens group having a strong refractive power is positioned adjacent to the lens group which includes the shift lens, on the object side, to cause the light rays emitted from the negative lens group to largely diverge. Also, the aperture stop is positioned behind the negative lens on the image side. With this lens layout, the angles of the light rays (not on the axis incident on the shift lens group) with the optical axis do not become large, thus achieving high performance.

Specifically, it is necessary to properly correct for various aberrations only with the shift lens group to prevent poor performance during the shifting of an image. Therefore, it is preferable to use a shift lens group having a positive refractive power so that one can easily confirm, during manufacturing, the aberration-corrected state created only by the shift lens group.

As the light rays not on the axis passing through the shift lens group become largely displaced from the optical axis, performance is greatly deteriorated at the periphery of the screen. It is desirable, therefore, to locate the shift lens group in the vicinity of the aperture stop. Particularly, in order to minimize the angles between the light rays not on the axis incident on the shift lens group and the optical axis, it is desirable to locate the negative lens group next to the aperture stop on the object side and the shift lens group behind the aperture stop on the image side.

For the above reason, conditions or requirements (5) and (6) are critical.

As described above, the amount of movement of a shift lens group required to shift an image by a predetermined amount depends on the coefficient of vibration K. When kw and fw are, respectively, a coefficient of vibration and a focal length of the total optical system in the maximum wide-angle state, and kt and ft are, respectively, a coefficient of vibration and a focal length of the total optical system in the maximum telephoto state, if the coefficient ratio of vibrations, K=kt/kw, is large compared to the zoom ratio Z=ft/fw, then the precision of controlling the positions of the lens groups, required in the maximum telephoto state, becomes very much higher than that required at the maximum wide-angle state. This results in a complex control of the positions of the lens groups. In addition, because the zooming is performed only by the lens group positioned behind the shift lens group on the image side, it is difficult both to make the lens system compact and to prevent deviations in various aberrations generated along with the changes of the positions of the lens group, at the same time.

On the other hand, if the coefficient ratio of vibrations K is extremely small compared to the zoom ratio Z, then change in a focal length is performed by the lens group positioned in front of the shift lens group on the object side. This makes it impossible to shorten the entire length of the lens system and minimize the lens diameters, thus failing in making a compact lens system.

For this reason, in the present invention, the coefficient ratio K is given a proper value with respect to the zoom ratio Z and poor performance during shifting of an image is prevented while maintaining a high zoom ratio. Condition (7) is necessary as a result.

A specific configuration of the variable focal length optical system, which satisfies the above mentioned conditions (5) through (7) and is suitable for making zoom ratio higher for a compact lens system, will be described.

A general theory of a variable focal length optical system suitable for compact lens systems will be described.

It is known that a refractive power arrangement of a telephoto-type is advantageous in making a lens system compact. Therefore, in a variable focal length optical system aiming for small size, a negative lens group is generally located closest to the image side in the lens system.

As noted previously, an aperture stop is located before the negative lens group on the object side. When positions of the lens groups are changed from the wide-angle state (the state of the shortest focal length) to the maximum telephoto state (the state of the longest focal length), (1) a distance between the aperture stop and the negative lens group is shortened, and (2) the negative lens group is moved toward the object side. By shortening the distance between the aperture stop and the negative lens group, light rays not on the axis passing through the negative lens become displaced from the optical axis at the wide-angle end position, but they approach the optical axis in the maximum telephoto state. Also by moving the negative lens group toward the object side, the negative lens group increases the magnification. The lateral magnification of the negative lens group increases telephoto state as compared to that in the maximum wide-angle state. Thus, the deviations in aberrations not on the axis generated when the positions of the lens groups are changed are well corrected and, at the same time, a high zoom ratio can be achieved to a certain degree.

Again, back focal distance is set to a proper value in the maximum wide-angle state because, if the back focal distance is too short in the maximum wide-angle state, then a shadow of dust on the imagewise surface is recorded on the film surface.

In general, zoom lenses are classified into a dual-group type and a multi-group type. A dual-group type zoom lens is constructed only with a variator and a compensator, which is not suitable for high zoom ratio. For this reason, a multi-group type is employed for high zoom ratio zoom lenses having a zoom ratio of over three times.

As noted previously, multi-group zoom lenses which are suitable for making the system compact and the zoom ratio higher are known as, for example, (1) a positive-positive-negative three group zoom lens, (2) a positive-negative-positive-negative four group zoom lens, (3) a positive-negative-positive-positive-negative five group zoom lens, and (4) a positive-negative-negative-positive-negative five group zoom lens.

It is preferable to locate the aperture stop in the vicinity of the fourth lens group G4 which includes the shift lens group. This was noted previously.

Various other conditional equations of the present invention are described hereinafter.

One form of the present invention satisfies the following conditional equation (7):

$$0.3 < fs/fh < 0.6 \tag{7}$$

where fs is a focal length of the lens group Gs which includes the shift lens group, and fh is the focal length of the sub-lens group Gh, the shift lens group.

The conditional equation (7) defines an appropriate range of the ratio of the focal length of the shift lens group Gh to the lens group having the shift lens group GS; it is a condition for making the zoom ratio higher with fewer lenses and for preventing performance from deteriorating during shifting of an image.

If conditions are such that the upper value of the conditional equation (7) is exceeded, then the focal length of the shift lens group Gh becomes large. Therefore, a negative spherical aberration can be excellently corrected only by the shift lens group. This makes it possible to construct the shift lens group with fewer lenses. However, the number of lenses would be increased in other lens groups than the shift lens group. This makes it impossible to achieve light weight.

On the other hand, if conditions are such that the lower value of the conditional equation (7) is not met, then the focal length of the shift lens group Gh becomes small. For this reason, it would be difficult to appropriately correct the negative spherical aberration generated at the shift lens group.

In order to introduce high performance and light weight, it is desirable for the lens group Ga to have a negative refractive power. The following conditional equation (8) is satisfied:

$$0.4 < (\beta 5t/\beta 5w)/(ft/fw) < 0.7 \tag{8}$$

where $\beta 5w$ is a lateral magnification of the lens group Ga in the maximum wide-angle state, $\beta 5t$ is a lateral magnification of the lens group Ga in the maximum telephoto state, fw is a focal length of the total optical system in the maximum wide-angle state, and ft is a focal length of the total optical system in the maximum telephoto state.

The conditional equation (8) defines deviation in the lateral magnification of the lens group Ga (that is, a fifth lens group G5 in the typical lens layout) positioned behind the lens group Gs, which includes the shift lens group Gh, on the image side.

If conditions are such that the upper value of the conditional equation (8) is exceeded, then the deviations in aberrations not on the axis generated at the lens group Ga when the positions of the lens groups will change, making high performance impossible. This is not preferable. Also, the lateral magnification of the lens group Ga (a fifth lens group G5) at the telephoto end position becomes large, easily causing poor optical performance due to defocusing caused by errors in controlling the positions of the lens groups. This is not preferable.

On the other hand, if conditions are such that a value is below the lower value of the conditional equation (8), then the variable magnification performance of the lens groups positioned in front of the lens group Ga (a fifth lens group G5) on the object side is enhanced. This makes it impossible to construct each lens group, which forms the variable magnification optical system, with fewer lenses. This is also not preferable.

Further, in the present invention, to shorten the entire length of the lens system in the maximum telephoto state while attempting to increase the optical performance in the maximum wide-angle state, it is preferable to position the second lens group G2 between the first lens group G1 and the lens group Gn. The following equation (9) is satisfied:

$$-0.2 < (fn/f2) < 0.2 \tag{9}$$

where f2 is a focal length of the second lens group G2 and fn is a focal length of the lens group Gn.

The conditional equation (9) defines an appropriate range for the ratio between the focal lengths of the second lens group G2 and the lens group Gn (i.e., a fifth lens group in the typical lens layout).

If conditions are such that the upper value of the conditional equation (9) is exceeded, then the diverging power of the second lens groups G2 increased, increasing the entire length of the lens system in the maximum telephoto state.

On the other hand, if conditions are such that the lower value of the conditional equation (9) is not met, then the converging power of the second lens group G2 is increased, making it impossible to obtain a sufficient back focal distance in the maximum wide-angle state.

When the lens groups positioned behind the shift lens group on the image side are moved as a focusing group to focus on a nearby object, if the position of the subject is changed, then the lateral magnification of the shift lens group changes as well as the lateral magnification of the lens group positioned behind the shift lens group on the image side. For this reason, it is preferable in the present invention that the lens group positioned before the shift lens group on the object side is used as a focusing group.

Next, a method of correcting deviations of image points, that is, blurred images in the optical system, will be described.

In general, when an optical system and a recording means for recording images through the optical system are integrally inclined around the principal point of the optical system the principal point when light rays enter from the object side), a recording range of the recording means on a subject surface is shifted and inclined.

Therefore, as the recording range prior to the integral inclining of the optical system and the recording means is a reference, an image within the recording range prior to the inclining is shifted and inclined on the recording means. Note that when the image magnification is reduced, the inclining amount of the image within the recording range prior to the inclination on the recording means is small due to the Shine-Proof Law. Applying this to cameras, etc., the image within the recording range prior to the inclination is shifted without being inclined on the recording means.

Generally, the position of the subject image almost coincides with the recording means. It is understood that when the optical system vibrates, the subject image in the optical system is shifted.

Considering that a lens system rotates around the principal point of the lens system as a center, the following equation (b) expresses the amount of deviation of an image point (the amount that an image is blurred), δ', with respect to a vibration angle, ε, of the lens system:

$$\delta' = f \cdot \tan \epsilon \qquad (b)$$

where f is a focal length of the total lens system.

When the vibration angle ε is relatively small, tan ε can be close to ε; therefore, the deviation amount of the image point, δ', can be expressed by the following equation (c):

$$\delta = f \cdot \epsilon \qquad (c)$$

Note that as the deviation amount of the image point, δ' grows to some extent when an image is recorded, the image is recorded as blurred.

The greater the focal length of the optical system, the greater the deviation amount of the image point, δ' is with respect to a predetermined vibration angle, ε, of the optical system. Therefore, the greater the zoom ratio and the focal length in the maximum telephoto state, the more a blurred image will be recorded due to the vibration of the optical system caused by hand-held vibrations.

In order to cancel the amount of deviation of the image point, δ', caused by hand-held vibration, etc. with the amount of shifting of the image by moving the shift lens group to correct the deviation of the image point caused by hand-held vibration, the following equation (d) needs to be satisfied:

$$\delta + \delta' = 0 \qquad (d)$$

The following equation (e) is obtained by substituting the above equations (a) and (c) into the equation (d):

$$f \epsilon + K \Delta = 0 \qquad (e)$$

In other words, the amount of movement, Δ, of the shift lens group, required to correct the deviations of an image point caused by hand-held vibration, can be expressed in the following equation (f):

$$\Delta = -(f/K)\epsilon \qquad (f)$$

Thus, the deviation of an image can be corrected by calculating the required amount of movement, Δ, based on the data on the vibration angle, ε, of the optical system sensed by the vibration sensor, the data on the focal length of the optical system, and the data on the coefficient of vibration, K, and by moving the shift lens group by the required amount of movement, Δ, in a direction orthogonal to the optical axis.

As described above, the present invention can achieve a so-called vibration reduction optical system in which the deviations of an image point due to the vibrations of the optical system caused by hand-held vibrations can be compensated. However, it is obvious that not only the variable focal length optical system of the present invention can be applied in an optical system capable of shifting images, but also it can achieve a sufficiently high optical performance as a normal optical system.

FIG. 1 shows the refractive power distribution of the variable focal length optical system of each embodiment of the present invention and the movement of each lens group during variable magnification from the maximum wide-angle state (W) to the maximum telephoto state. (T).

As shown in FIG. 1, the variable focal length optical system of each embodiment of the present invention having an object side comprises, in sequence form the object side, a first lens group G1 having a positive refractive power, a second lens group G2; a third lens group G3 having a negative refractive power, a fourth lens group G4 having a positive refractive power, and a fifth lens group G5 having a negative refractive power. When a focal length is changed from the maximum wide-angle state to the maximum telephoto state, each lens group is moved toward the object side so that a distance between the first and second lens groups G1 and G2 is increased, a distance between the second and third lens groups G2 and G3 is increased, a distance between the third and fourth lens groups G3 and G4 is decreased, and a distance between the fourth and fifth lens groups G4 and G5 is decreased.

In each embodiment, an aspherical surface can be expressed in the following equation (a) when y is the height in a direction perpendicular to the optical axis, S(y) (the sagging amount) is the variation in the height, yy, in the optical axis direction, R is the fiduicial radius of curvature, k is the coefficient of cone, and Cn is the coefficient of the n-order aspherical surface:

$$S(y) = (y^2/R)\{1 + (1 - k \cdot y^2/R^2)^{1/2}\} + \quad \text{(Equation 1)}$$
$$C_4 \cdot y^4 + C_6 \cdot y^6 + C_6 \cdot y^8 + C_{10} \cdot y^{10} + \ldots \text{ (a)}.$$

In each embodiment, an asterisk (*) is on the right side of the surface number for an aspherical surface.

Figure 2:
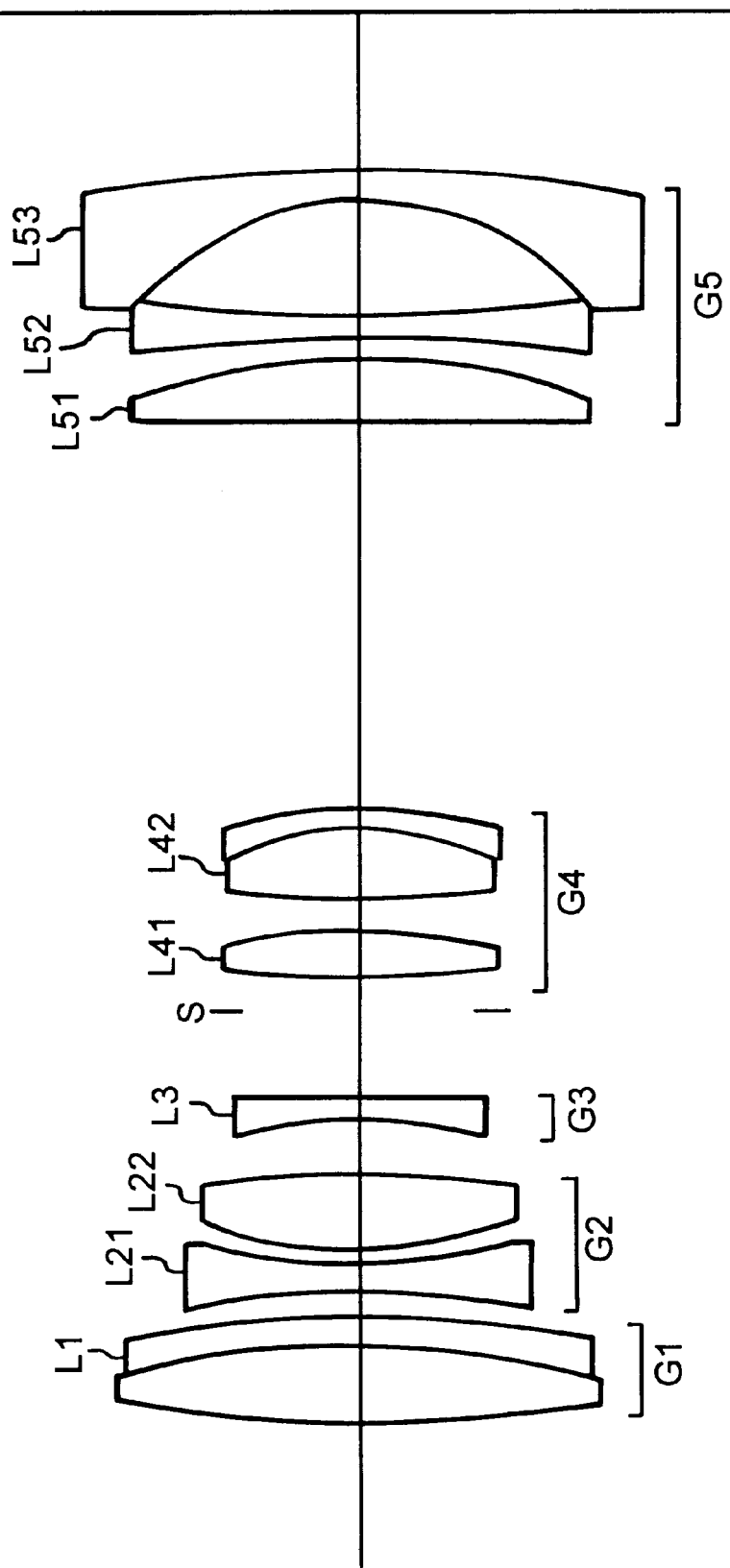
FIG. 2 is a view of the lens layout of a variable focal length optical system of a first embodiment of the present invention.

FIG. 2 shows the lens layout of a variable focal length optical system of a first embodiment of the present invention.

In the variable focal length optical system of FIG. 2, a first lens group G1 consists of a bonded positive lens L1 made of, in sequence from the object side, a bi-convex lens and a negative meniscus lens whose concave surface faces the object side.

A second lens group G2 consists of, in sequence from the object side, a bi-concave lens L21 and a bi-convex lens L22.

A third lens group G3 consists of a bi-concave lens L3.

A fourth lens group G4 consists of, in sequence from the object side, a bi-convex lens L41, and a bonded positive lens L42 made of a bi-convex lens and a negative meniscus lens whose concave surface faces the object side.

A fifth lens group G5 consists of, in sequence from the object side, a positive meniscus lens L51 whose concave surface faces the object side, a bi-concave lens L52, and a negative meniscus lens L53 whose concave surface faces the object side.

An aperture stop S is located between the third and fourth lens groups G3 and G4, and moves together with the fourth lens group G4 during zooming from the maximum wide-angle state to the maximum telephoto state.

FIG. 2 shows a positional relationship of each lens group at the wide-angle end position; (the lens groups) move the optical axis with zooming pathways shown by arrows in FIG. 1 during zooming toward the maximum telephoto state.

Of the two lens elements consisting the fourth lens group G4, the bonded positive lens L42 is shifted in a direction almost orthogonal to the optical axis to shift an image, thus correcting deviations of an image point which are caused by hand-held vibrations.

Further, focusing is performed by shifting the third lens group G3 along the optical axis.

The following Table (1) shows values for various items of the first embodiment of the present invention. In Table (1), f is the focal length in mm, F NO is the F-number, ω is the half field angle in degrees, Bf is the back focal distance in mm, and DO is the distance, in mm, along the optical axis between an object and the most-object-side lens surface. Moreover, surface numbers are given to the lens surfaces, counted from the object side in the direction as light rays go forward, and refractive index and Abbe numbers show values with respect to the d-line (λ=587.6 nm) respectively.

TABLE 1 f = 38.81~75.35~125.59~183.37
FNO = 3.88~6.13~8.54~11.00
2ω = 29.44~15.51~9.51~6.60°

| lens surface number | radius of curvature | distance between adjacent lens surfaces | refractive index | Abbe Number |
|---|---|---|---|---|
| 1 | 76.4846 | 4.270 | 1.48749 | 70.45 |
| 2 | -37.9065 | 1.381 | 1.84666 | 23.83 |
| 3 | -62.8064 | (D3 = variable) | | |
| 4 | -38.7725 | 1.000 | 1.83500 | 42.97 |
| 5 | 25.8577 | 1.000 | | |
| 6 | 21.8269 | 3.767 | 1.76182 | 26.55 |
| 7 | -50.9382 | (D7 = variable) | | |
| 8 | -21.0028 | 1.000 | 1.80420 | 46.51 |
| 9 | 305.6880 | (D9 = variable) | | |
| 10 | ∞ | 1.758 | (aperture stop S) | |
| 11 | 59.6582 | 2.512 | 1.51450 | 63.05 |
| 12* | -24.2827 | 1.381 | | |
| 13 | 44.8563 | 3.767 | 1.48749 | 70.45 |
| 14 | -14.7566 | 1.000 | 1.84666 | 23.83 |
| 15 | -23.6485 | (D15 = variable) | | |
| 16 | -409.2955 | 3.391 | 1.75520 | 27.53 |
| 17 | -30.3185 | 0.984 | | |
| 18 | -84.3775 | 1.256 | 1.83500 | 42.97 |
| 19 | 88.8380 | 5.729 | | |
| 20 | -15.2948 | 1.507 | 1.80420 | 46.51 |
| 21 | -84.9742 | (Bf) | | |

(aspherical surface data)

| | R | k | $C_4$ |
|---|---|---|---|
| 12th surface | -24.2827 | 1.0000 | +1.41918 × 10$^{-5}$ |

| $C_6$ | $C_8$ | $C_{10}$ |
|---|---|---|
| -3.06586 × 10$^{-8}$ | +5.44479 × 10$^{-10}$ | 0.00000 |

(variable distance for zooming)

| f | 38.8052 | 75.3505 | 125.5854 | |
| --- | --- | --- | --- | --- |
| D3 | 1.5070 | 13.7188 | 22.8284 | 28.1015 |
| D7 | 2.9290 | 4.2541 | 5.3555 | 6.2791 |
| D9 | 4.6059 | 3.2808 | 2.1794 | 1.2558 |
| D15 | 19.9499 | 11.5156 | 6.7485 | 3.8930 |
| Bf | 7.9120 | 28.7151 | 52.0648 | 76.3388 |

(amount of focusing movement of third lens group G3 with a photographic magnification of -1/30)

| focal length f | 38.8052 | 75.3505 | 125.5854 | 183.3709 |
|---|---|---|---|---|
| DO | 1111.3183 | 2163.1144 | 3610.6094 | 5282.6782 |
| amount of movement | 0.8858 | 0.7362 | 0.7061 | 0.6938. |

Note that a sign of movement is positive for the movement toward the object side.
(amount of movement of bonded positive lens L42 when shifting an image by 0.01 (rad))

| focal length f | 38.8052 | 75.3505 | 125.5854 | 183.3709 |
|---|---|---|---|---|
| amount of the lens movement | 0.3613 | 0.4447 | 0.5335 | 0.6062 |
| amount of image shift | 0.3881 | 0.7535 | 1.2560 | 1.8339 |

(condition-corresponding value)

| | |
|---|---|
| f1 = | +96.7562 |
| f2 = | -1985.6284 |
| f3 = | -24.4039 |
| β3w = | -0.2763 |
| β3t = | -0.4910 |
| (1) f3/f2 = | 0.012 |
| (2) f1/(fw · ft)$^{½}$ = | 1.147 |
| (3) (Bt - Bfw)/(ft - fw) = | 0.473 |
| (4) r21/fw = | -0.999 |
| (5) (β3t/β3w)/ft/fw) = | 0.376 |
| (6) Db/fw = | 0.146. |

Each of FIGS. 3 through 10 shows various aberrations with respect to the d-line (λ=587.6 nm) in the first embodiment. FIG. 3 shows various aberrations in the maximum wide-angle state (the shortest focal length position) upon focusing on an object at infinity position; FIG. 4 shows various aberrations in a first middle focal length state upon focusing on an object at infinity position; FIG. 5 shows various aberration in second middle focal length state upon focusing on an object at infinity position; and FIG. 6 shows various aberrations at the maximum telephoto state (the longest focal length position) upon focusing on an object at infinity position.

Also, FIG. 7 shows various aberrations in the maximum wide-angle state with a photographic magnification of -1/30;

FIG. 8 shows various aberrations in the first middle focal length state with a photograph i.e., magnification of –1/30; FIG. 9 shows various aberrations in the second middle focal length state with a photograph i.e., magnification of –1/30; and FIG. 10 shows various aberrations in the maximum telephoto state with a photographic magnification of –1/30.

Figure 11:
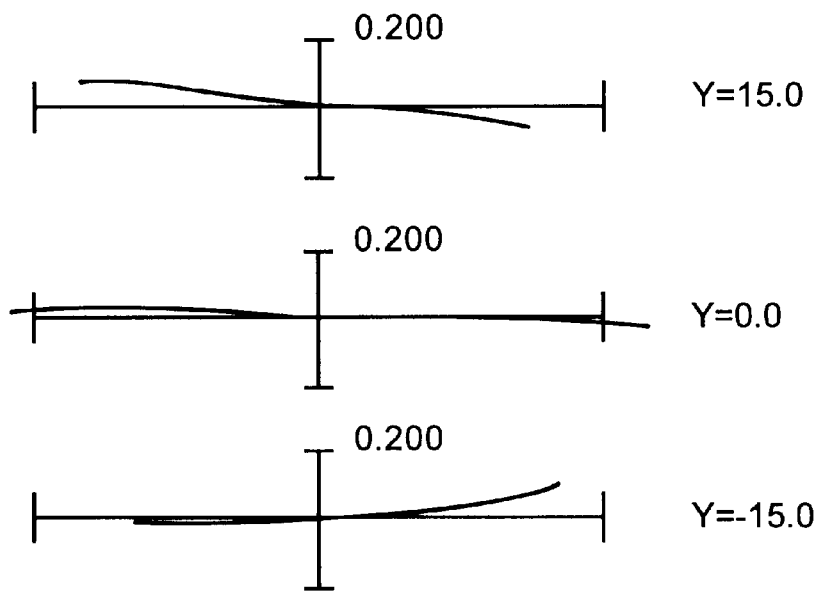
FIG. 11 shows diagrams of coma aberrations in the maximum wide-angle state upon focusing on an object at infinity position when an image is shifted in the first embodiment.
Figure 12:
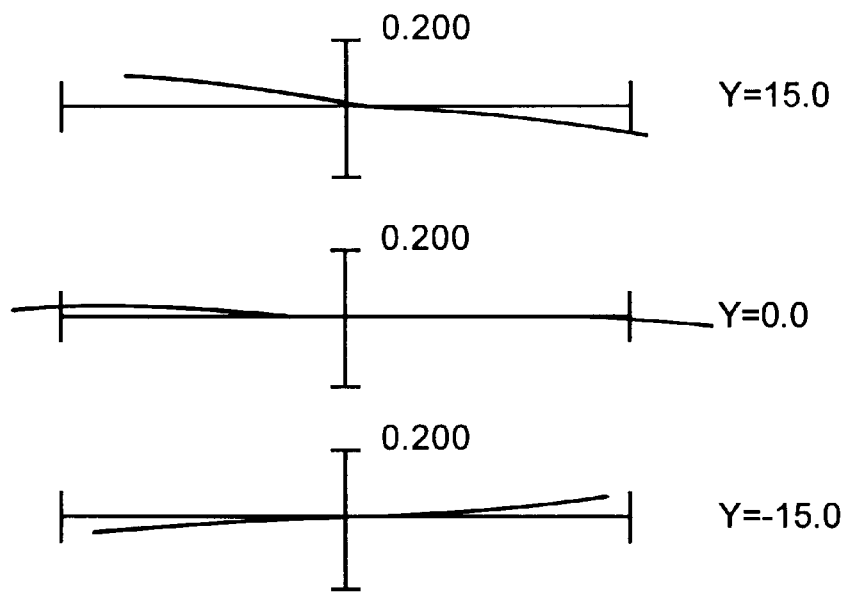
FIG. 12 shows diagrams of coma aberrations in the first middle focal length state upon focusing on an object at infinity position when an image is shifted in the first embodiment.
Figure 13:
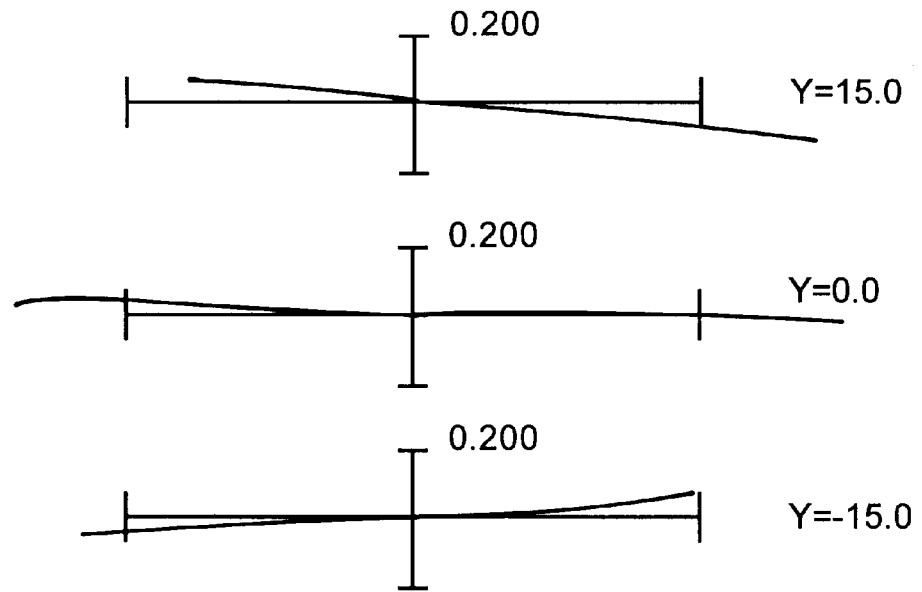
FIG. 13 shows diagrams of coma aberrations at the second middle focal length position upon focusing on an object at infinity position when an image is shifted in the first embodiment.
Figure 14:
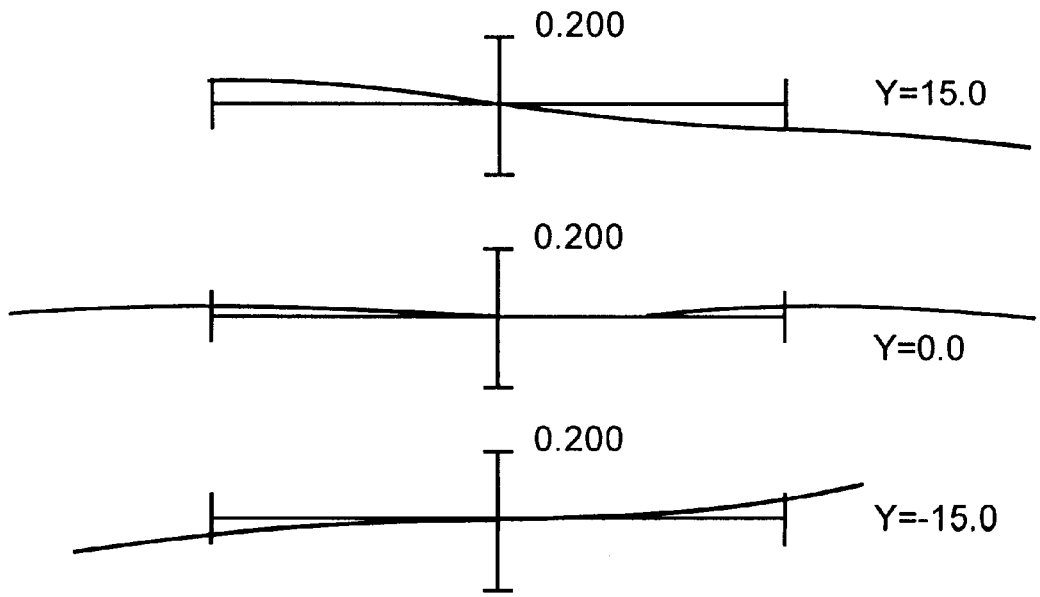
FIG. 14 shows diagrams of coma aberrations in the maximum telephoto state upon focusing on an object at infinity position when an image is shifted in the first embodiment.

Moreover, FIGS. 11 through 14 show coma aberrations when an image is shifted by 0.01 rad (radian) from the optical axis in the first embodiment. FIG. 11 shows coma aberrations in the maximum wide-angle state upon focusing on an object at infinity position; FIG. 12 shows coma aberrations in the first middle focal length state upon focusing on an object infinity position; FIG. 13 shows coma aberrations in the second middle focal length state upon focusing on an object at infinity position; and FIG. 14 shows coma aberrations in the maximum telephoto state upon focusing on an object at infinity position.

Figure 15:
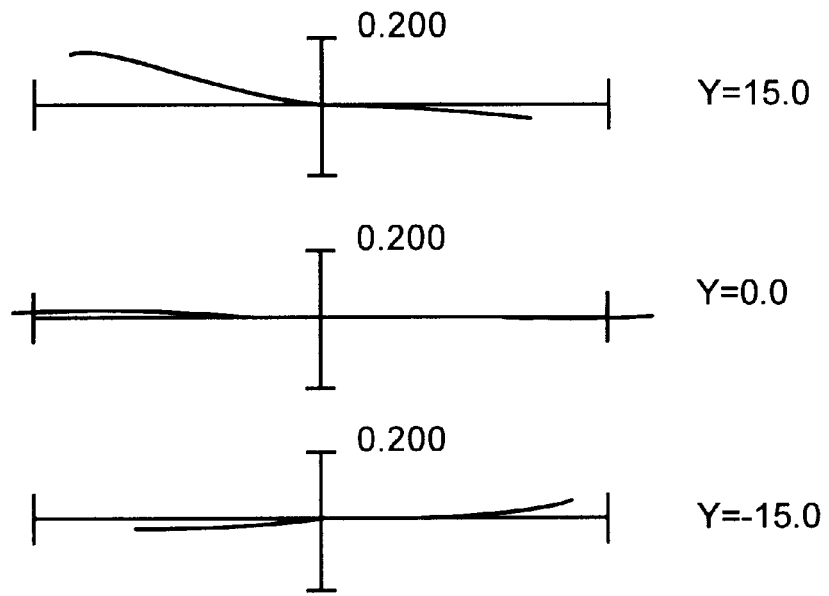
FIG. 15 shows diagrams of coma aberrations in the maximum wide-angle state when an image is shifted with a photographic magnification of −1/30 in the first embodiment.
Figure 16:
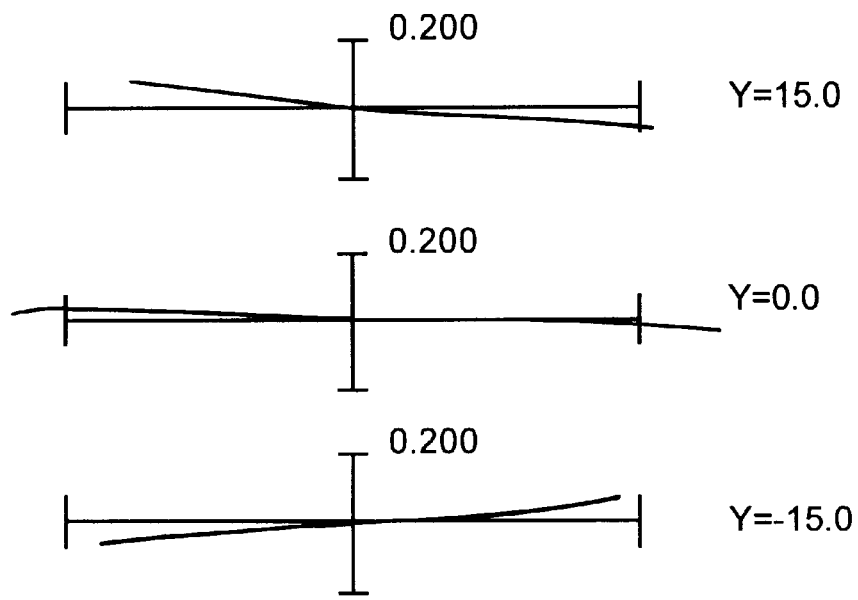
FIG. 16 shows diagrams of coma aberrations in the first middle focal length state when an image is shifted with a photographic magnification of −1/30 in the first embodiment.
Figure 17:
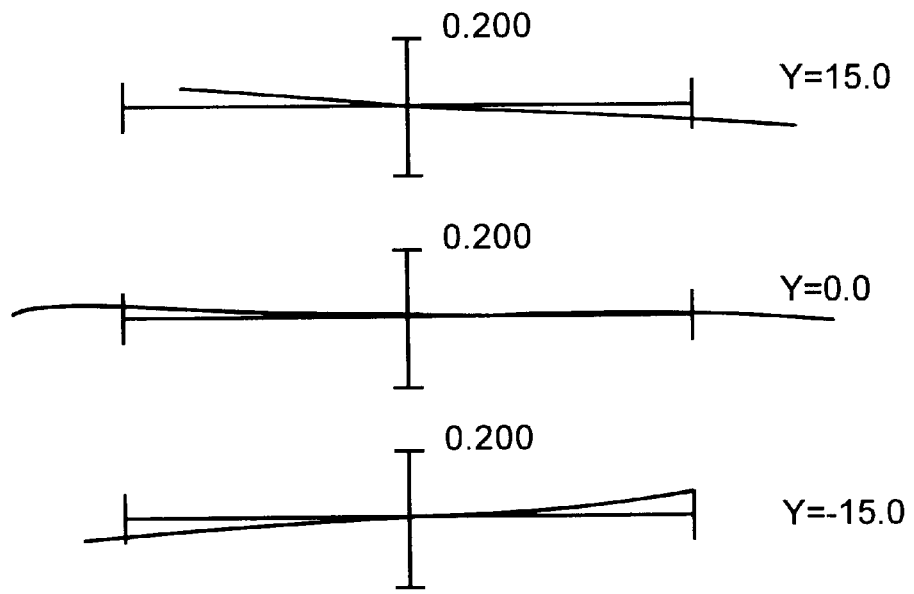
FIG. 17 shows diagrams of coma aberrations in the second middle focal length state when an image is shifted with a photographic magnification of −1/30 in the first embodiment.
Figure 18:
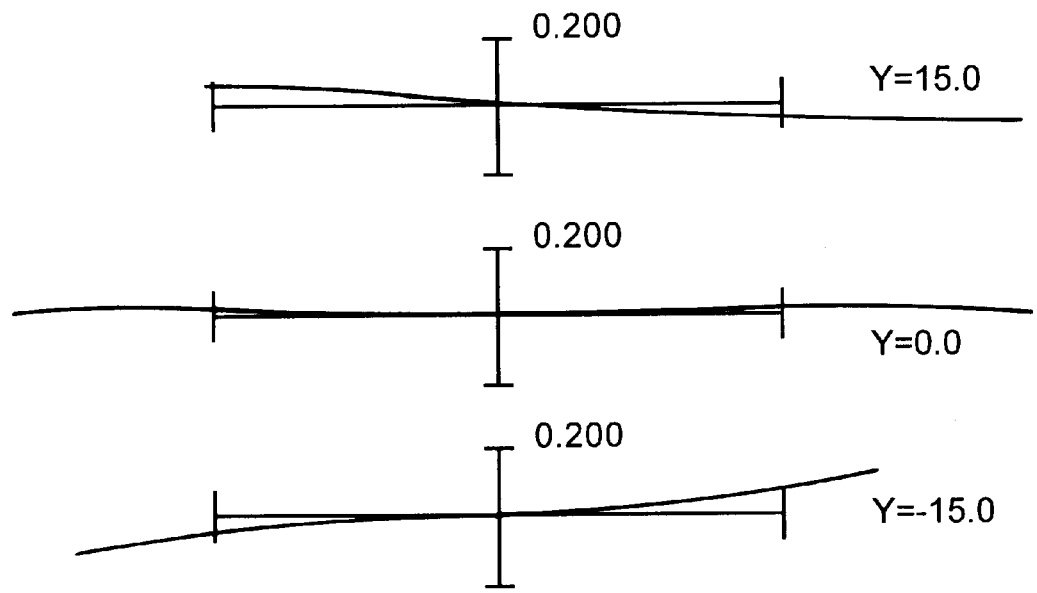
FIG. 18 shows diagrams of coma aberrations in the maximum telephoto state when an image is shifted with a photographic magnification of −1/30 in the first embodiment.

FIG. 15 shows coma aberrations in the maximum wide-angle state with a photographic magnification of –1/30. FIG. 165 shows coma aberrations in the first middle focal length state with a photographic magnification of –1/30. FIG. 17 shows coma aberrations in the second middle focal length state with a photographic magnification of –1/30. FIG. 18 shows aberrations in the maximum telephoto state with a photographic magnification of –1/30.

Each of the aberrations in FIGS. 11 through 18 shows coma aberrations generated when the bonded positive lens L42 is shifted in the positive direction of the image height Y, where Y, in mm, =15.0, 0.0, and –15.0.

In each aberration diagram, F NO is the F-number, NA is the numerical aperture, Y is the image height, in mm, A is the half image angle, in degrees, with respect to each image height, and H is the object height, in mm, with respect to each image height.

In astigmatism aberration diagrams, a solid line represents a sagital imaging plane and a broken line represents a meridional imaging plane. Also, in the spherical aberration diagrams, a broken line represents a sine condition.

As apparent from each aberration diagram, even when an image is shifted, various aberrations can be excellently corrected at each photographic length position and each focal length position in the present invention.

Figure 19:
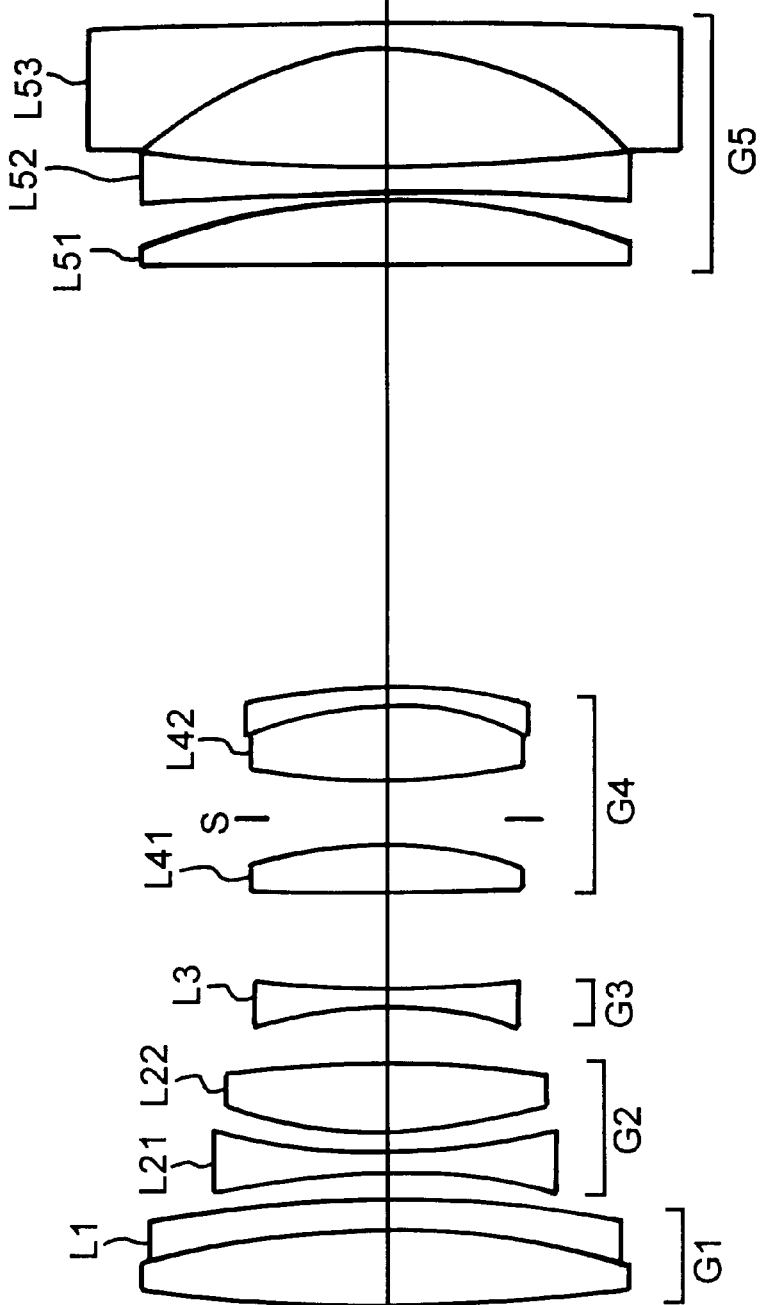
FIG. 19 is a view of the lens layout of a variable focal length optical system of a second embodiment of the present invention.

FIG. 19 shows the lens layout of a variable focal length optical system of a second embodiment of the present invention.

In the variable focal length optical system of FIG. 19, a first lens group G1 consists of a bonded positive lens L1 made of, in sequence from an object side, a bi-convex lens and a negative meniscus lens whose concave surface faces the object side.

A second lens group G2 consists of, in sequence from the object side, a bi-concave lens L21 and a bi-convex lens L22.

A third lens group G3 consists of a bi-concave lens L3.

A fourth lens group G4 consists of, in sequence from the object side, a bi-convex lens L41 and a bonded positive lens L42 made of a bi-convex lens and a negative meniscus lens whose concave surface faces the object side.

A fifth lens group G5 consists of, in sequence from the object side, a bi-convex lens L51, a bi-concave lens L52, and a negative meniscus lens L53 whose concave surface faces the object side.

An aperture stop S is located in the fourth lens group G4, and moves together therewith for zooming from the maximum wide-angle state to the maximum telephoto state.

FIG. 19 shows a positional relationship of each lens group at the wide-angle end position; the lens groups move on the optical axis with zooming pathways shown by the arrows in FIG. 1 during zooming to the maximum telephoto state.

Of the two lens elements consisting of the fourth lens group, the bonded positive lens L42 is shifted in a direction almost orthogonal to the optical axis to shift an image, thus correcting deviations of an image point, which are caused by hand-held vibrations.

Further, focusing is performed by shifting the third lens group G3 along the optical axis.

The following Table (2) shows values for various items of the second embodiment of the present invention. In Table (2), f is the focal length in mm, FNO is the F-number, ω is the half-field angle in degrees, Bf is the back focal distance in mm, and D0 is the distance in mm along the optical axis between an object and the most-object-side lens surface. Moreover, surface numbers are given to the lens surfaces, counted from the object side to the direction as light rays go forward, and refractive index and Abbe numbers show values with respect to the d-lines ($\lambda$=587.6 nm), respectively.

TABLE 2 f = 38.81~75.35~125.59~183.37
FNO = 3.93~6.26~8.55~11.00
2ω = 29.50~15.48~9.48~6.58°

| lens surface number | radius of curvature | distance between adjacent lens surfaces | refractive index | Abbe number |
|---|---|---|---|---|
| 1 | 84.2784 | 4.270 | 1.48749 | 70.45 |
| 2 | –36.5885 | 1.381 | 1.84666 | 23.83 |
| 3 | –60.1436 | (D33 = variable) | | |
| 4 | –32.9779 | 1.000 | 1.83500 | 42.97 |
| 5 | 28.5643 | 0.879 | | |
| 6 | 22.4693 | 3.767 | 1.76182 | 26.55 |
| 7 | –40.8743 | (D7 = variable) | | |
| 8 | –19.4738 | 1.000 | 1.83500 | 42.97 |
| 9 | 249.0346 | (D9 = variable) | | |
| 10 | 165.9035 | 2.512 | 1.51450 | 63.05 |
| 11* | –19.0970 | 1.256 | | |
| 12 | ∞ | 1.884 | (aperture stop S) | |
| 13 | 33.9949 | 3.767 | 1.48749 | 70.45 |
| 14 | –15.7174 | 1.000 | 1.84666 | 23.83 |
| 15 | –25.9351 | (D15 = variable) | | |
| 16 | 1628.8734 | 3.391 | 1.75520 | 27.53 |
| 17 | –32.9521 | 0.242 | | |
| 18 | –194.3115 | 1.256 | 1.83500 | 42.97 |
| 19 | 84.9315 | 6.123 | | |
| 20 | –16.7244 | 1.507 | 1.80420 | 46.51 |
| 21 | –325.1428 | (Bf) | | |

(aspherical surface data)

| | R | k | $C_4$ |
|---|---|---|---|
| 11th surface | –19.0970 | 1,0000 | +1.11017 × 10$^{-5}$ |

| $C_6$ | $C_8$ | $C_{10}$ |
|---|---|---|
| –9.75638 × 10$^{-9}$ | $^+$6.25157 × 10$^{-10}$ | 0.00000 |

(variable distance for zooming)

| f | 38.8046 | 75.3471 | 125.5762 | 183.3269 |
|---|---|---|---|---|
| D3 | 1.5070 | 13.1188 | 23.2186 | 28.7528 |
| D7 | 2.7339 | 4.1630 | 5.4403 | 6.2791 |
| D9 | 4.8010 | 3.3719 | 2.0946 | 1.2558 |
| D15 | 21.1065 | 12.0517 | 7.1695 | 3.8930 |
| Bf | 7.9110 | 29.3939 | 51.6425 | 76.1403 |

(amount of focusing movement of third lens group G3 with a photographic magnification of –1/30)

| focal length f | 38.8046 | 75.3471 | 125.5762 | 183.3269 |
|---|---|---|---|---|
| D0 | 1115.0445 | 2172.7614 | 3622.1547 | 5300.8103 |
| amount of movement | 0.7174 | 0.5702 | 0.5549 | 0.5358 |

TABLE 2-continued

Note that a sign of amount of movement is positive for the movement toward the object side.
(amount of movement of bonded positive lens L42 when shifting an image by 0.01 (rad))

| focal length f | 38.8046 | 75.3471 | 125.5762 | 183.3269 |
|---|---|---|---|---|
| amount of the lens movement | 0.3361 | 0.4110 | 0.5020 | 0.5706 |
| amount of image shift | 0.3881 | 0.7538 | 1.2558 | 1.8334 |

(condition-corresponding value)

| f1 = | +99.8492 |
|---|---|
| f2 = | +622.1062 |
| f3 = | −21.5938 |
| $\beta 3w$ = | −0.2941 |
| $\beta 3t$ = | −0.4264 |
| (1) f3/f2 = | −0.035 |
| (2) f1/(fw · ft)$^{1/2}$ = | 1.184 |
| (3) (Bft − Bfw)/(ft − fw) = | 0.472 |
| (4) r21/fw = | −0.850 |
| (5) ($\beta 3t/\beta 3w$)/(ft/fw) = | 0.307 |
| (6) Db/fw = | 0.049. |

Figures 23A, 23B, 23C:
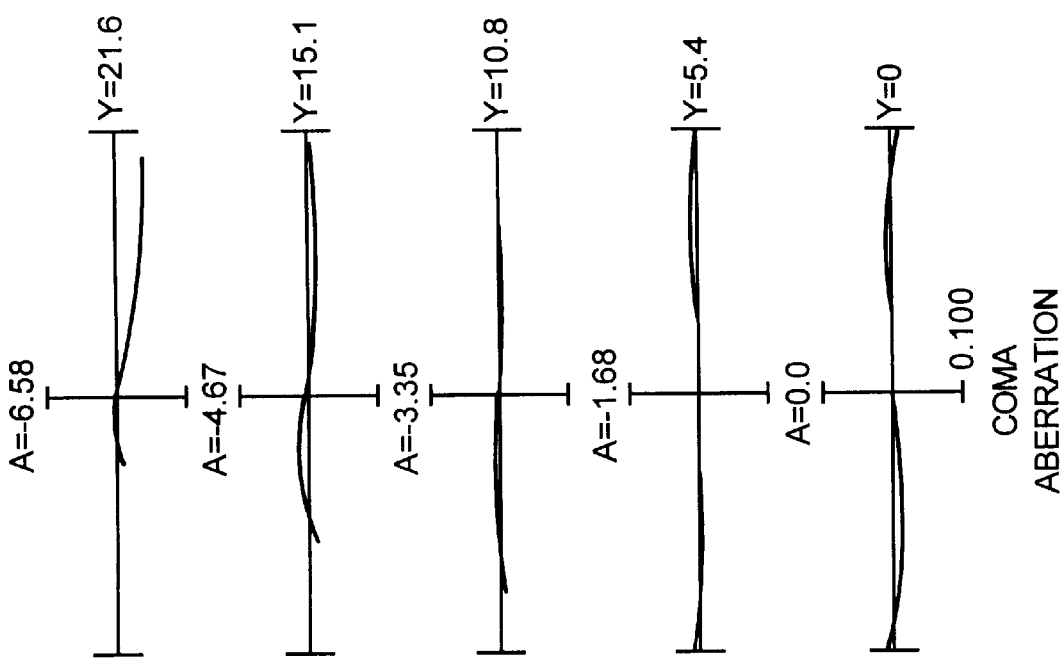
FIGS. 23A–23D show diagrams of various aberrations in the maximum telephoto state upon focusing on an object at infinity position in the second embodiment.
Figure 23D:
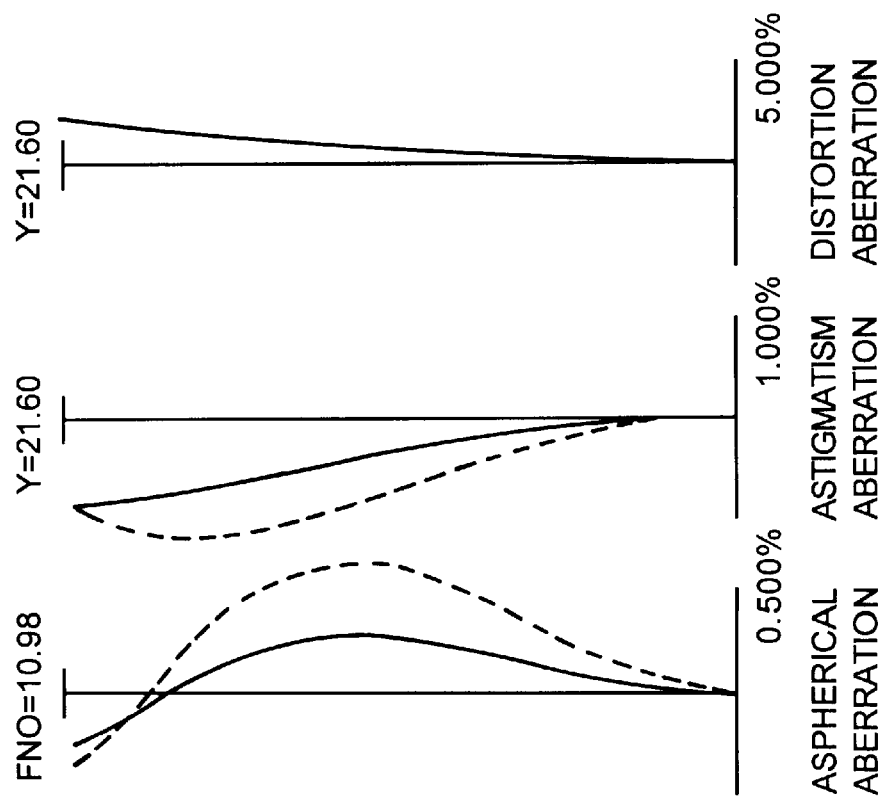

Each of FIGS. 20 through 27 shows various aberrations with respect to the d-line (λ=587.6 nm) in the second embodiment. FIG. 20 shows various aberrations in the maximum wide-angle state upon focusing on an object at infinity position; FIG. 21 shows various aberrations in the first middle focal length state upon focusing on an object at infinity position; FIG. 22 shows various aberrations in the second middle focal length state upon focusing on an object at infinity position; and FIG. 23 shows various aberrations at the maximum telephoto state upon focusing on an object at infinity position.

Figure 24D:
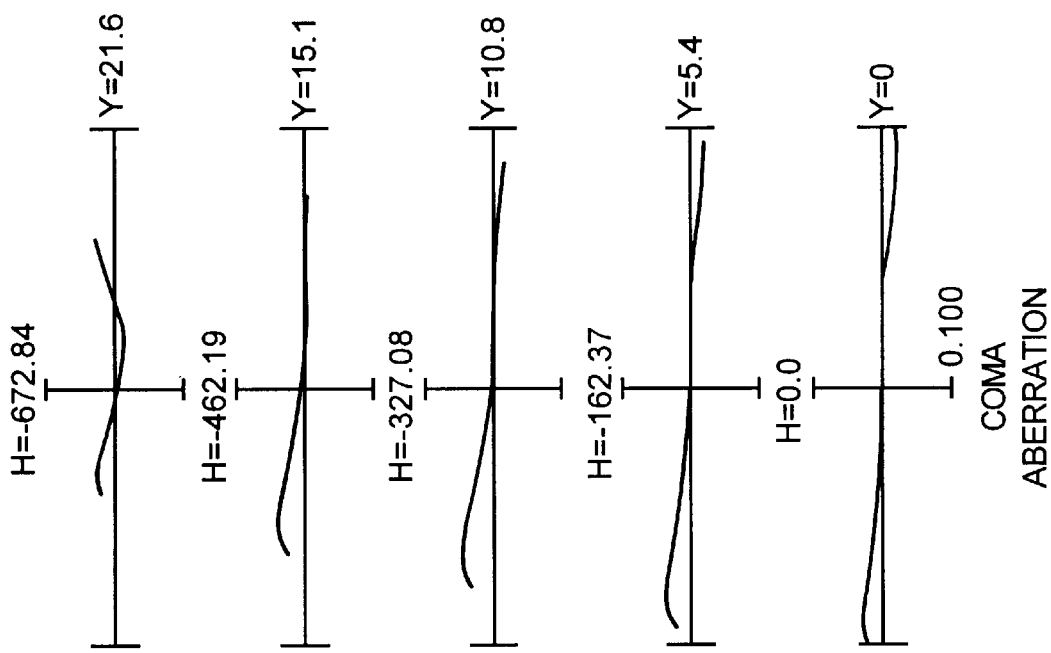
FIGS. 24A–24D shows diagrams of various aberrations in the maximum wide-angle state with a photographic magnification of −1/30 in the second embodiment.
Figures 24A, 24B, 24C:
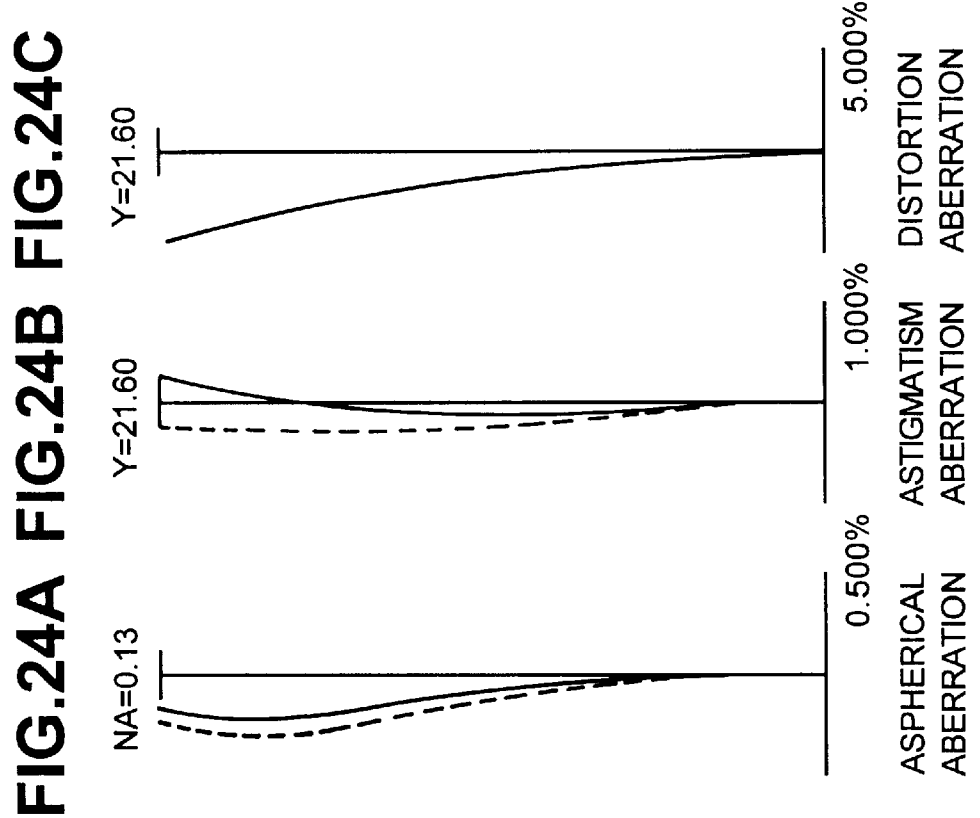

Also, FIG. 24 shows various aberrations in the maximum wide-angle state with a photographic magnification of −1/30; FIG. 25 shows various aberrations in the first middle focal length state with a photographic magnification of −1/30; FIG. 26 shows various aberrations in the second middle focal length state with a photographic magnification of −1/30; and FIG. 27 shows various aberrations in the maximum telephoto state with a photographic magnification of −1/30.

Figure 28:
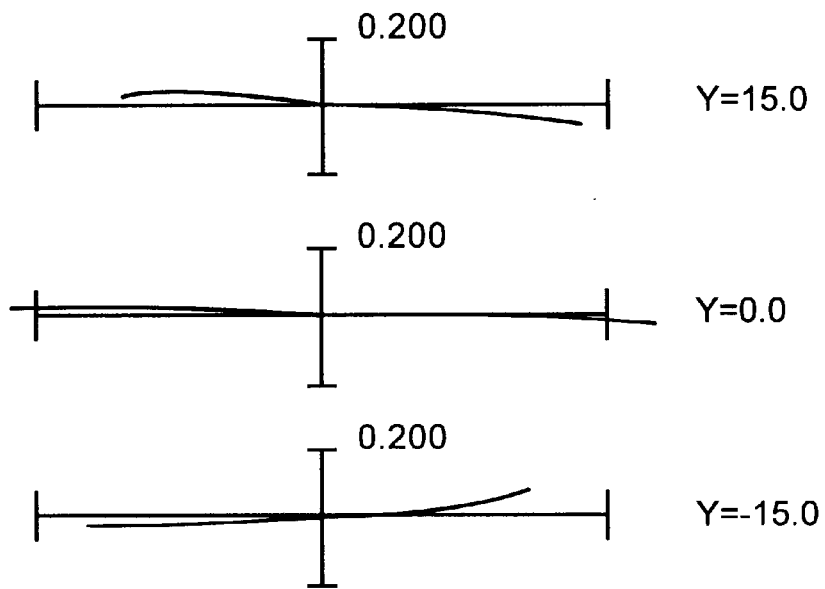
FIG. 28 shows diagrams of coma aberrations in the maximum wide-angle state upon focusing on an object at infinity position when an image is shifted in the second embodiment.
Figure 29:
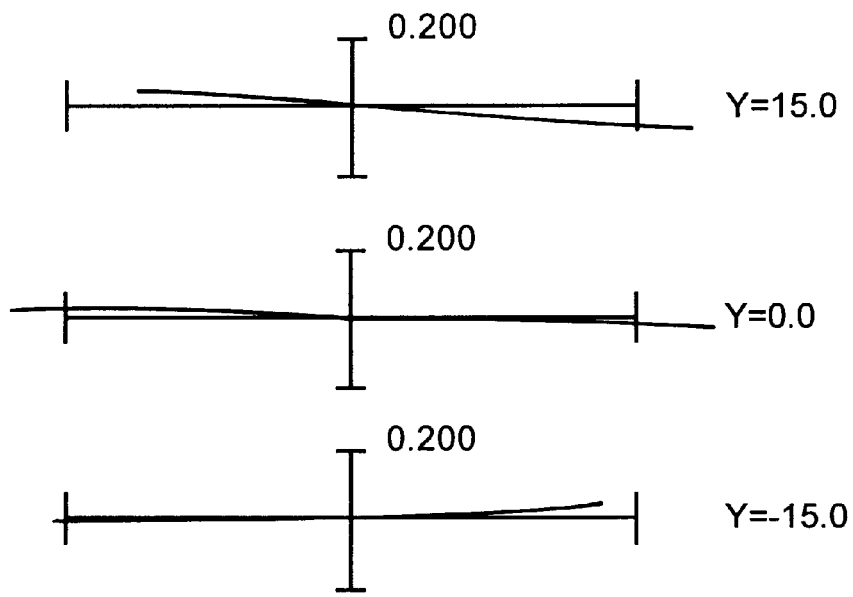
FIG. 29 shows diagrams of coma aberrations in the first middle focal length state upon focusing on an object at infinity position when an image is shifted in the second embodiment.
Figure 30:
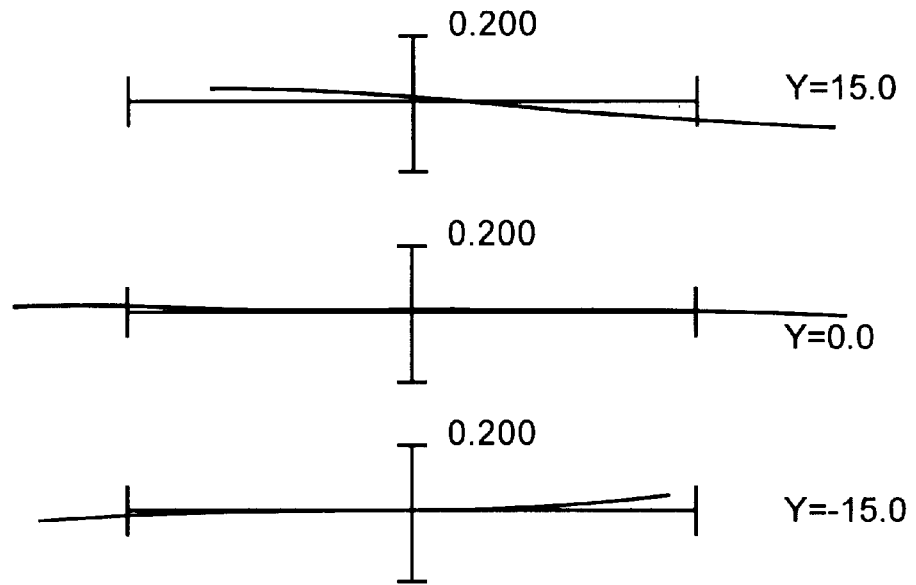
FIG. 30 shows diagrams of coma aberrations at the second middle focal length position upon focusing on an object at infinity position when an image is shifted in the second embodiment.
Figure 31:
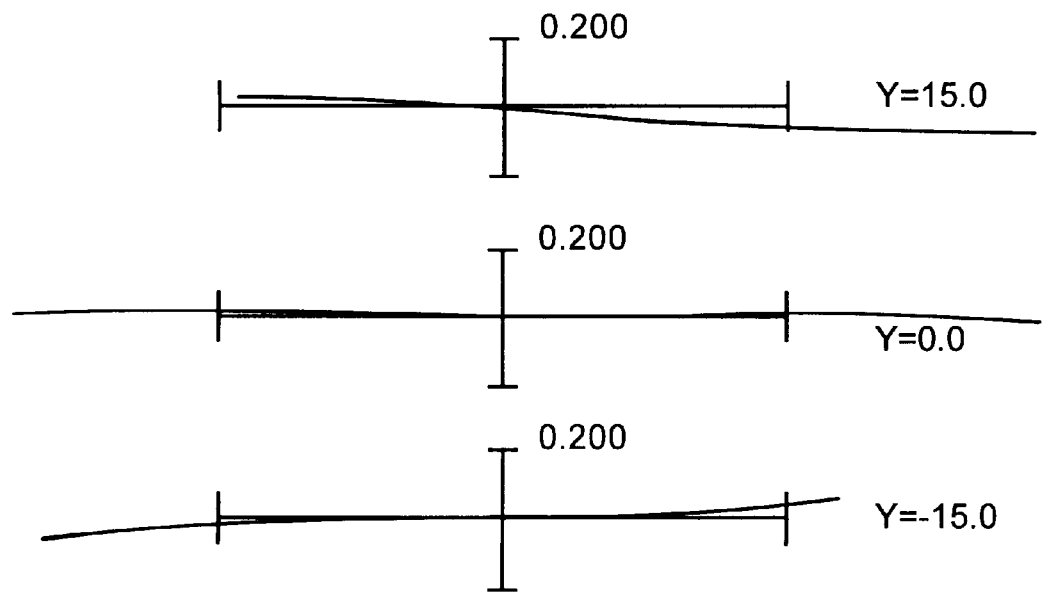
FIG. 31 shows diagrams of coma aberrations in the maximum telephoto state upon focusing on an object at infinity position when an image is shifted in the second embodiment.

Moreover, FIGS. 28 through 31 show coma aberrations generated when an image is shifted by 0.01 rad (radian) from the optical axis in the second embodiment. FIG. 28 shows coma aberrations in the maximum wide-angle state upon focusing on an object at infinity position; FIG. 29 shows coma aberrations in the first middle focal length state upon focusing on an object at infinity position; FIG. 30 shows coma aberrations in the second middle focal length state upon focusing on an object at infinity position; and FIG. 31 shows coma aberrations in the maximum telephoto state upon focusing on an object at infinity position.

Figure 32:
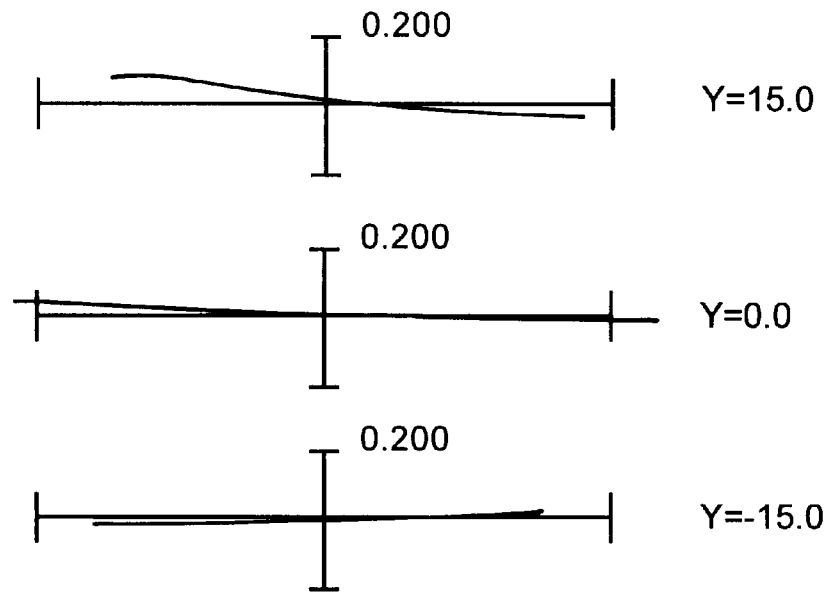
FIG. 32 shows diagrams of coma aberrations in the maximum wide-angle state when an image is shifted with a photographic magnification of −1/30 in the second embodiment.
Figure 33:
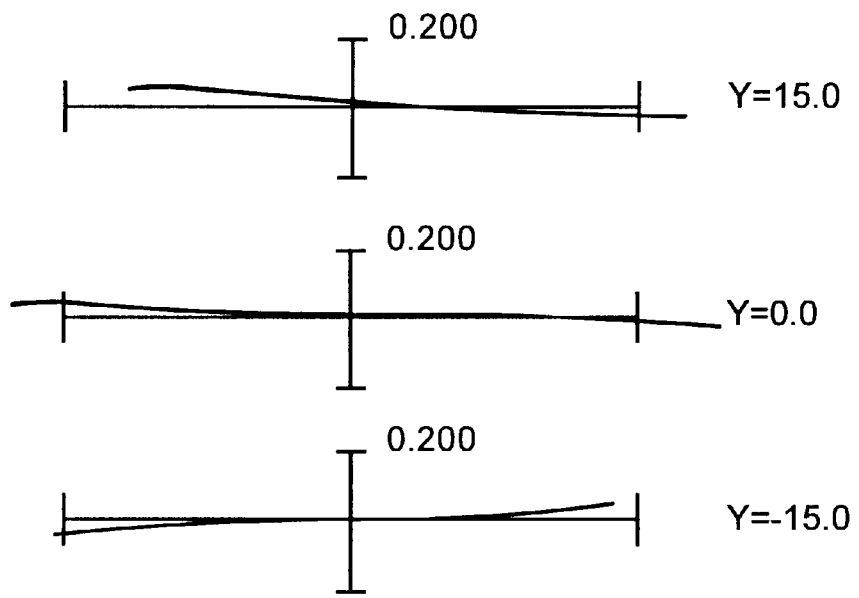
FIG. 33 shows diagrams of coma aberrations in the first middle focal length state when an image is shifted with a photographic magnification of −1/30 in the second embodiment.
Figure 34:
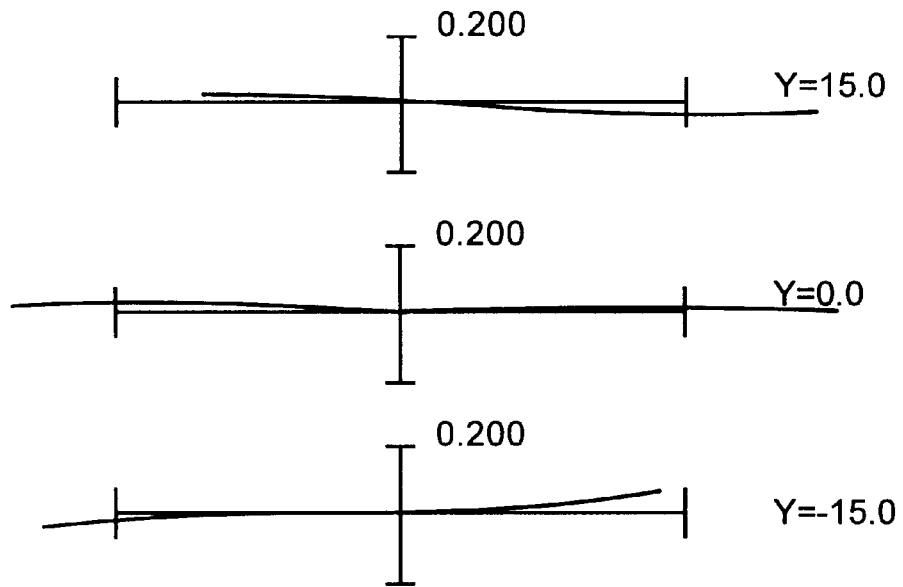
FIG. 34 shows diagrams of coma aberrations in the second middle focal length state when an image is shifted with a photographic magnification of −1/30 in the second embodiment.
Figure 35:
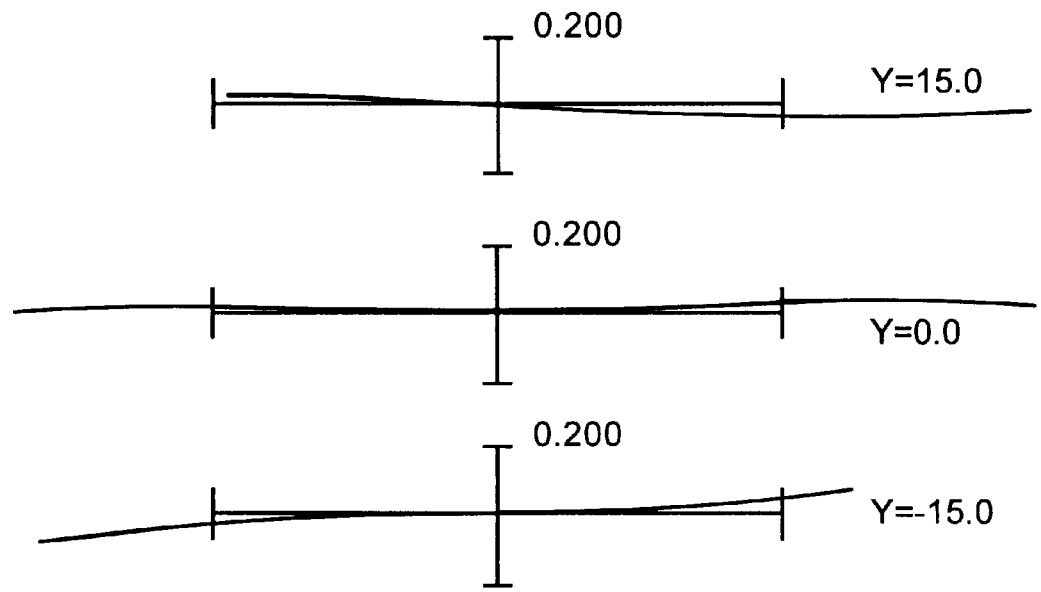
FIG. 35 shows diagrams of coma aberrations in the maximum telephoto state when an image is shifted with a photographic magnification of −1/30 in the second embodiment.

FIG. 32 shows coma aberrations in the maximum wide-angle state with a photographic magnification of −1/30; FIG. 33 shows coma aberrations in the first middle focal length state with a photographic magnification of −1/30; FIG. 34 shows coma aberrations in the second middle focal length state with a photographic magnification of −1/30; and FIG. 35 shows coma aberrations in the maximum telephoto state with a photographic magnification of −1/30.

Each of the aberrations in FIGS. 28 through 35 shows coma aberrations generated when the bonded positive lens L42 is shifted in the positive direction of the image height Y, where Y, in mm, =15.0, 0.0, and −15.0.

In each aberration diagram, F NO is the F-number, NA is the numerical aperture, Y is the image height in mm, A is the half-image angle in degrees with respect to each image height, and H is the object height in mm with respect to each image height.

In astigmatism aberration diagrams, a solid line represents a sagital imaging plane; a broken line represents a meridional imaging plane. Also, in spherical aberration diagrams, a broken line represents a sine condition.

As apparent from each aberration diagram, in the present invention, even when an image is shifted, various aberrations can be excellently corrected at each photographic length position and each focal length position.

Figure 36:
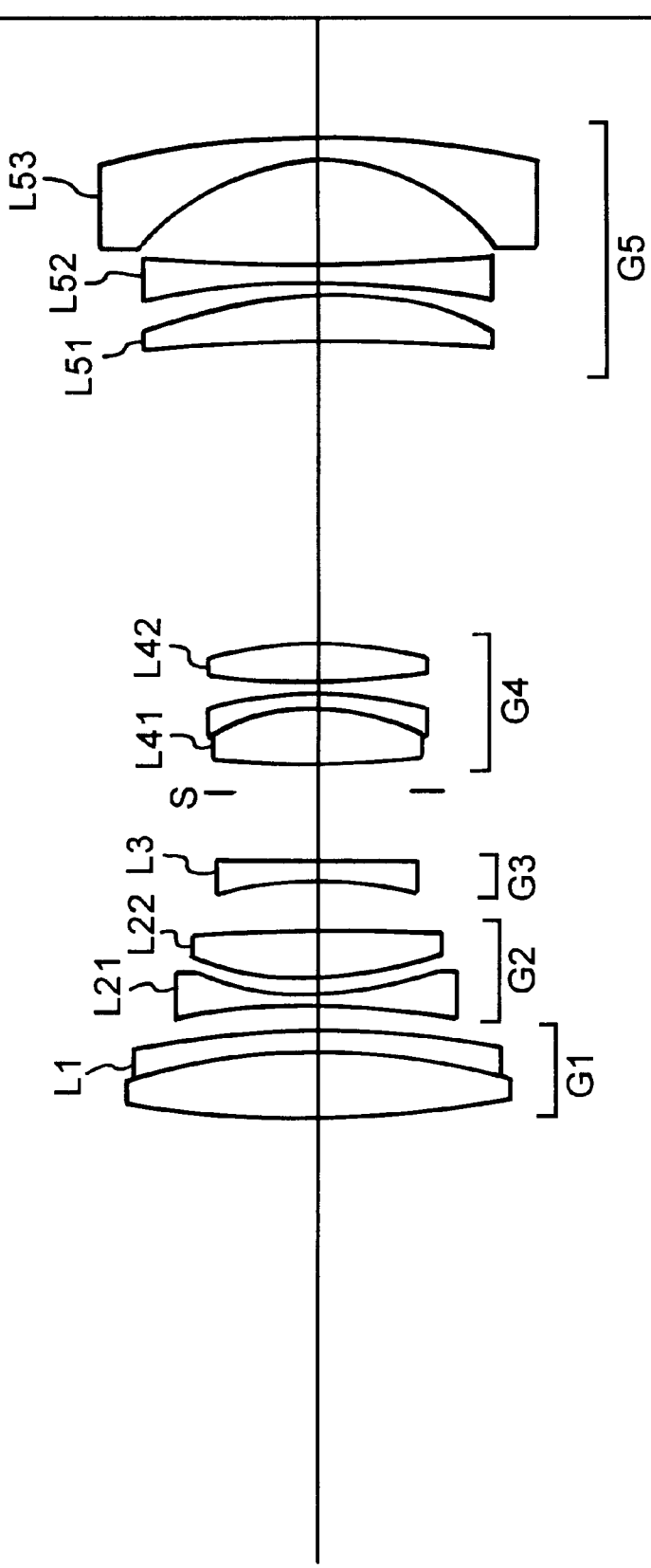
FIG. 36 is a view of the lens layout of a variable focal length optical system of a third embodiment.

FIG. 36 shows the lens layout of a variable focal length optical system of a third embodiment of the present invention.

In the variable focal length optical system of FIG. 36, a first lens group G1 consists of a bonded positive lens L1 made of, in sequence from an object side, a bi-convex lens and a negative meniscus lens whose concave surface faces the object side.

A second lens group G2 consists of, in sequence from the object side, a bi-concave lens L21 and a bi-convex lens L22.

A third lens group G3 consists of a bi-concave lens L3.

A fourth lens group G4 consists of, in sequence from the object side, a bonded positive lens L41 made of a bi-convex lens and a negative meniscus lens whose concave surface faces the object side, and a bi-convex lens L42.

A fifth lens group G5 consists of, in sequence from the object side, a positive meniscus lens L51 whose concave surface faces the object side, a bi-concave lens L52, and a negative meniscus lens L53 whose concave surface faces the object side.

An aperture stop S is located between the third and fourth lens groups G3 and G4, and moves together with the fourth lens group G4 during zooming from the maximum wide-angle state to the maximum telephoto state.

FIG. 36 shows a positional relationship of each lens group at the wide-angle end position. The lens groups move on the optical axis with zooming pathways shown by the arrows in FIG. 1 zooming to the maximum telephoto state.

Of the two lens elements consisting the fourth lens group G4, the bonded positive lens L41 is shifted in a direction almost orthogonal to the optical axis to shift an image, thus correcting deviations of an image point, which are caused by hand-held vibrations.

Focusing is performed by moving the third lens group G3 along the optical axis.

The following Table (3) shows values for various items of the third embodiment of the present invention. In Table (3), f is the focal length in mm, FNO is the F-number, ω is the half-field angle in degrees, Bf is the back focal distance in nm, and DO is the distance in mm along the optical axis between an object and the most-object-side lens surface, Moreover, surface numbers are given to the lens surfaces, counted from the object side to the direction as light rays go forward, and refractive index and Abbe numbers show values with respect to the d-line (λ=587.6 nm), respectively.

TABLE 3 f = 39.14~76.00~126.67~184.96
FNO = 3.88~6.18~8.71~11.03
2ω = 28.93~15.36~9.44~6.54°

| lens surface number | diameter of curvature | distance between adjacent lens surfaces | refractive index | Abbe number |
|---|---|---|---|---|
| 1 | 69.1339 | 4.307 | 1.48749 | 70.45 |
| 2 | −41.1481 | 1.393 | 1.84666 | 23.83 |
| 3 | −68.2191 | (D3 = variable) | | |
| 4 | −47.9179 | 1.013 | 1.83500 | 42.97 |

TABLE 3-continued

| | | | | |
|---|---|---|---|---|
| 5 | 21.5600 | 0.887 | | |
| 6 | 19.7334 | 3.420 | 1.76182 | 26.55 |
| 7 | −74.3293 | (D7 = variable) | | |
| 8 | −21.2735 | 1.013 | 1.65160 | 58.44 |
| 9 | 190.9490 | (D9 = variable) | | |
| 10 | ∞ | 1.773 | (aperture stop S) | |
| 11 | 37.1797 | 3.800 | 1.48749 | 70.45 |
| 12 | −14.3026 | 1.013 | 1.84666 | 23.83 |
| 13 | −25.2207 | 0.633 | | |
| 14 | 59.8053 | 2.533 | 1.51450 | 63.05 |
| 15* | −25.4068 | (D15 = variable) | | |
| 16 | −128.2557 | 3.420 | 1.75520 | 27.53 |
| 17 | −27.1041 | 0.613 | | |
| 18 | −55.9699 | 1.267 | 1.80420 | 46.51 |
| 19 | 126.6667 | 6.623 | | |
| 20 | −15.1206 | 1.520 | 1.80420 | 46.51 |
| 21 | −67.9965 | (Bf) | | |

(aspherical surface data)

| | R | k | $C_4$ |
|---|---|---|---|
| 15th surface | −25.4068 | 1.0000 | $+2.46520 \times 10^{-5}$ |

| $C_6$ | $C_8$ | $C_{-10}$ |
|---|---|---|
| $-6.38440 \times 10^{-8}$ | $-5.80820 \times 10^{-10}$ | 0.00000 |

(variable distance for variable magnification)

| | | | | |
|---|---|---|---|---|
| f | 39.1407 | 76.0020 | 126.6715 | 184.9591 |
| D3 | 1.5200 | 13.6352 | 22.0308 | 28.3806 |
| D7 | 3.1879 | 4.4593 | 5.5276 | 6.3333 |
| D9 | 4.4121 | 3.1407 | 2.0724 | 1.2667 |
| D15 | 19.4714 | 11.4290 | 6.9182 | 3.9639 |
| Bf | 7.9845 | 29.0855 | 53.5611 | 77.7300 |

(amount of focusing movement of third lens group G3 with a photographic magnification of −1/30)

| | | | | |
|---|---|---|---|---|
| focal length f | 39.1407 | 76.0020 | 126.6715 | 184.9591 |
| D0 | 1119.8345 | 2179.5280 | 3641.9399 | 5312.4289 |
| amount of movement | 1.0935 | 0.9160 | 0.8585 | 0.9134. |

Note that a sign of amount of movement is positive for the movement toward the object side.
(amount of movement of bonded positive lens L41 when shifting an image by 0.01 (rad))

| | | | | |
|---|---|---|---|---|
| focal length f | 39.1407 | 76.0020 | 126.6715 | 184.9591 |
| amount of the lens movement | 0.3744 | 0.4590 | 0.5425 | 0.6249 |
| amount of the image shift | 0.3914 | 0.7602 | 1.2667 | 1.8497 |

(condition-corresponding value)

| | |
|---|---|
| f1 = | +93.6994 |
| f2 = | −225.0704 |
| f3 = | −29.3202 |
| β3w = | −0.1992 |
| β3t = | −0.4452 |
| (1) f3/f2 = | 0.130 |
| (2) f1/(fw · ft)$^{1/2}$ = | 1.101 |
| (3) (Bft − Bfw)/(ft − fw) = | 0.478 |
| (4) r21/fw = | −1.224 |
| (5) (β3t/β3w)/(ft/fw) = | 0.473 |
| (6) Db/fw = | 0.045. |

Each of FIGS. 37 through 44 shows each aberration with respect to the d-line (λ=587.6 nm) in the third embodiment. FIG. 37 shows various aberrations in the maximum wide-angle state upon focusing on an object at infinity position; FIG. 38 shows various aberrations in the first middle focal length state upon focusing on an object at infinity position; FIG. 39 shows various aberrations in the second middle focal length state upon focusing on an object at infinity position; and FIG. 40 shows various aberrations at the maximum telephoto state upon focusing on an object at infinity position.

Figure 42D:
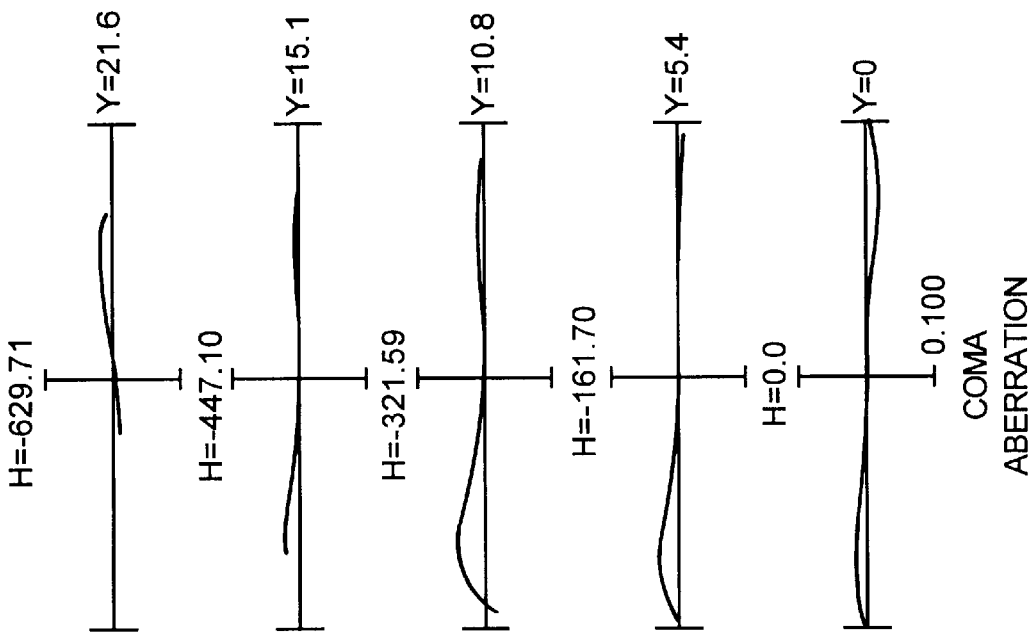
FIGS. 42A–42D show diagrams of various aberrations in the maximum first middle focal length state with a photographic magnification of −1/30 in the third embodiment.
Figures 42A, 42B, 42C:
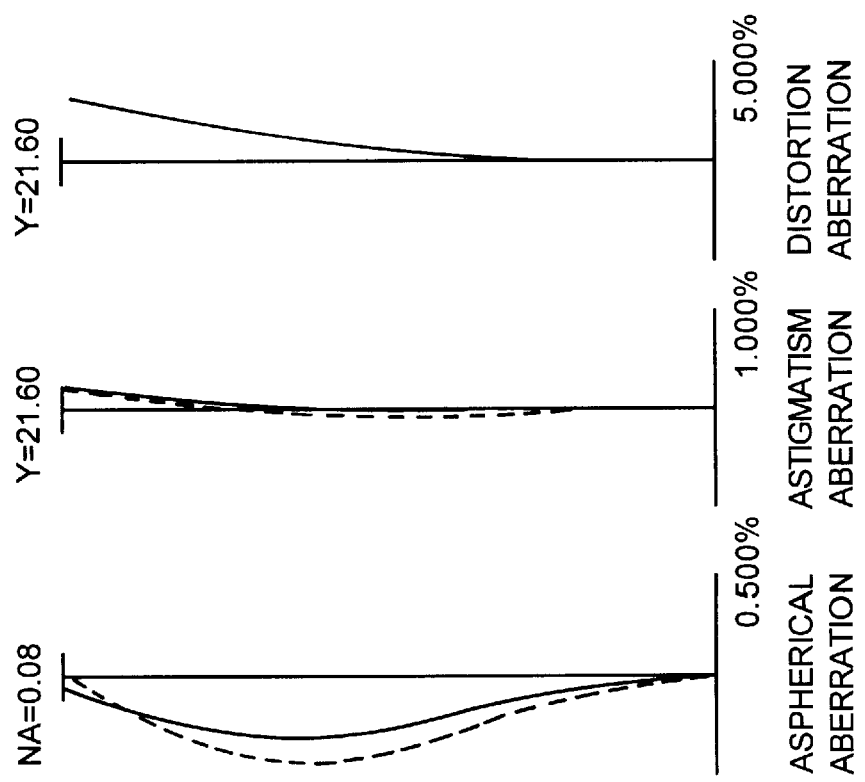
Figure 44D:
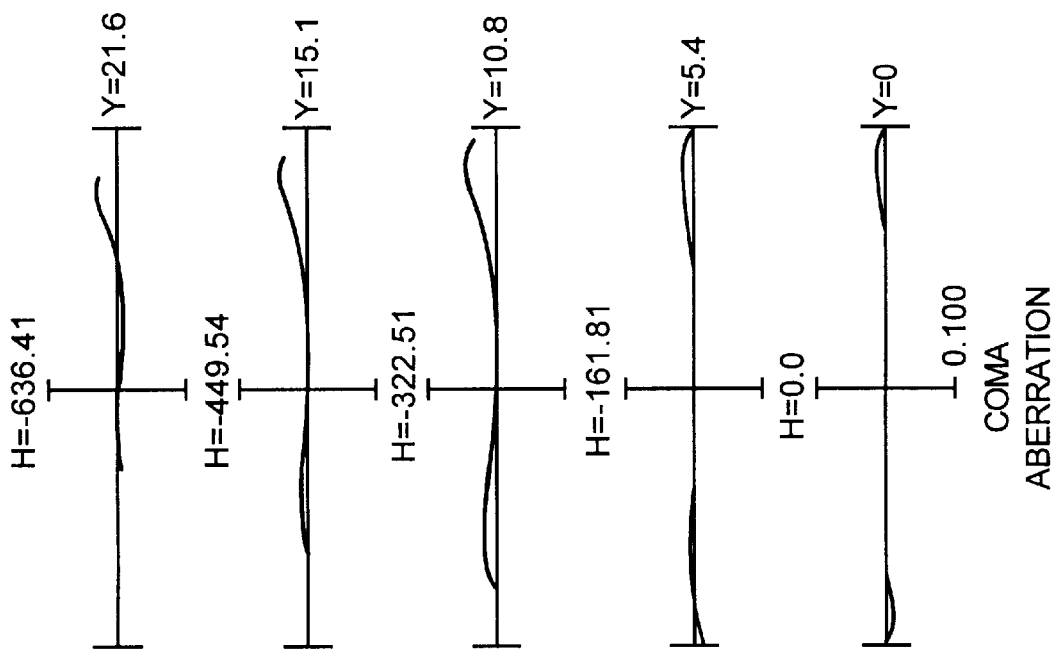
FIGS. 44A–44D show diagrams of various aberrations in the maximum telephoto state with a photographic magnification of −1/30 in the third embodiment.
Figures 44A, 44B, 44C:
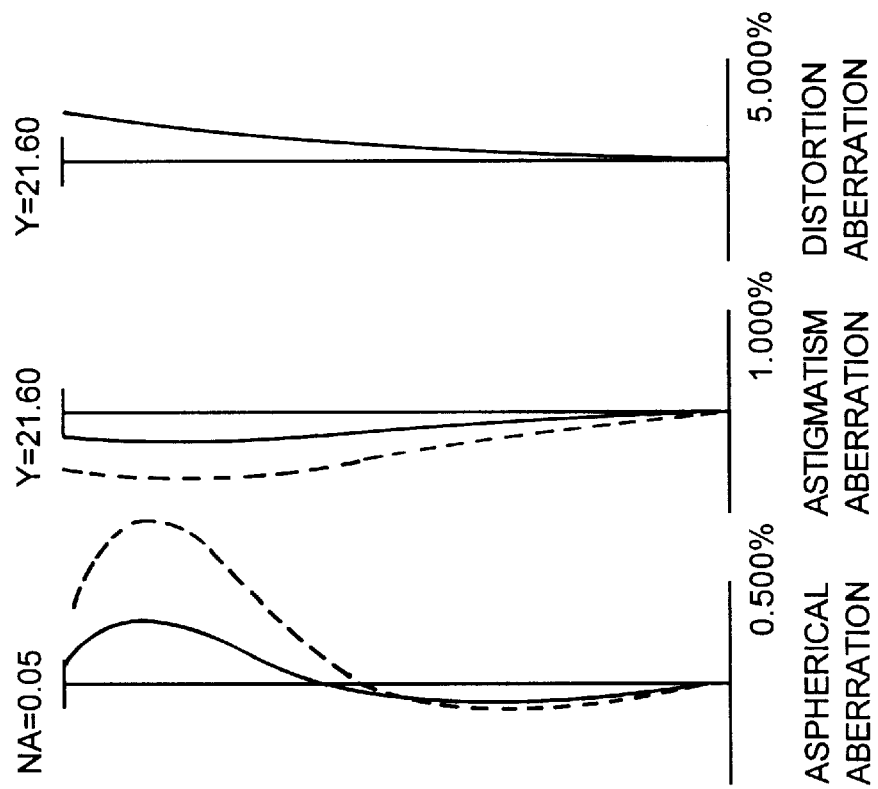

Also, FIG. 41 shows various aberrations in the maximum wide-angle state with a photographic magnification of −1/30; FIG. 42 shows various aberrations in the first middle focal length state with a photographic magnification of −1/30; FIG. 43 shows various aberrations in the second middle focal length state with a photographic magnification of −1/30; and FIG. 44 shows various aberrations in the maximum telephoto state with a photographic magnification of −1/30.

Figure 45:
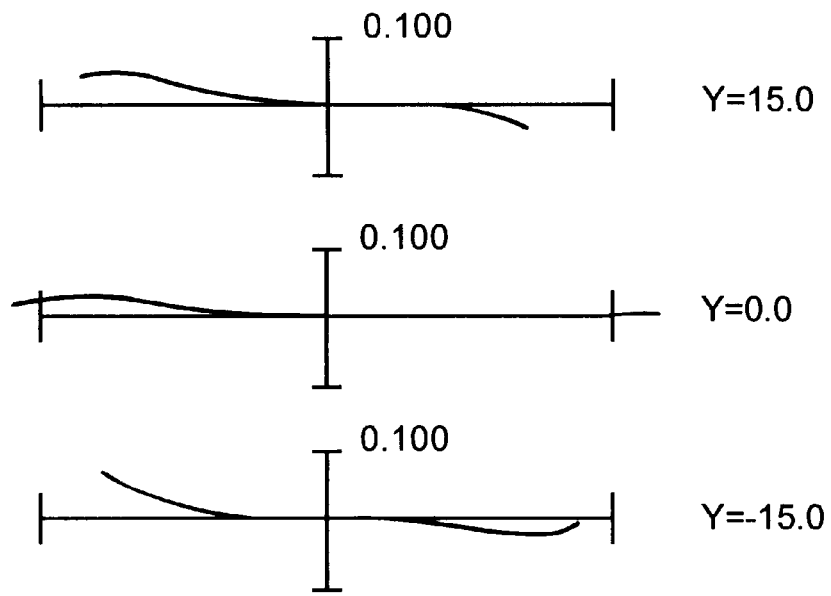
FIG. 45 shows diagrams of coma aberrations in the maximum wide-angle state upon focusing on an object at infinity position when an image is shifted in the third embodiment.
Figure 46:
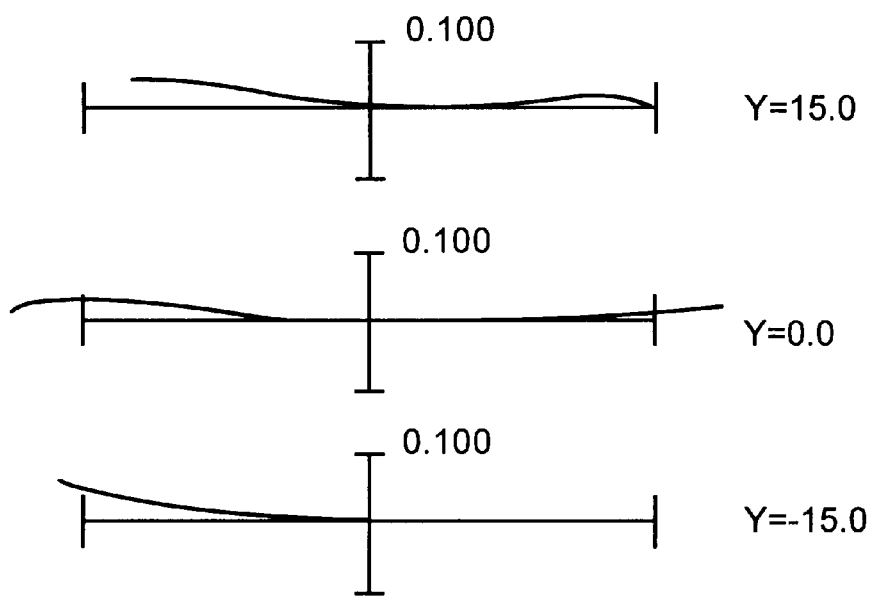
FIG. 46 shows diagrams of coma aberrations in the first middle focal length state upon focusing on an object at infinity position when an image is shifted in the third embodiment.
Figure 47:
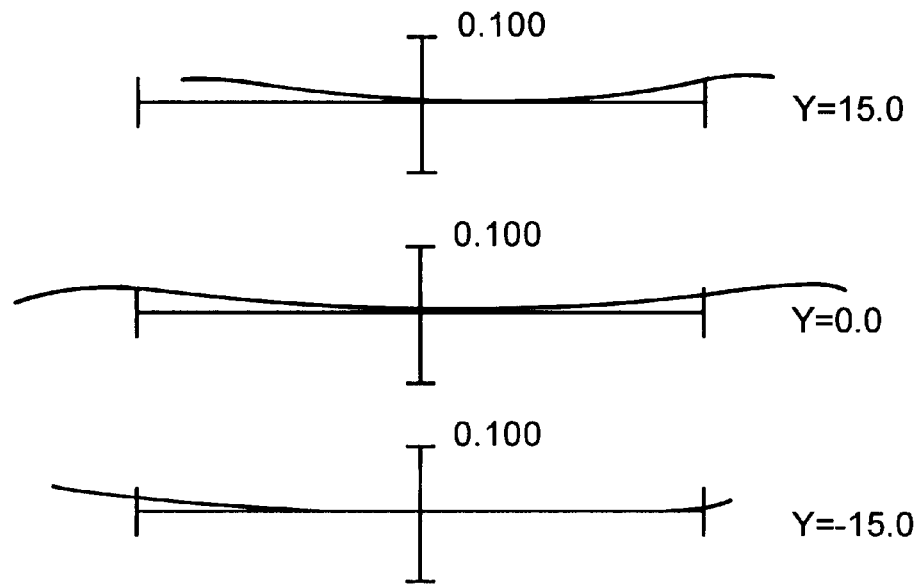
FIG. 47 shows diagrams of coma aberrations at the second middle focal length position upon focusing on an object at infinity position when an image is shifted in the third embodiment.
Figure 48:
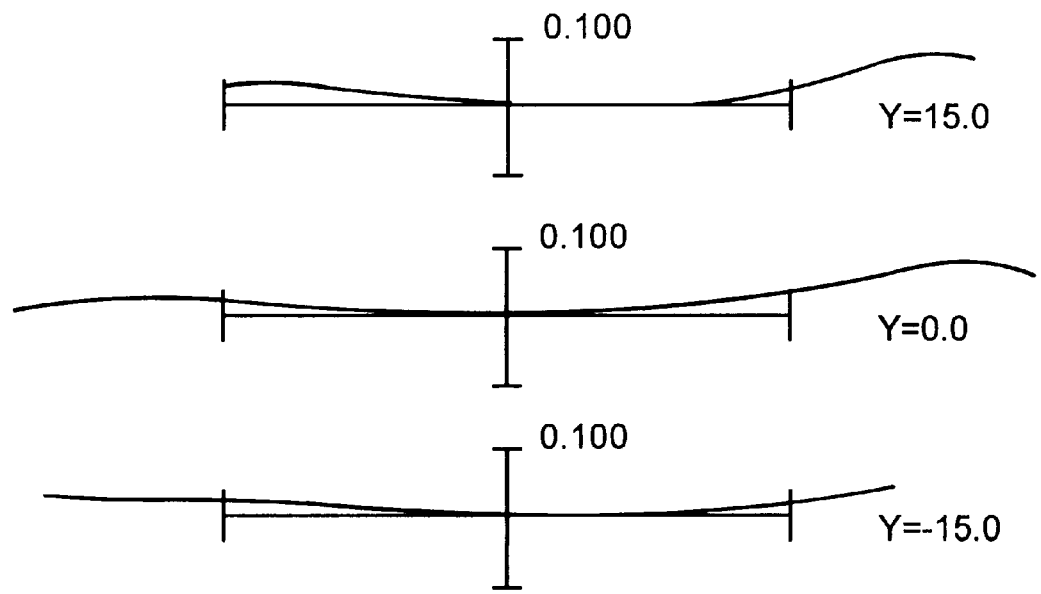
FIG. 48 shows diagrams of coma aberrations in the maximum telephoto state upon focusing on an object at infinity position when an image is shifted in the third embodiment.

Moreover, FIGS. 45 through 48 show coma aberrations generated when an image is shifted by 0.01 rad (radian) from the optical axis in the third embodiment. FIG. 45 shows coma aberrations in the maximum wide-angle state upon focusing on an object at infinity position; FIG. 46 shows coma aberrations in the first middle focal length state upon focusing on an object at infinity position; FIG. 47 shows coma aberrations in the second middle focal length state upon focusing on an object at infinity position; and FIG. 48 shows coma aberrations in the maximum telephoto state upon focusing on an object at infinity position.

Figure 49:
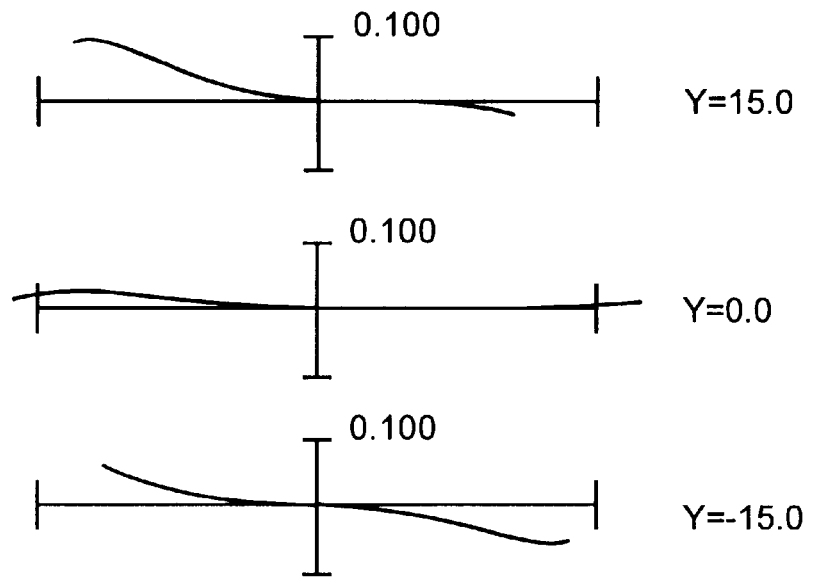
FIG. 49 shows diagrams of coma aberrations in the maximum wide-angle state when an image is shifted with a photographic magnification of −1/30 in the third embodiment.
Figure 50:
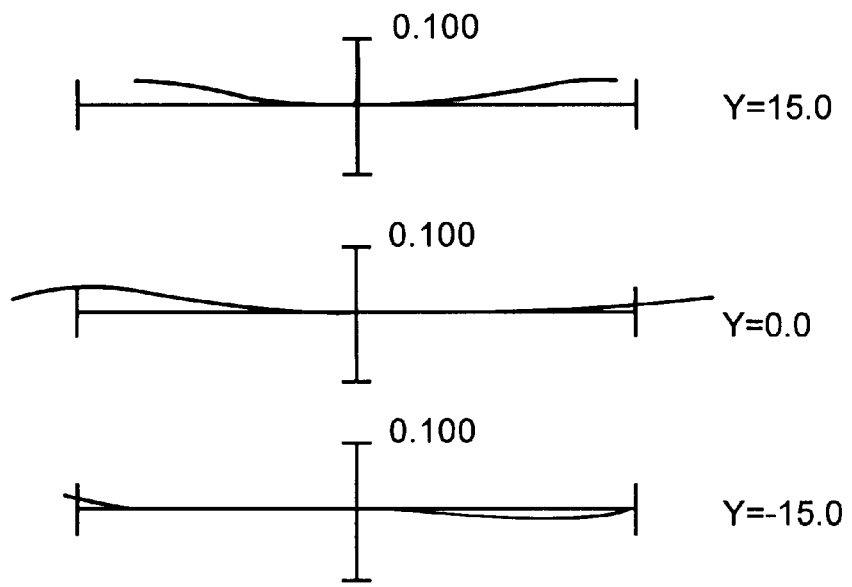
FIG. 50 shows diagrams of coma aberrations in the first middle focal length state when an image is shifted with a photographic magnification of −1/30 in the third embodiment.
Figure 51:
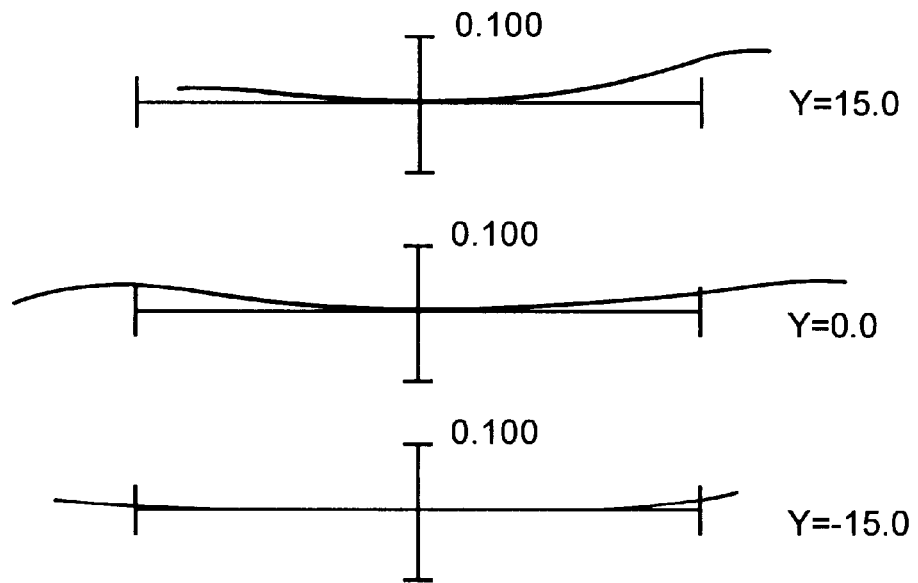
FIG. 51 shows diagrams of coma aberrations in the second middle focal length state when an image is shifted with a photographic magnification of −1/30 in the third embodiment.
Figure 52:
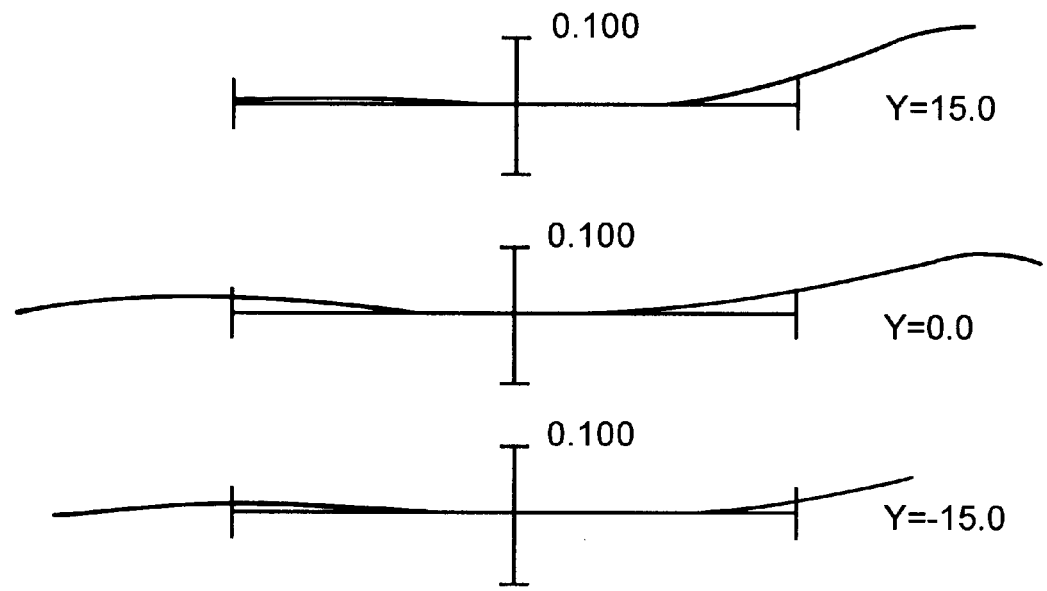
FIG. 52 shows diagrams of coma aberrations in the maximum telephoto state when an image is shifted with a photographic magnification of −1/30 in the third embodiment.

FIG. 49 shows coma aberrations in the maximum wide-angle state with a photographic magnification of −1/30; FIG. 50 shows coma aberrations in the first middle focal length state with a photographic magnification of −1/30; FIG. 51 shows coma aberrations in the second middle focal length state with a photographic magnification of −1/30; and FIG. 52 shows coma aberrations in the maximum telephoto state with a photographic magnification of −1/30.

Each of the aberration diagrams in FIGS. 45 through 52 shows coma aberrations generated when the bonded positive lens L41 is shifted in the positive direction of the image height Y, where Y, in mm, =15.0, 0.0, and −15.0.

In each aberration diagram, FNO is the F-number, NA is the numerical aperture, Y is the image height in mm, A is the half-field angle in degrees with respect to each image height, and H is the object height in mm with respect to each image height.

In astigmatism aberration diagrams, a solid line represents a sagital imaging plane; a broken line represents a meridional imaging plane. Also, in spherical aberration diagrams, a broken line represents a sine condition.

As apparent from each aberration diagram, in this embodiment, even when an image is shifted, various aberrations can be excellently corrected at each photographic length position and each focal length position.

Figure 53:
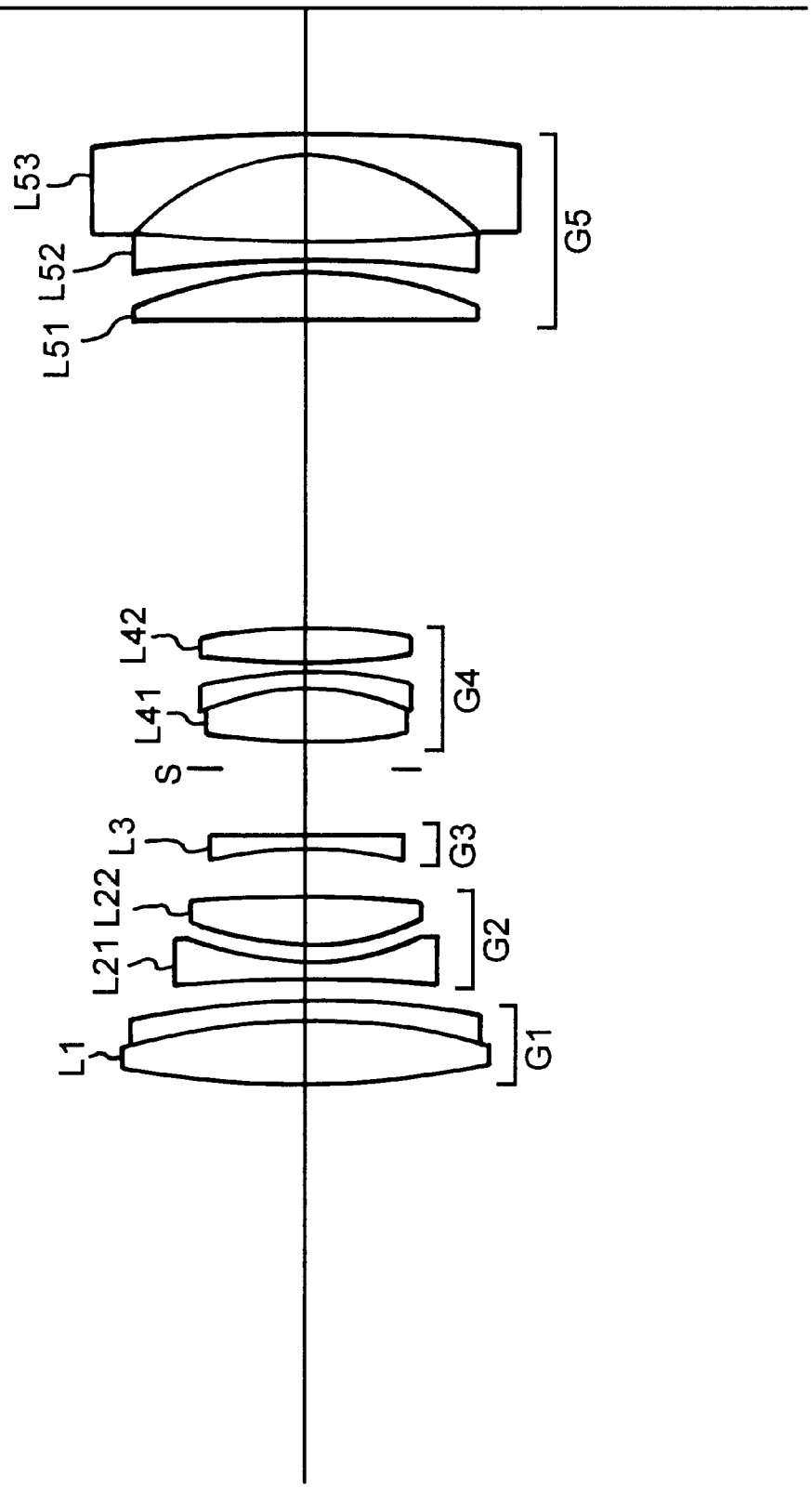
FIG. 53 is a view of the lens layout of a variable focal length optical system of a fourth embodiment of the present invention.

FIG. 53 shows the lens layout of a variable focal length optical system of a fourth embodiment of the present invention.

In the variable focal length optical system of FIG. 53, a first lens group G1 consists of a bonded positive lens L1 made of, in sequence from an object side, a bi-convex lens and a negative meniscus whose concave surface faces the object side.

A second lens group G2 consists of, in sequence from the object side, a bi-concave lens L21 and a bi-convex lens L22.

A third lens group G3 consists of a bi-concave lens L3.

A fourth lens group G4 consists of, in sequence from the object side, a bonded positive lens L41 made of a bi-convex lens and a negative meniscus lens whose concave surface faces the object side, and a bi-convex lens L42, A fifth lens group G5 consists of, in sequence from the object side, a positive meniscus lens L51 whose concave surface faces the object side, a bi-concave lens L52, and a negative meniscus lens L53 whose concave surface faces the object side.

An aperture stop S is located between the third and fourth lens groups G3 and G4, and moves together with the fourth lens group G4 during zooming from the maximum wide-angle state to the maximum telephoto state.

FIG. 53 shows a positional relationship of each lens group at the wide-angle end position; (the lens groups) move on the optical axis with zooming pathways shown by the arrows in FIG. 1 during zooming to the maximum telephoto state.

Of the two lens elements consisting the fourth lens group G4, the bonded positive lens L41 is shifted in a direction almost orthogonal to the optical axis to shift an image, thus correcting deviations in an image point, which are caused by hand-held vibrations.

Further, focusing is performed by moving the third lens group G3 along the optical axis.

The following Table (4) shows values for various item of the fourth embodiment of the present invention. In Table (4), f is the focal length in mm, F NO is the F-number, ω is the half-field angle in degrees, Bf is the back focal distance in mm, and DO is the distance in mm along the optical axis between an object and the most-object-side lens surface. Moreover, surface numbers are given to the lens surfaces, counted from the object side to the direction as light rays go forward, and refractive index and Abbe numbers show values with respect to the d-line (λ=587.6 nm) respectively.

TABLE 4 f = 39.14~76.00~126.67~185.60
FNO = 3.88~6.18~8.71~11.03
2ω = 28.90~15.36~9.44~6.51°

| lens surface number | diameter of curvature | distance between adjacent lens surfaces | refractive index | Abbe Number |
|---|---|---|---|---|
| 1 | 73.1567 | 4.307 | 1.48749 | 70.45 |
| 2 | −39.1087 | 1.393 | 1.84666 | 23.83 |
| 3 | −64.5503 | (D3 = variable) | | |
| 4 | −46.5542 | 1.013 | 1.83500 | 42.97 |
| 5 | 21.4634 | 0.887 | | |
| 6 | 19.8299 | 3.420 | 1.76182 | 26.55 |
| 7 | −73.2670 | (D7 = variable) | | |
| 8 | −22.7369 | 1.013 | 1.77250 | 49.61 |
| 9 | 436.3215 | (D9 = variable) | | |
| 10 | ∞ | 1.773 | (aperture stop S) | |
| 11 | 39.1568 | 3.800 | 1.48749 | 70.45 |
| 12 | −14.4724 | 1.013 | 1.84666 | 23.83 |
| 13 | −25.6533 | 0.633 | | |
| 14 | 60.5646 | 2.533 | 1.51450 | 63.05 |
| 15* | −24.9534 | (D15 = variable) | | |
| 16 | −295.5822 | 3.420 | 1.72825 | 28.31 |
| 17 | −27.7080 | 0.760 | | |
| 18 | −57.5935 | 1.267 | 1.80420 | 46.51 |
| 19 | 126.6667 | 5.827 | | |
| 20 | −15.4450 | 1,520 | 1.80420 | 46.51 |
| 21 | −89.3643 | (Bf) | | |

(aspherical surface data)

| | R | k | $C_4$ |
|---|---|---|---|
| 15th surface | −24.9534 | 1.0000 | $+2.48433 \times 10^{-5}$ |

| $C_6$ | $C_8$ | $C_{10}$ |
|---|---|---|
| $+4.04532 \times 10^{-8}$ | $-2.85972 \times 10^{-10}$ | 0.00000 |

(variable distance for variable magnification)

| f | 39.1404 | 76.0013 | 126.6695 | 185.6034 |
|---|---|---|---|---|
| D3 | 1.5200 | 13.6819 | 22.0757 | 28.6921 |
| D7 | 3.1692 | 4.2974 | 5.3942 | 6.3333 |
| D9 | 4.4308 | 3.3026 | 2.2058 | 1.2667 |
| D15 | 20.7598 | 11.9921 | 7.2574 | 4.1800 |
| Bf | 7.9804 | 29.6382 | 54.4074 | 78.3845 |

TABLE 4-continued (amount of focusing movement of third lens group G3 with a photographic magnification of −1/30)

| focal length f | 39.1404 | 76.0013 | 126.6695 | 185.6034 |
|---|---|---|---|---|
| D0 | 1118.3917 | 2177.3450 | 3638.1749 | 5319.9470 |
| amount of movement | 1.0788 | 0.9104 | 0.8502 | 0.9276. |

Note that a sign of amount of movement is positive for the movement toward the object side.
(amount of movement of bonded positive lens L41 when shifting an image by 0.01 (rad))

| focal length f | 39.1404 | 76.0013 | 126.6695 | 185.6034 |
|---|---|---|---|---|
| amount of the lens movements | 0.3907 | 0.4768 | 0.5636 | 0.6548 |
| amount of image shift | 0.3915 | 0.7600 | 1.2667 | 1.8563 |

(condition-corresponding value)

| f1 = | +94.8466 |
|---|---|
| f2 = | −318.4115 |
| f3 = | −297.9483 |
| β3w = | −0.2353 |
| β3t = | −0.4866 |
| (1) f3/f2 = | 0.088 |
| (2) f1/(fw · ft)½ = | 1.113 |
| (3) (Bft − Bfw)/(ft − fw) = | 0.481 |
| (4) r21/fw = | −1.189 |
| (5) (β3t/β3w)/ft/fw) = | 0.436 |
| (6) Db/fw = | 0.045. |

Each of FIGS. 54 through 51 shows each aberration with respect to the d-line (λ=587.6 nm) in the fourth embodiment. FIG. 54 shows various aberrations in the maximum wide-angle state upon focusing on an object at infinity position; FIG. 55 shows various aberrations in the first middle focal state upon focusing on an object at infinity position; FIG. 56 shows various aberrations in the second middle focal state upon focusing on an object at infinity position; and FIG. 57 shows various aberrations in the maximum telephoto state upon focusing on an object at infinity position.

Figure 61D:
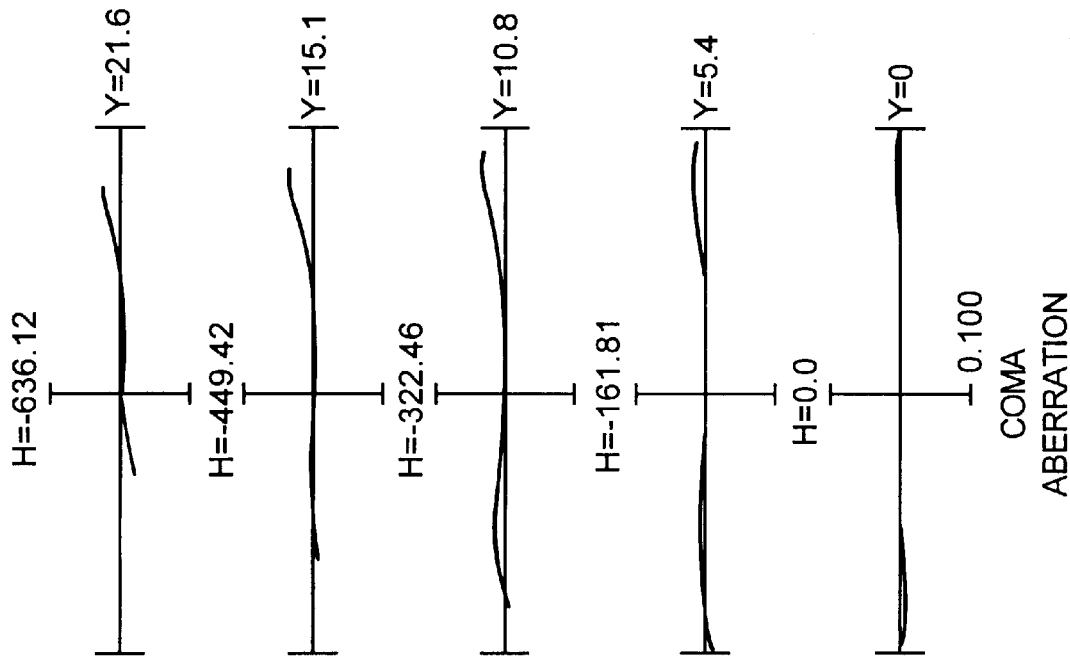
FIGS. 61A–61D show diagrams of various aberrations in the maximum telephoto state with a photographic magnification of $-\frac{1}{30}$ in the fourth embodiment.
Figures 61A, 61B, 61C:
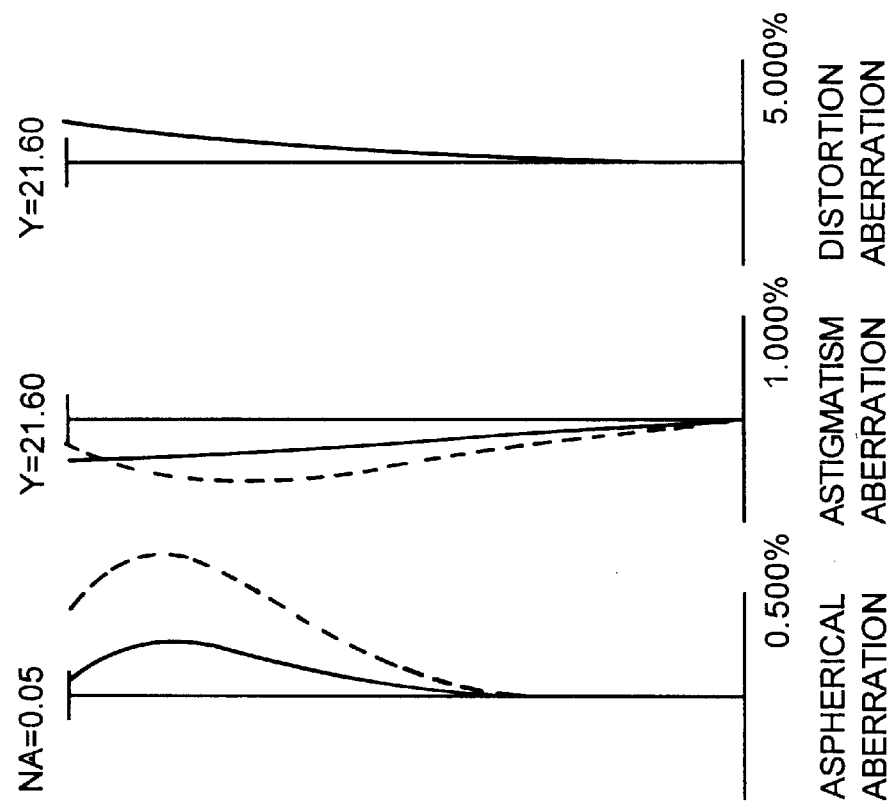

Also, FIG. 58 shows various aberrations in the maximum wide-angle state with a photographic magnification of −1/30; FIG. 59 shows various aberrations in the first middle focal length state with a photographic magnification of −1/30; FIG. 60 shows various aberrations in the second middle focal length state with a photographic magnification of −1/30; and FIG. 61 shows various aberrations in the maximum telephoto state with a photographic magnification of −1/30.

Figure 62:
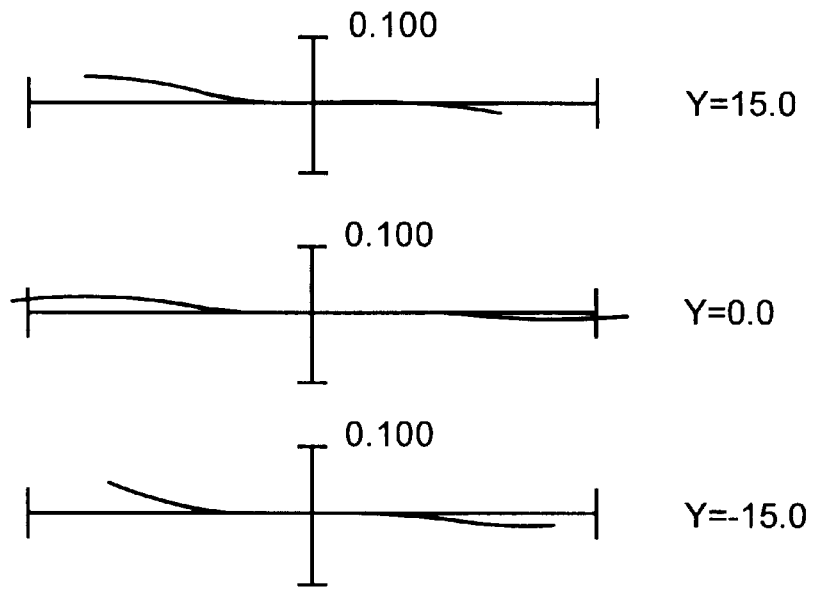
FIG. 62 shows diagrams of coma aberrations in the maximum wide-angle state upon focusing on an object at infinity position when an image is shifted in the fourth embodiment.
Figure 63:
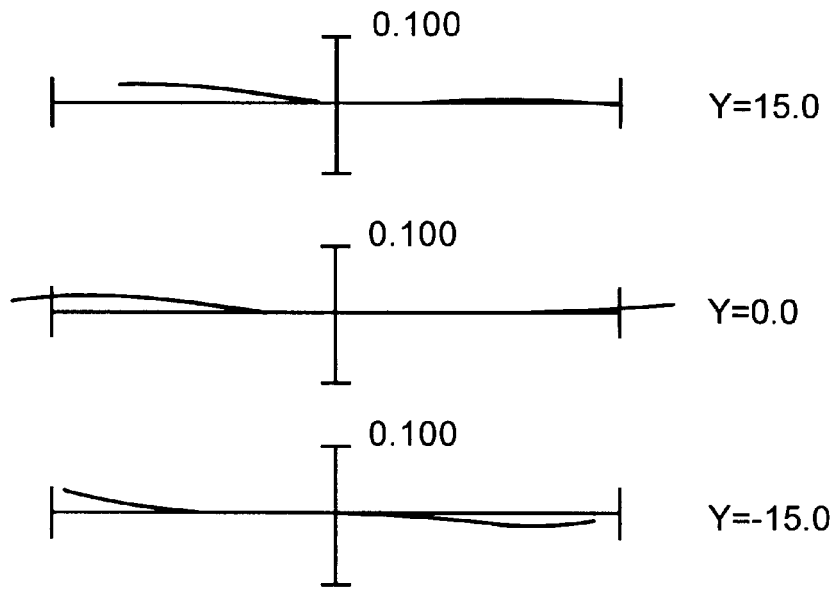
FIG. 63 shows diagrams of coma aberrations in the first middle focal length state upon focusing on an object at infinity position when an image is shifted in the fourth embodiment.
Figure 64:
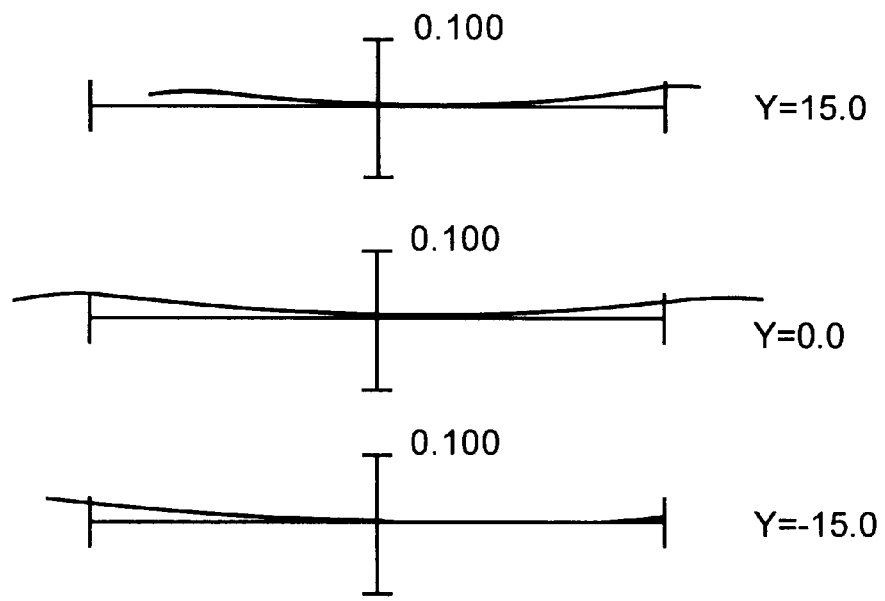
FIG. 64 shows diagrams of coma aberrations at the second middle focal length position upon focusing on an object at infinity position when an image is shifted in the fourth embodiment.
Figure 65:
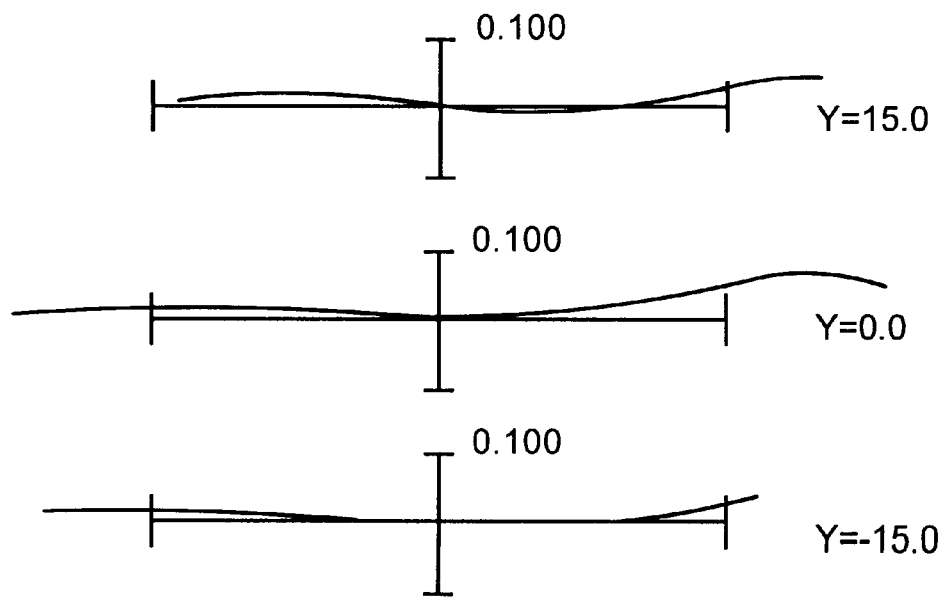
FIG. 65 shows diagrams of coma aberrations in the maximum telephoto state upon focusing on an object at infinity position when an image is shifted in the fourth embodiment.

Moreover, FIGS. 62 through 65 show coma aberrations generated when an image is shifted by 0.01 rad (radian) from the optical axis in the third embodiment. FIG. 62 shows coma aberrations in the maximum wide-angle state upon focusing on an object at infinity position; FIG. 63 shows coma aberrations in the first middle focal length state upon focusing on an object at infinity position; FIG. 64 shows coma aberrations in the second middle focal length state upon focusing on an object at infinity position; and FIG. 65 shows coma aberrations in the maximum telephoto state upon focusing on an object at infinity position.

Figure 66:
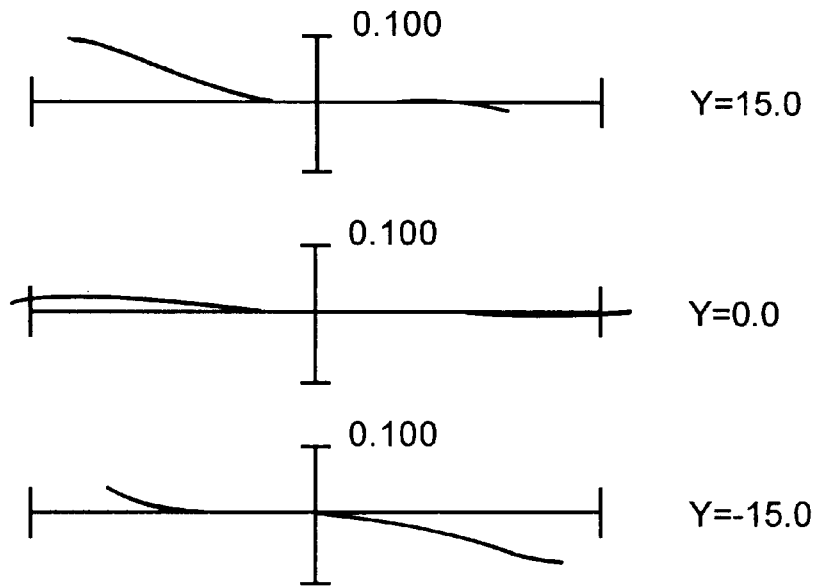
FIG. 66 shows diagrams of coma aberrations in the maximum wide-angle state when an image is shifted with a photographic magnification of $-\frac{1}{30}$ in the fourth embodiment.
Figure 67:
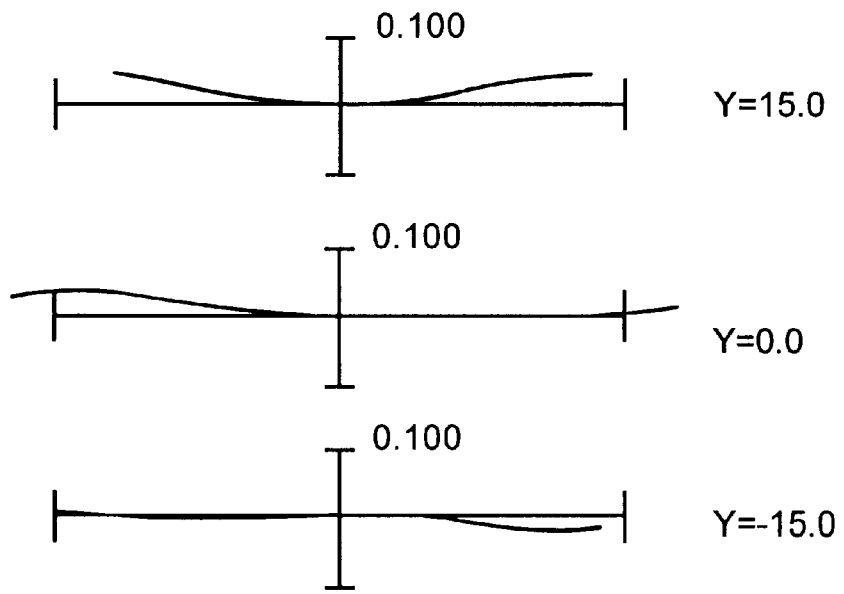
FIG. 67 shows diagrams of coma aberrations in the first middle focal length state when an image is shifted with a photographic magnification of $-\frac{1}{30}$ in the fourth embodiment.
Figure 68:
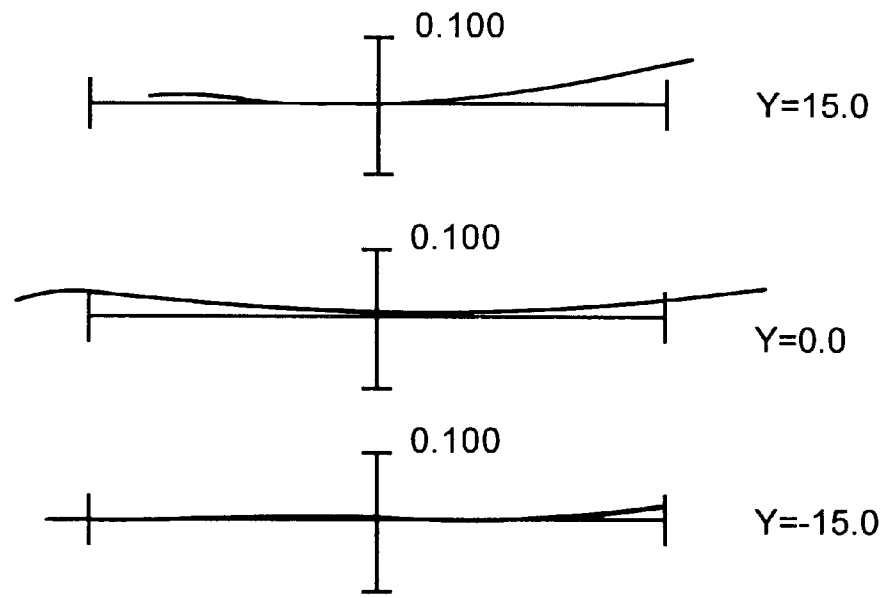
FIG. 68 shows diagrams of coma aberrations in the second middle focal length state when an image is shifted with a photographic magnification of $-\frac{1}{30}$ in the fourth embodiment.
Figure 69:
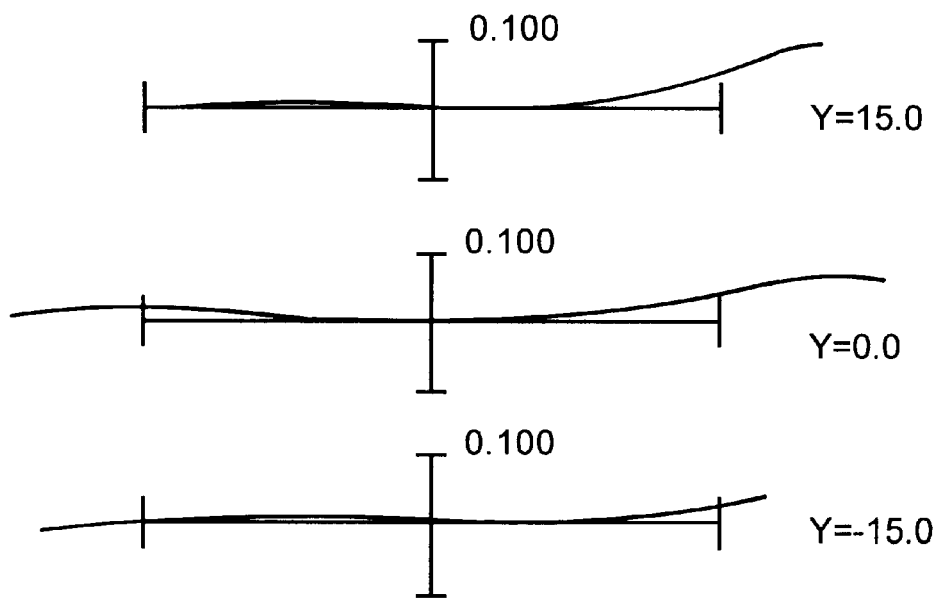
FIG. 69 shows diagrams of coma aberrations in the maximum telephoto state when an image is shifted with a photographic magnification of $-\frac{1}{30}$ in the fourth embodiment

FIG. 66 shows coma aberrations in the maximum wide-angle state with a photographic magnification of −1/30; FIG. 67 shows coma aberrations in the first middle focal length state with a photographic magnification of −1/30; FIG. 68 shows coma aberrations in the second middle focal length state with a photographic magnification of −1/30; and FIG. 69 shows coma aberrations in the maximum telephoto state with a photographic magnification of −1/30.

Each of the aberrations in FIGS. 62 through 69 shows coma aberrations generated when the bonded positive lens L41 is shifted in the positive direction of the image height Y, where Y, in mm, =15.0, 0.0, and −15.0.

In each aberration diagram, FNO is the F-number, NA is the numerical aperture, Y is the image height in mm, A is the half-field angle in degrees with respect to each image height, and H is the object height in mm with respect to each image height.

In astigmatism aberration diagrams, a solid line represents a sagital imaging plane; a broken line represents a meridional imaging plane. Also, in spherical aberration diagrams, a broken line represents a sine condition.

As apparent from each aberration diagram, in this embodiment, even when an image is shifted, various aberrations can be excellently corrected at each photographic length position and each focal length position.

The present invention can provide a compact variable magnification optical system with high performance. A variable magnification ratio of about five times is provided and, therefore, the system is suitable for high zoom ratio. Note that the larger diameters, high zoom ratio, and compactness can be improved by employing multiple aspherical surfaces in lens groups of a variable focal length optical system.

The particular embodiments described are only examples and are not to be considered the only embodiments encompassed by the following claims.

I claim:

1. A variable focal length optical system having an object side and comprising in sequence from the object side:

a first lens group having a positive refractive power, a second lens group having a positive refractive power; and a third lens group having a negative refractive power, wherein, when positions of the lens groups are changed from a maximum wide-angle state to a maximum telephoto state, at least the first lens group is moved toward the object side so as to increase a distance between the first and second lens groups and change a distance between the second and third lens groups; and when f2 is a focal length of the second lens group and f3 is a focal length of the third lens group the following condition is satisfied:

$$-0.2 < f3/f2 < 0.2.$$

2. The variable focal length optical system as claimed in claim 1, wherein, when f1 is a focal length of the first lens group, fw is a focal length of the optical system in the maximum wide-angle state, and ft is a focal length of the optical system in the maximum telephoto state, the following condition is satisfied:

$$0.8 < f1/(fw \cdot ft)^{1/2} < 1.5.$$

3. The variable focal length optical system as claimed in claim 1, and further comprising:

a fourth lens group, having a positive refractive power, positioned on an image side of the third lens group, wherein, when positions of the lens groups are changed from the maximum wide-angle state to the maximum telephoto state, a distance between the third and fourth lens groups is decreased.

4. The variable focal length optical system as claimed in claim 3, and further comprising:

a fifth lens group, having a negative refractive power, positioned behind the fourth lens group on the image side;

wherein, when positions of lens groups are changed from the maximum wide-angle state to the maximum telephoto state, at least the fifth lens group is moved toward the object side so as to decrease a distance between the fourth and fifth lens groups, and when fw is a focal length of the optical system at the maximum wide-angle state, ft is a focal length of the total optical system in the maximum telephoto state, Bfw is a back focal length in the maximum wide-angle state, and Bft is back focal length in the maximum telephoto state, the following condition is satisfied:

$$0.3 < (Bft - Bfw)/(ft - fw) < 0.6.$$

5. The variable focal length optical system as claimed in claim 3, and further comprising an aperture stop provided within or adjacent to the fourth lens group.

6. The variable focal length optical system as claimed in claim 5, wherein, when positions of the lens groups are changed from the maximum wide-angle state to the maximum telephoto state, the second and fourth lens groups are integrally moved.

7. The variable focal length optical system as claimed in claim 5, and further comprising:

at least one shift lens group movable in a direction orthogonal to an optical axis;

wherein, when Db is an axial distance between the aperture stop and a most-stop-side lens surface in the shift lens group and fw is focal length of the optical system in the maximum wide-angle state, the following condition is satisfied:

$$Db/fw < 0.2.$$

8. The variable focal length optical system as claimed in claim 7, wherein the shift lens group is provided within the fourth lens group.

9. The variable focal length optical system as claimed in claim 1, wherein the second lens group has a bi-concave lens and a positive lens positioned on an image side of the bi-concave lens, and when r21 is a radius of curvature of a most-object-side lens in the second lens group and fw is a focal length of the optical system in the maximum wide-angle state, the following condition is satisfied:

$$-2 < r21/fw < -0.5.$$

10. The variable focal length optical system as claimed in claim 1, wherein the third lens group is moved along an optical axis to focus on a nearby object, and when β3w is a lateral magnification ratio of the third lens group in the maximum wide-angle state, β3t is a lateral magnification ratio of the third lens group in the maximum telephoto state, fw is a focal length of the optical system in the maximum wide-angle state, and ft is a focal length of the total optical system in the maximum telephoto state, the following condition is satisfied:

$$0.2 < (β3t/β3tw)/(ft/fw) < 0.7.$$

11. A variable focal length system capable of shifting images, having object and image sides, comprising:

a first lens group having a positive refractive power;

a second lens group having a negative refractive power positioned adjacent to the first lens group on the object side; and a third lens group positioned adjacent to the first lens group on the image side;

wherein a distance between the first and second lens groups is decreased and a distance between the first and third lens groups is changed when changing positions of the lens groups from a maximum wide-angle state to maximum telephoto state;

the first lens group includes at least two sub-lens groups, one of the two sub-lens groups being moved in a direction almost orthogonal to an optical axis to shift an image along a direction almost orthogonal to the optical axis; and when fs is a focal length of the first lens group and fh is a focal length of the one of the sub-lens groups, the following condition is satisfied:

$$0.3<fs/fh<0.6.$$

12. The variable focal length optical system capable of shifting images as claimed in claim 11, and further comprising an aperture stop provided within or adjacent to the first lens group.

13. The variable focal length optical system capable of shifting images as claimed in claim 12, wherein, when Db is a distance along the optical axis between the aperture stop and a surface of a sub-lens group closest to the aperture stop and fw is a focal length of the optical system in the maximum wide-angle state, the following condition is satisfied:

$$Db/fw<0.2.$$

14. The variable focal length optical system capable of shifting images as claimed in claim 11, wherein the third lens group has a negative refractive power and is moved toward the object side when changing the positions of the lens groups from the maximum wide-angle state to the maximum telephoto state and, when β5w is a lateral magnification of the third lens group in the maximum wide-angle state, β5t is a lateral magnification of the third lens group in the maximum telephoto state, fw is a focal length of the optical system in the maximum wide-angle state, and ft is the focal length of the optical system in the maximum telephoto state, the following condition is satisfied:

$$0.4<(\beta5t/\beta5w)/(ft/fw)<0.7.$$

15. The variable focal length optical system capable of shifting images as claimed in claim 14, and further comprising:

a fourth lens group having a positive refractive power positioned closest to the object side;

wherein, when f1 is a focal length of the fourth lens group, fw is a focal length of the optical system in the maximum wide-angle state, and ft is a focal length of the optical system in the maximum telephoto state, the following condition is satisfied:

$$0.8<f1/(fw\cdot ft)^{1/2}<1.5.$$

16. The variable focal length optical system capable of shifting images as claimed in claim 15, wherein the fourth lens group is moved toward the object side when changing positions of the lens groups from the maximum wide-angle state to the maximum telephoto state, and further comprising:

a fifth lens group located between the fourth lens group and the second lens group;

wherein, when f2 is a focal length of the fifth lens group and fn is a focal length of the second lens group, the following condition is satisfied:

$$-0.2<fn/f2<0.2.$$

17. The variable focal length optical system capable of shifting images as claimed in claim 11, wherein focusing is performed on a nearby object by moving a lens group located in front of the first lens group on the object side, along an optical axis.

18. The variable focal length optical system capable of shifting images as claimed in claim 11, wherein focusing is performed on a nearby object by moving the second lens group along an optical axis and, when β3w is a lateral focal length of the second lens group in the maximum wide-angle state, β3t is a lateral focal length of the second lens group in the maximum telephoto state, fw is a focal length of the optical system in the maximum wide-angle state, and ft is focal length of the optical system in the maximum telephoto state, the following condition is satisfied:

$$0.2<(\beta3t/\beta3tw)/(ft/fw)<0.7.$$

19. A variable focal length optical system capable of shifting images, having an object side, comprising in sequence from the object side:

a first lens group having a positive refractive power;

a second lens group having either a positive or a negative refractive power;

a third lens group having a negative refractive power;

a fourth lens group having a positive refractive power; and a fifth lens group having a negative refractive power;

wherein at least the first and fifth lens groups are moved toward the object side when changing positions of the lens groups from a maximum wide-angle state to a maximum telephoto state so that a distance between the first and second lens groups is increased, a distance between the second and third lens groups is increased, a distance between the third and fourth lens groups is decreased, and a distance between the fourth and fifth lens groups is decreased;

a sixth lens group forming a part of the fourth lens group is moved in a direction almost orthogonal to the optical axis to shift an image along a direction almost orthogonal to the optical axis; and when is β5w is a lateral magnification of the fifth lens group in the maximum wide-angle state, β5t is a lateral magnification of the fifth lens group in the maximum telephoto state, fw is a focal length of the total optical system in the maximum wide-angle state, and ft is a focal length of the total optical system in the maximum telephoto state, the following condition is satisfied:

$$0/4<(\beta5t/\beta5w)/(ft/fw)<0.7.$$

* * * * *